United States Patent
Radhakrishnan et al.

(10) Patent No.: US 12,524,163 B2
(45) Date of Patent: Jan. 13, 2026

(54) RAID INTEGRITY VERIFICATION SYSTEM

(71) Applicant: Dell Products L.P., Round Rock, TX (US)

(72) Inventors: Vineeth Radhakrishnan, Bangalore (IN); Shinose Abdul Rahiman, Bangalore (IN); Dharma Bhushan Ramaiah, Bangalore (IN); Nikhith Ganigarakoppal Kantharaju, Hassan (IN); Rama Rao Bisa, Bangalore (IN); Sumalatha Pagadala, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 2 days.

(21) Appl. No.: 18/446,692

(22) Filed: Aug. 9, 2023

(65) Prior Publication Data

US 2025/0053309 A1 Feb. 13, 2025

(51) Int. Cl.
*G06F 3/06* (2006.01)
(52) U.S. Cl.
CPC ............ *G06F 3/0619* (2013.01); *G06F 3/064* (2013.01); *G06F 3/0689* (2013.01)
(58) Field of Classification Search
CPC ................................ G06F 3/0619; G06F 3/064
USPC ......................................................... 711/154
See application file for complete search history.

(56) References Cited

U.S. PATENT DOCUMENTS

| | | | | |
|---|---|---|---|---|
| 7,464,238 B1* | 12/2008 | Yadav | ................. | G06F 11/1464 711/114 |
| 10,120,797 B1 | 11/2018 | Foley et al. | | |
| 2010/0023847 A1* | 1/2010 | Morita | ............... | G11B 20/1879 714/801 |
| 2017/0098100 A1* | 4/2017 | Yadgiri | ............... | G06F 21/6254 |
| 2018/0089077 A1* | 3/2018 | Gao | ...................... | G06F 3/0643 |
| 2018/0095679 A1* | 4/2018 | Wysocki | ............... | G06F 3/0689 |
| 2020/0125276 A1* | 4/2020 | Shani | .................... | G06F 3/0647 |

* cited by examiner

*Primary Examiner* — Gautam Sain
(74) *Attorney, Agent, or Firm* — Joseph Mencher

(57) ABSTRACT

A RAID integrity verification system includes a chassis housing a software RAID subsystem that is coupled to storage devices and configured to provide a logical storage device using the storage devices. A management subsystem in the chassis is coupled to the storage devices and retrieves first RAID configuration information associated with the logical storage device from each of the storage devices and uses it to generate a first RAID logical storage device integrity verification measurement block. Subsequently, the management subsystem retrieves second RAID configuration information associated with the logical storage device from each of the storage devices and uses it to generate a second RAID logical storage device integrity verification measurement block. If the management subsystem determines that the second RAID logical storage device integrity verification measurement block does not match the first RAID logical storage device integrity verification measurement block, it performs RAID logical storage device integrity remediation operation(s).

20 Claims, 56 Drawing Sheets

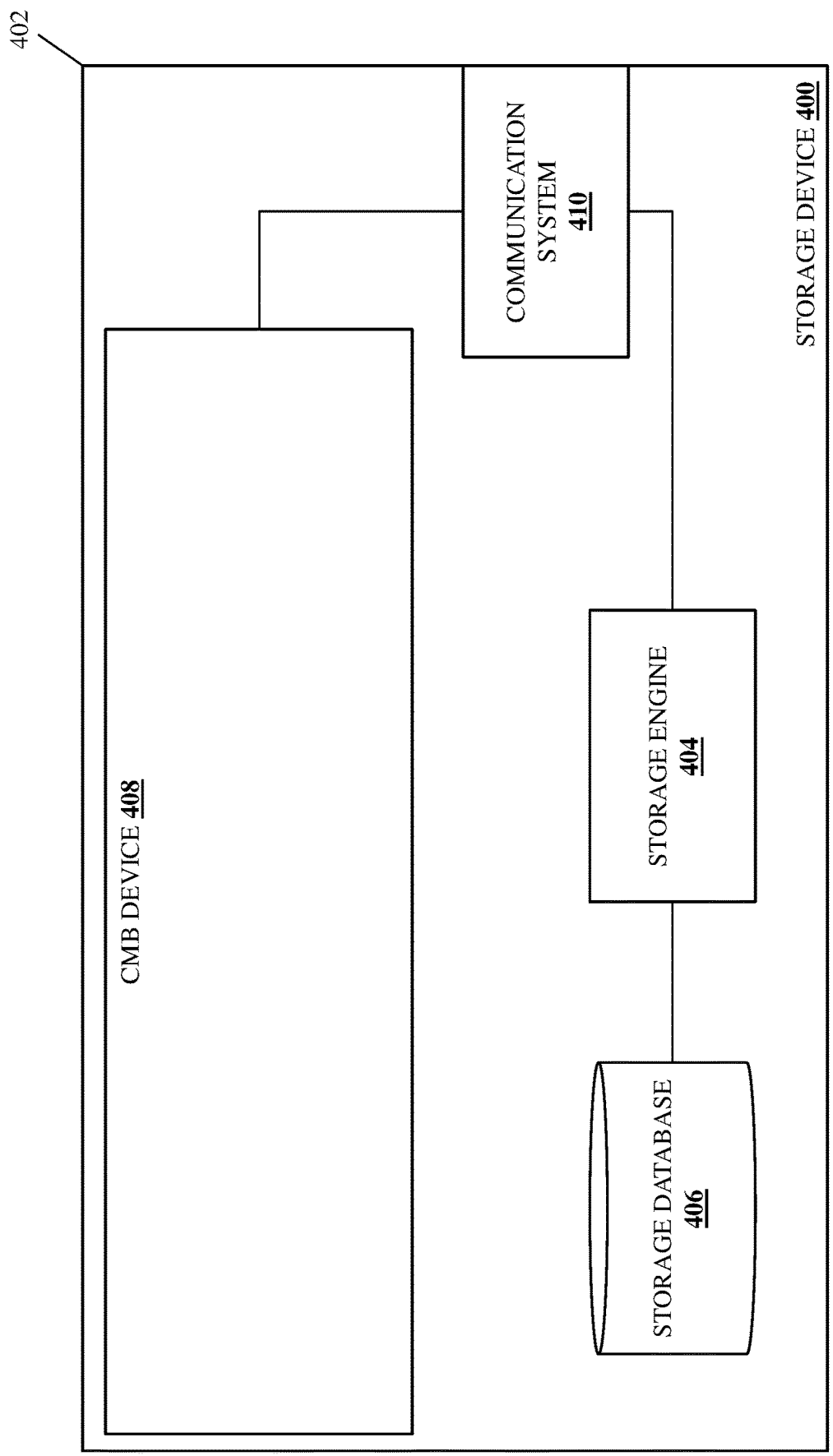

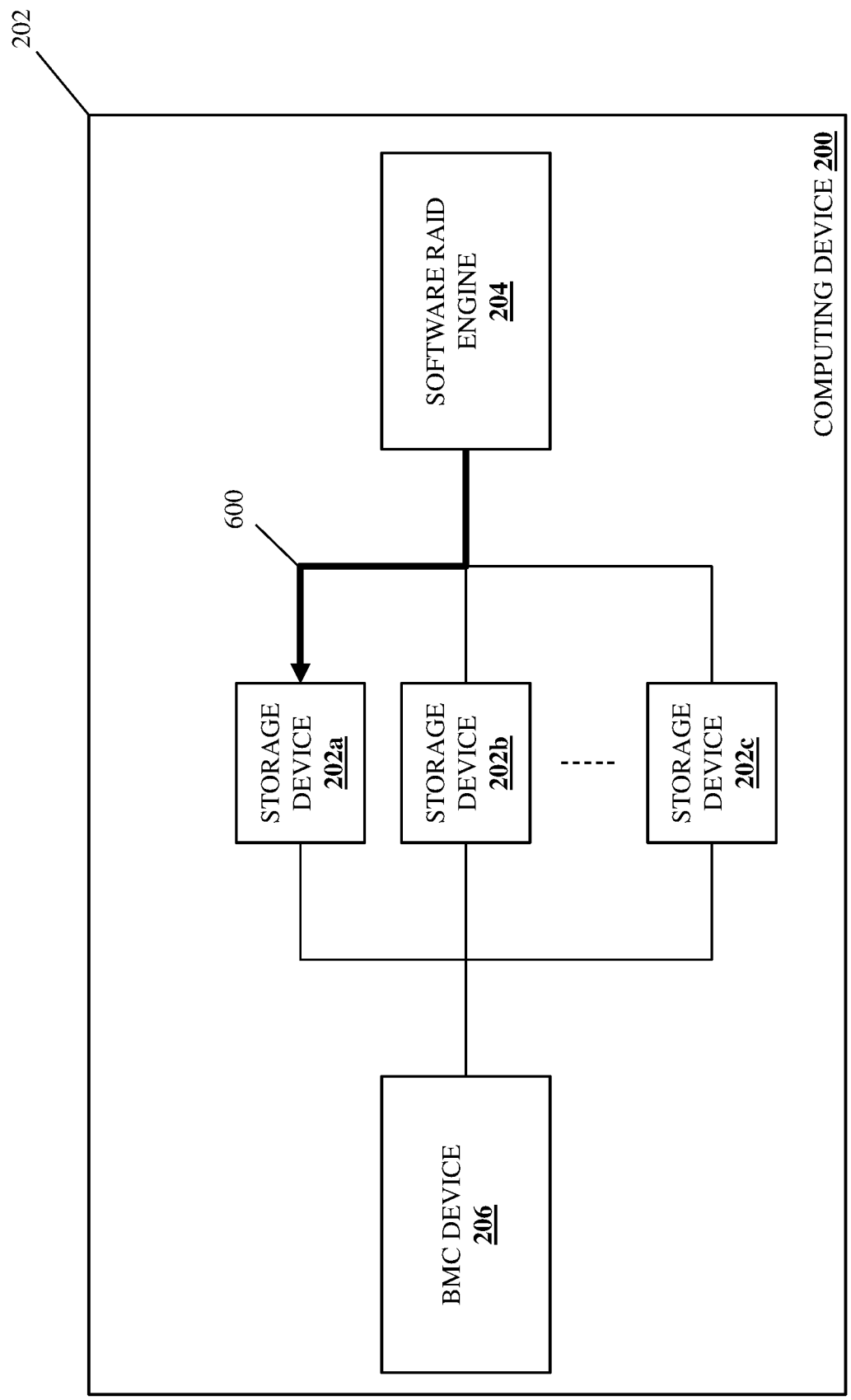

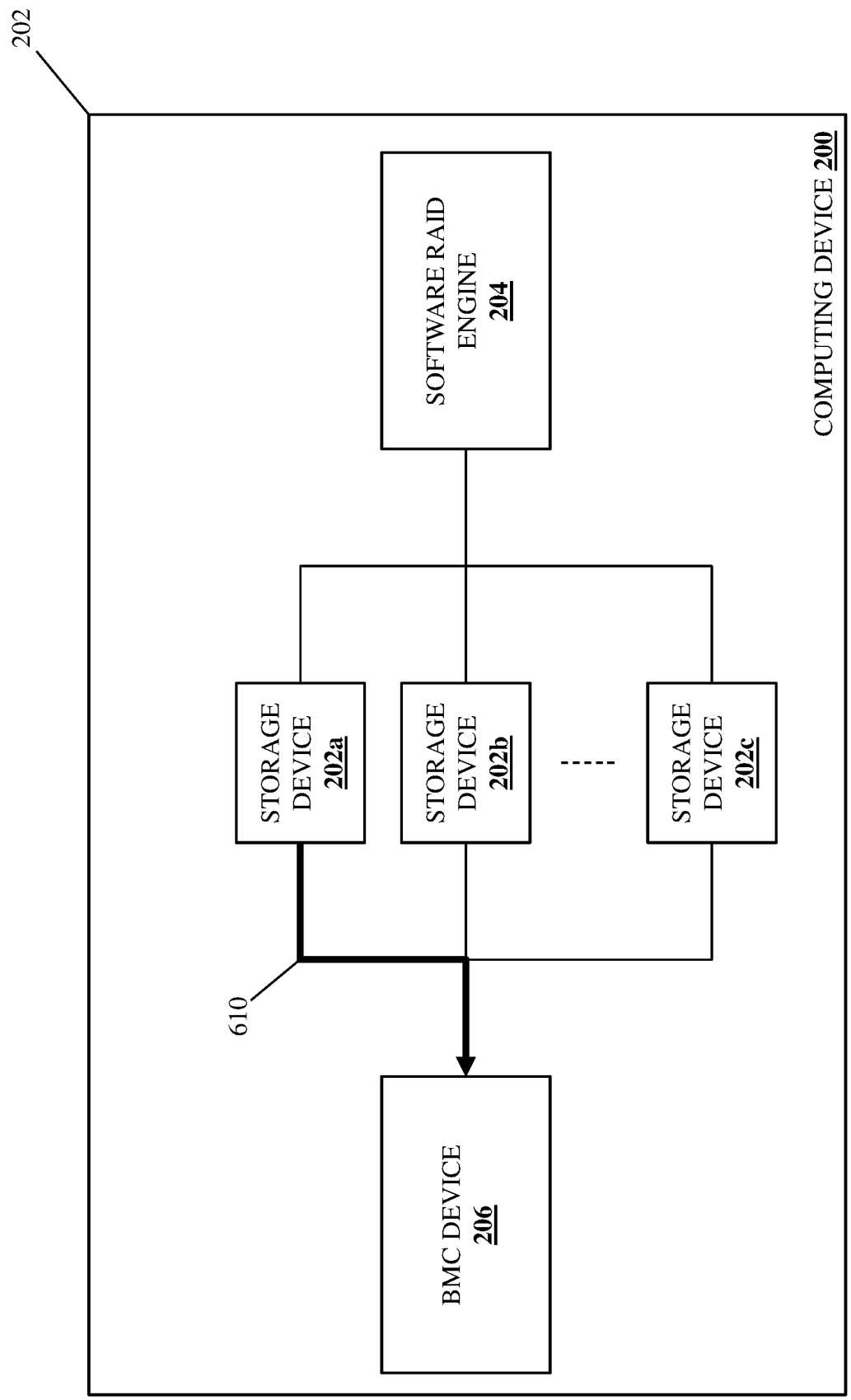

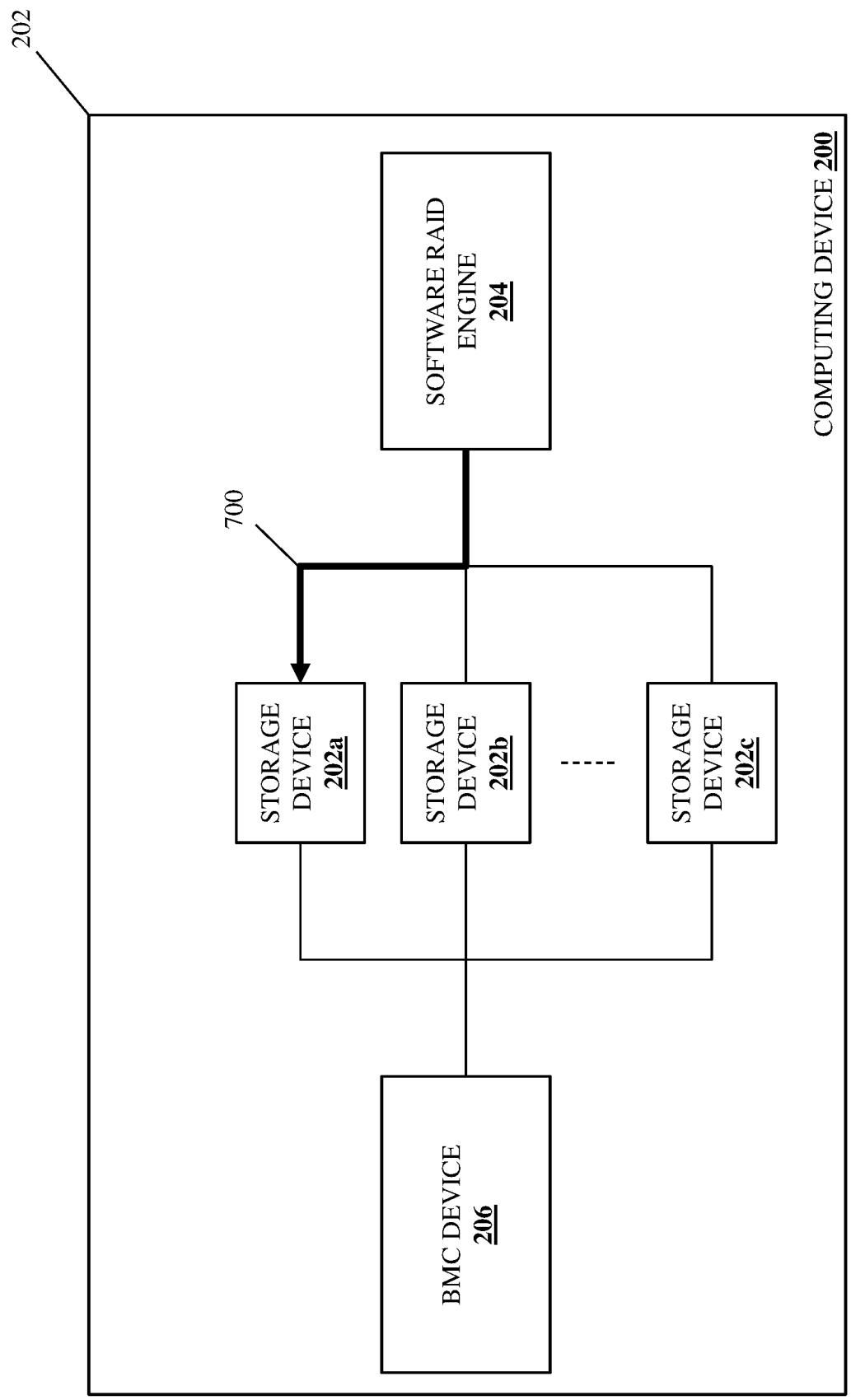

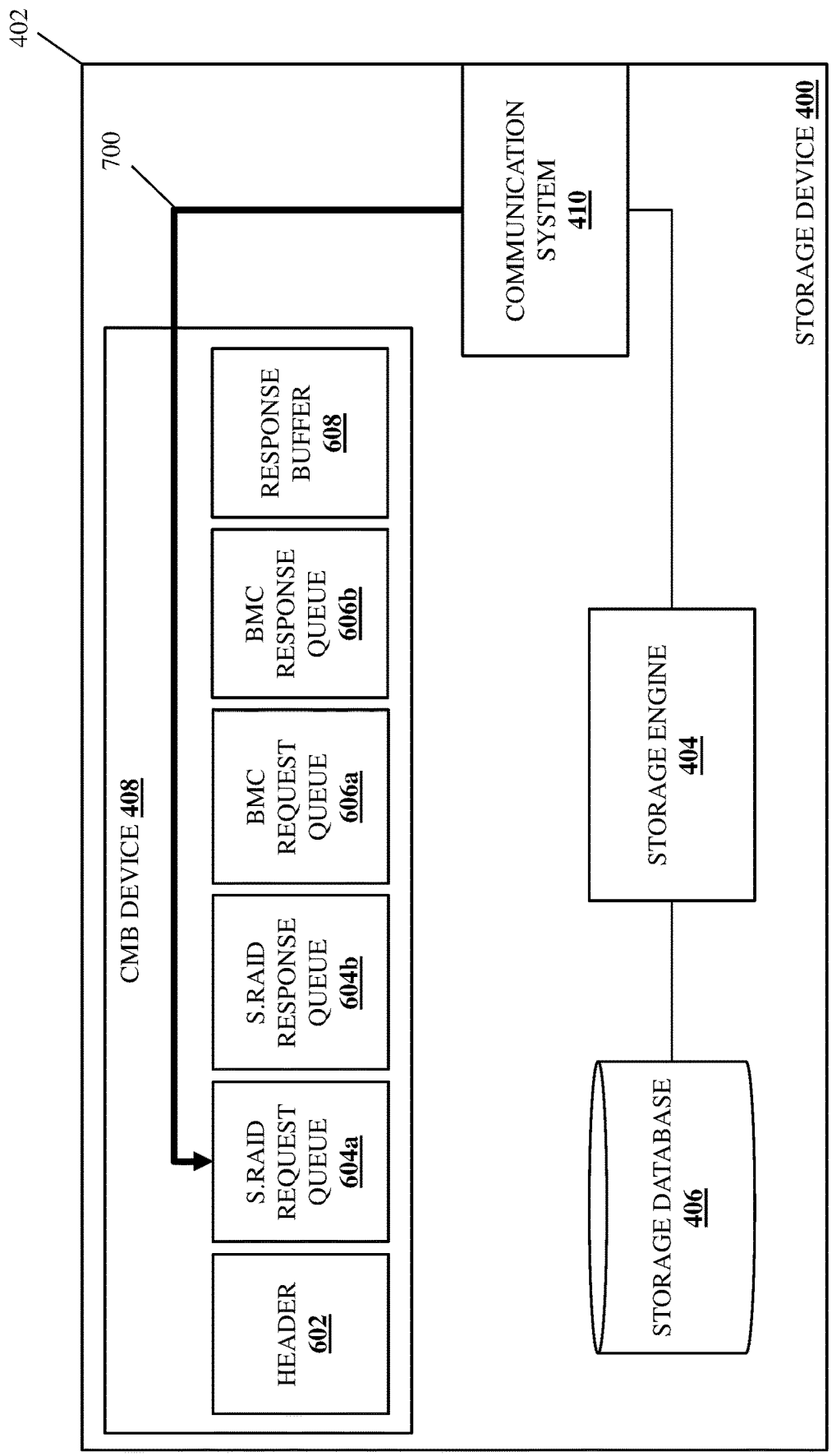

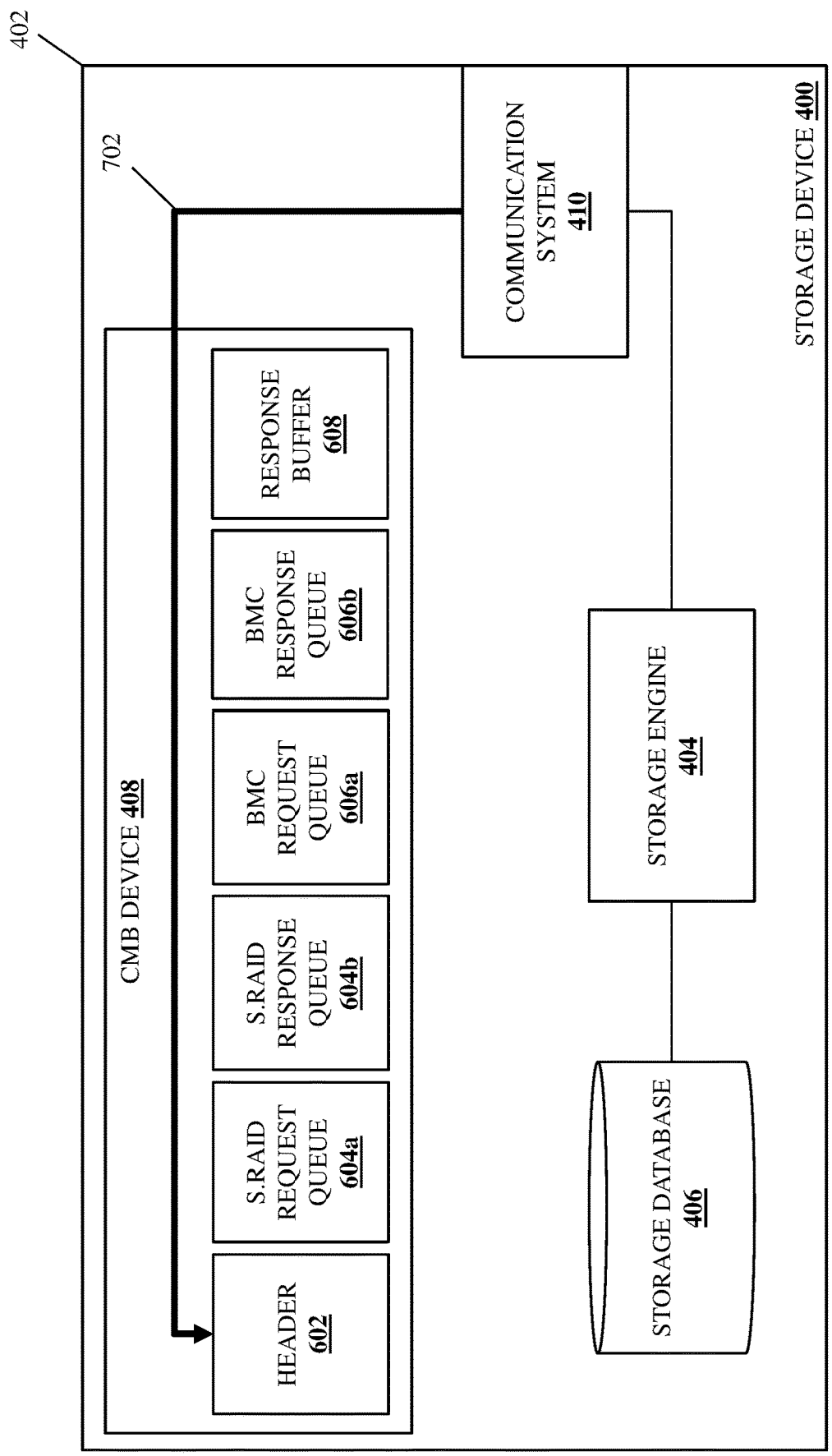

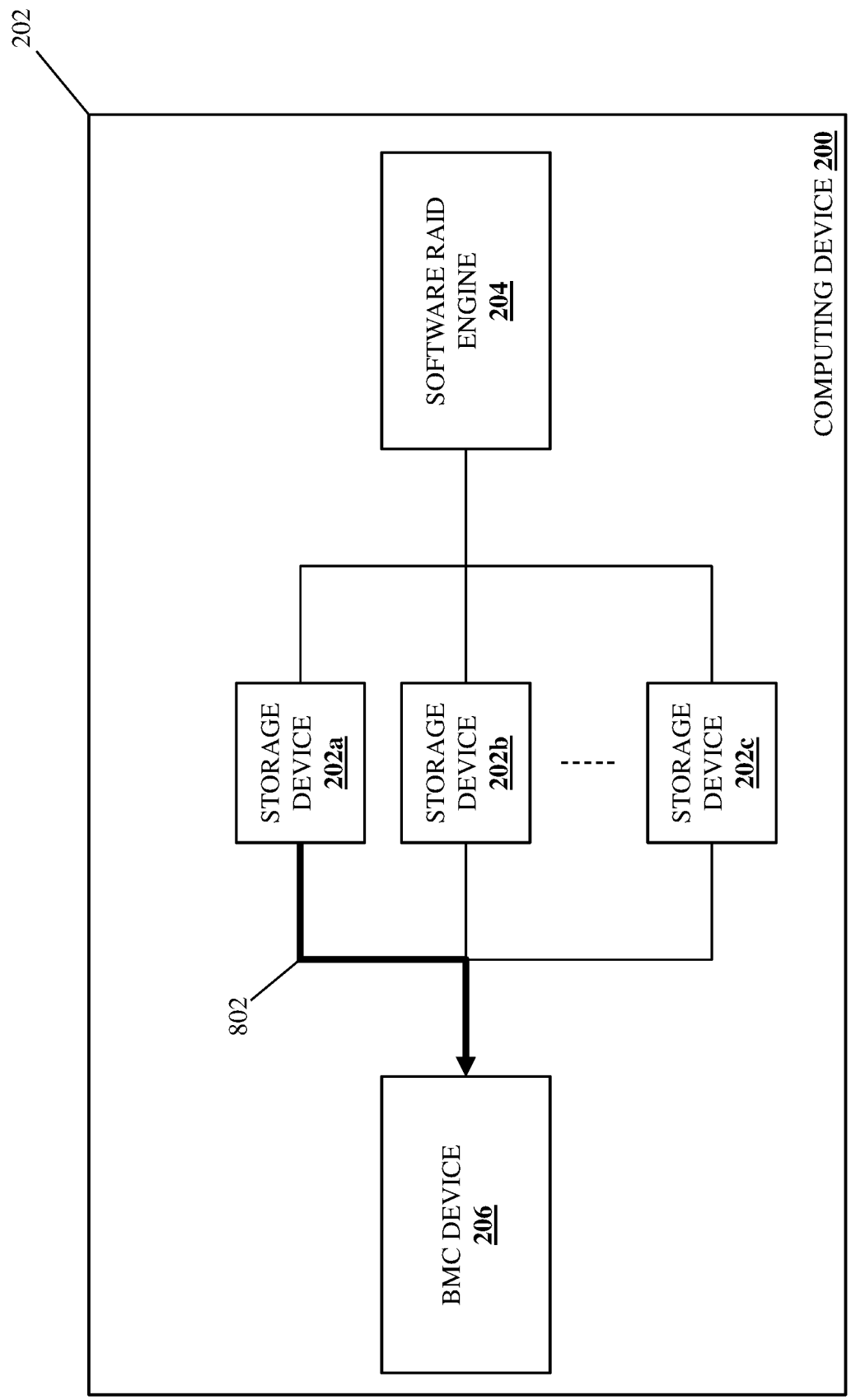

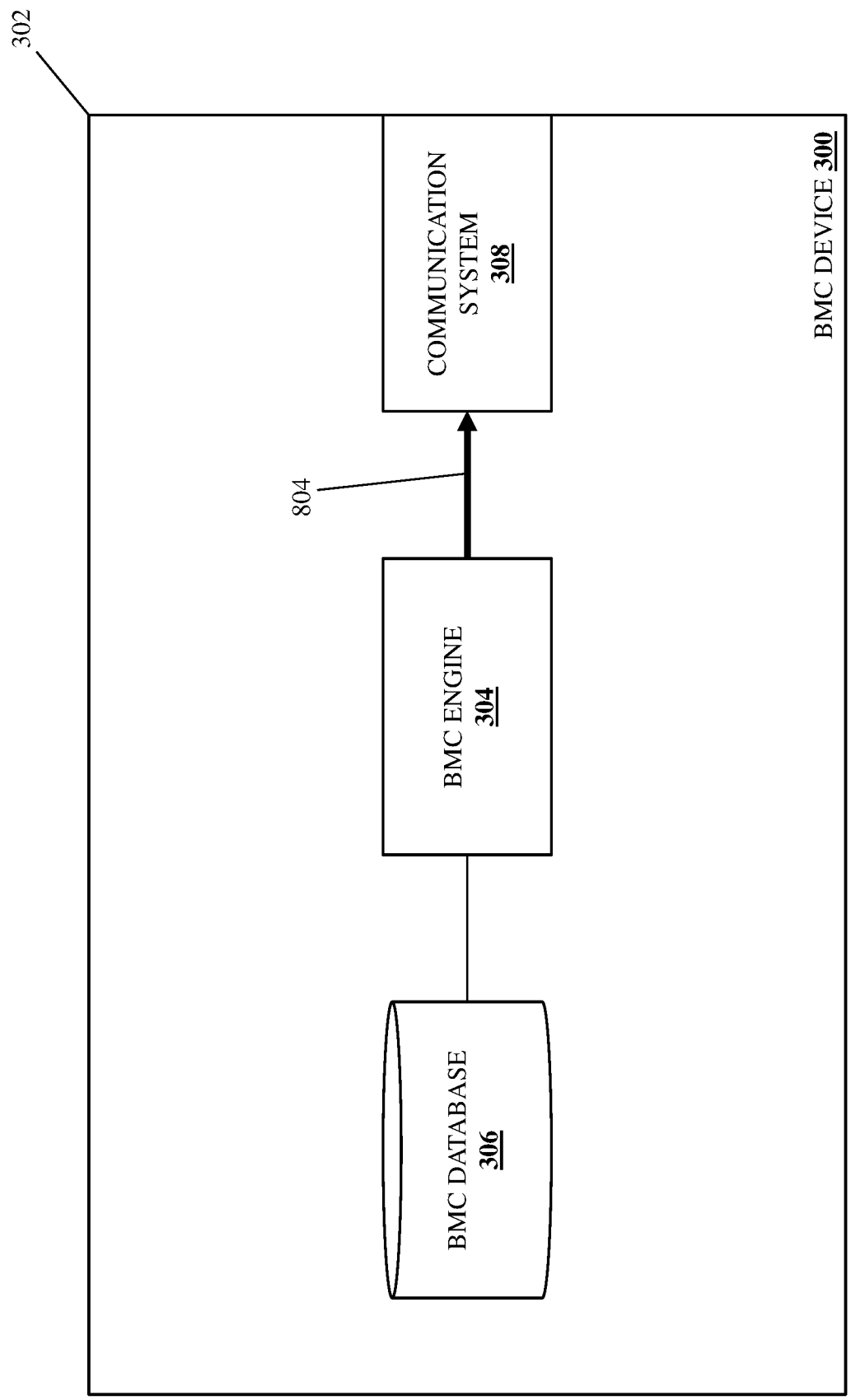

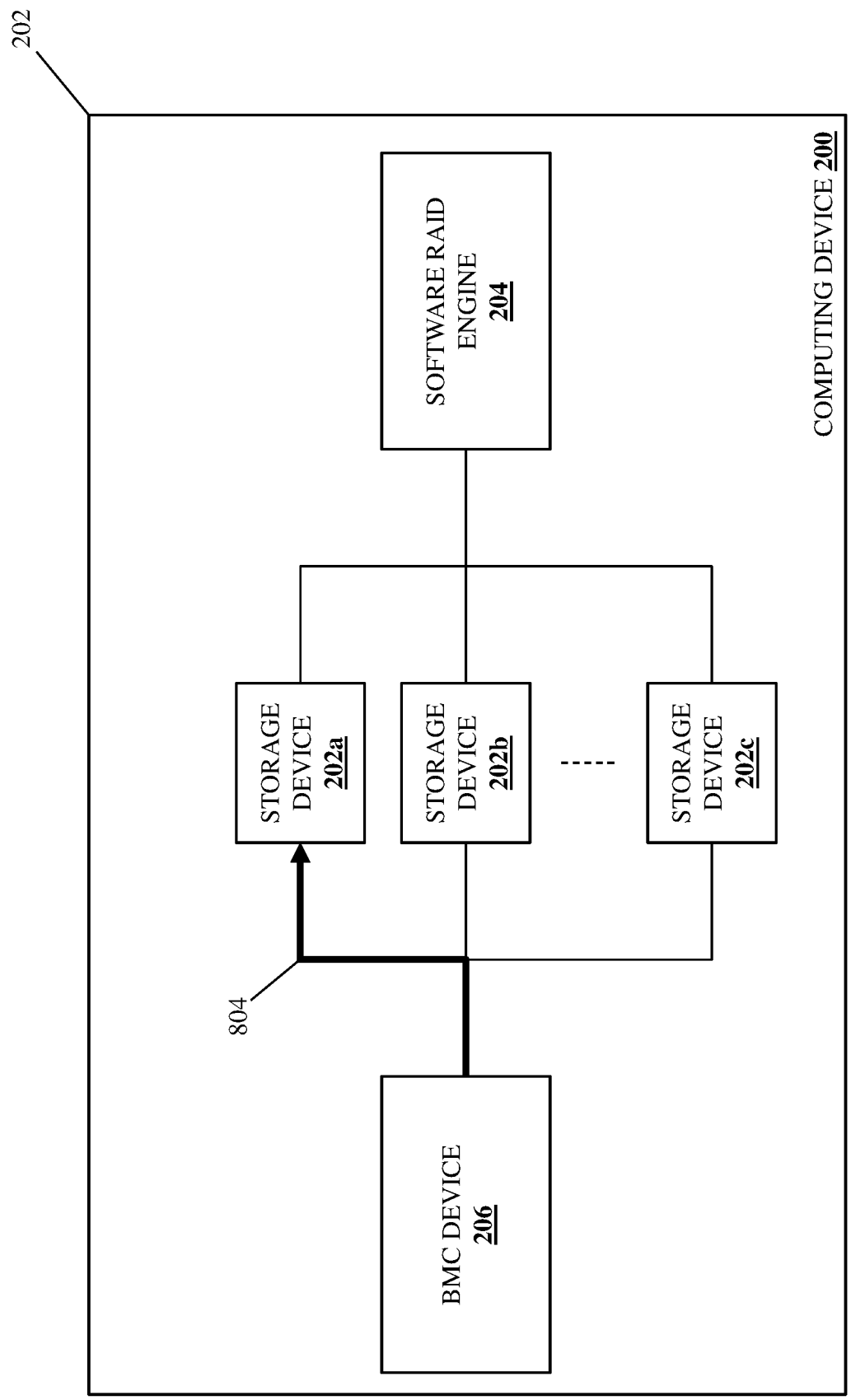

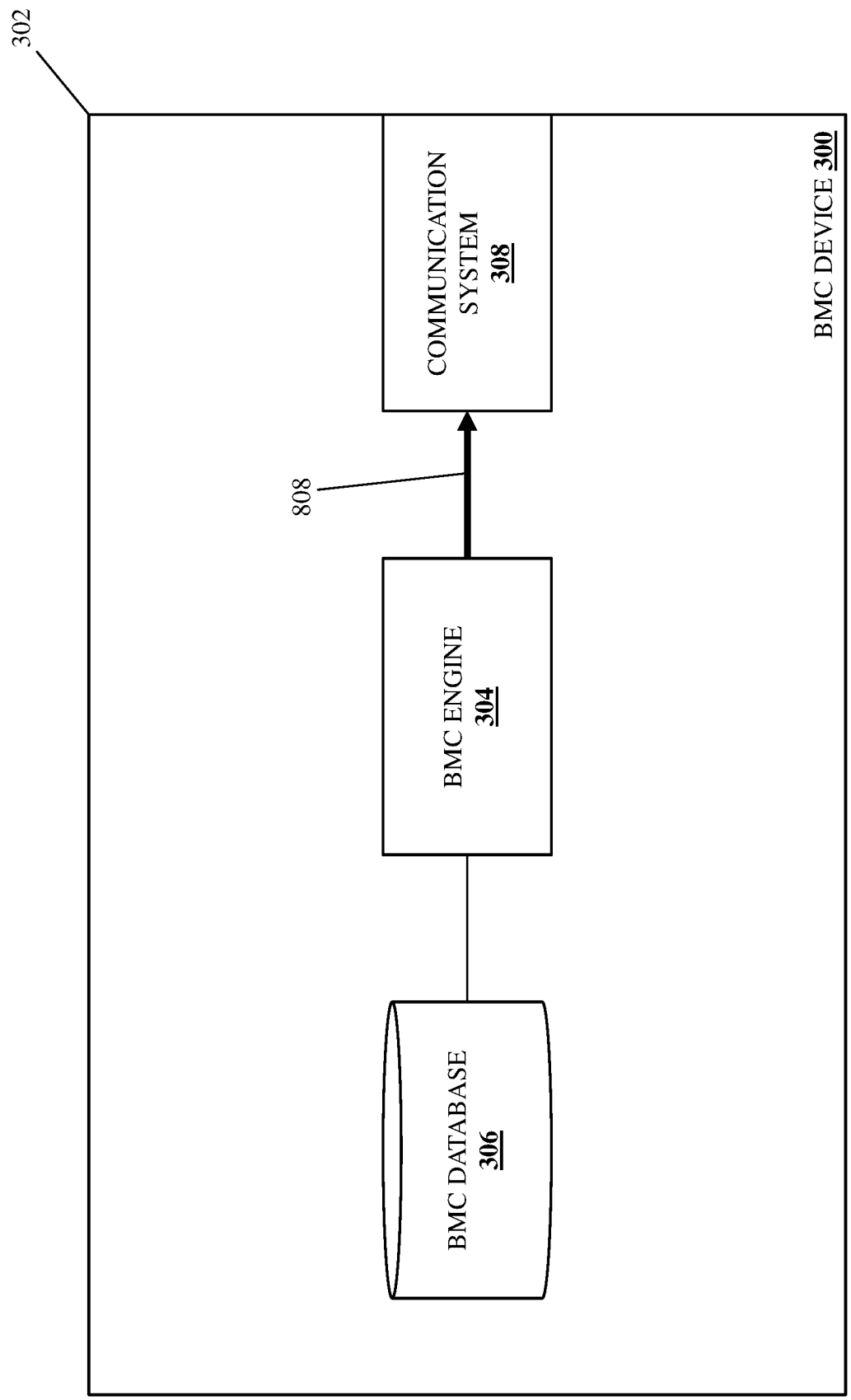

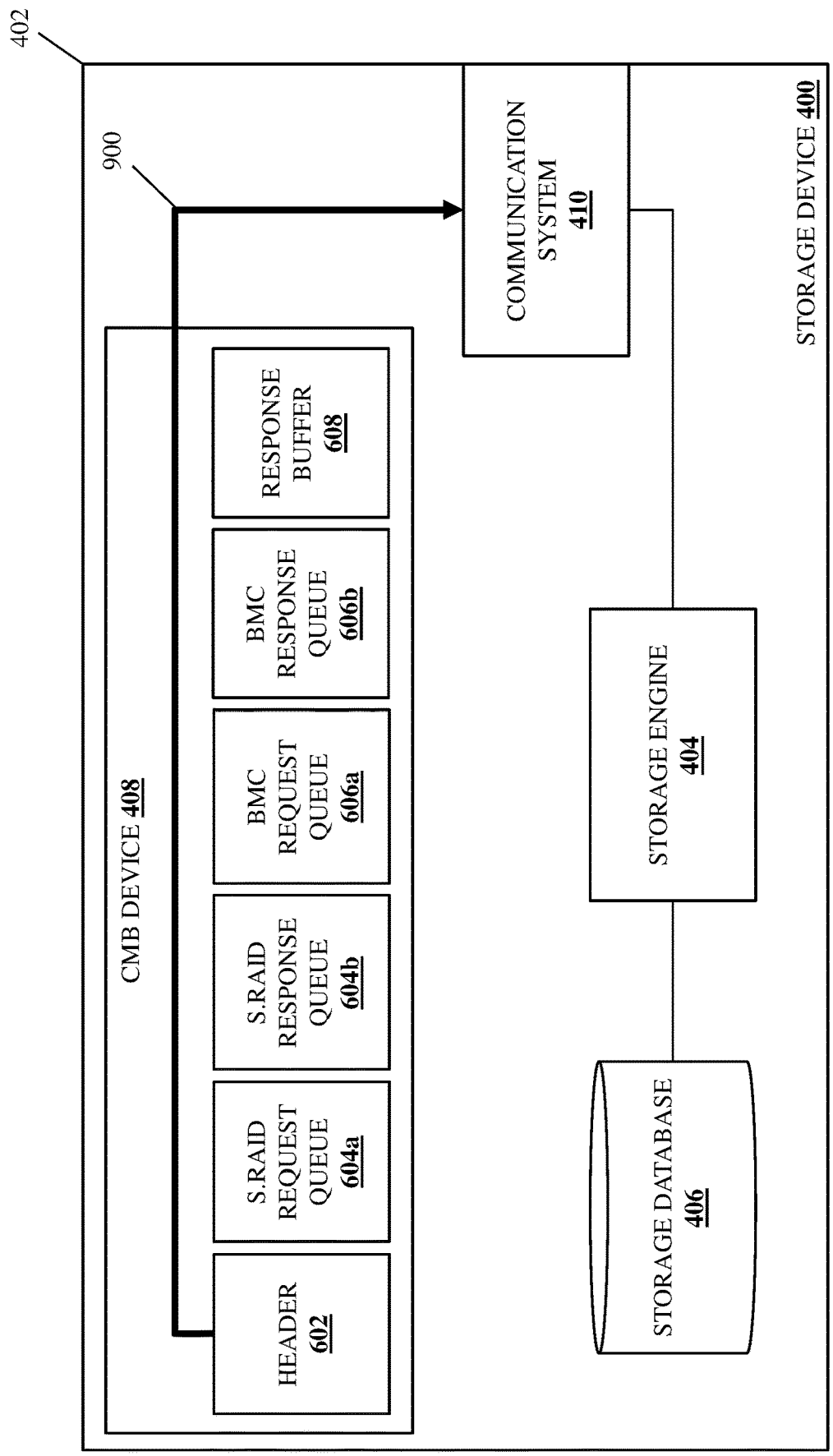

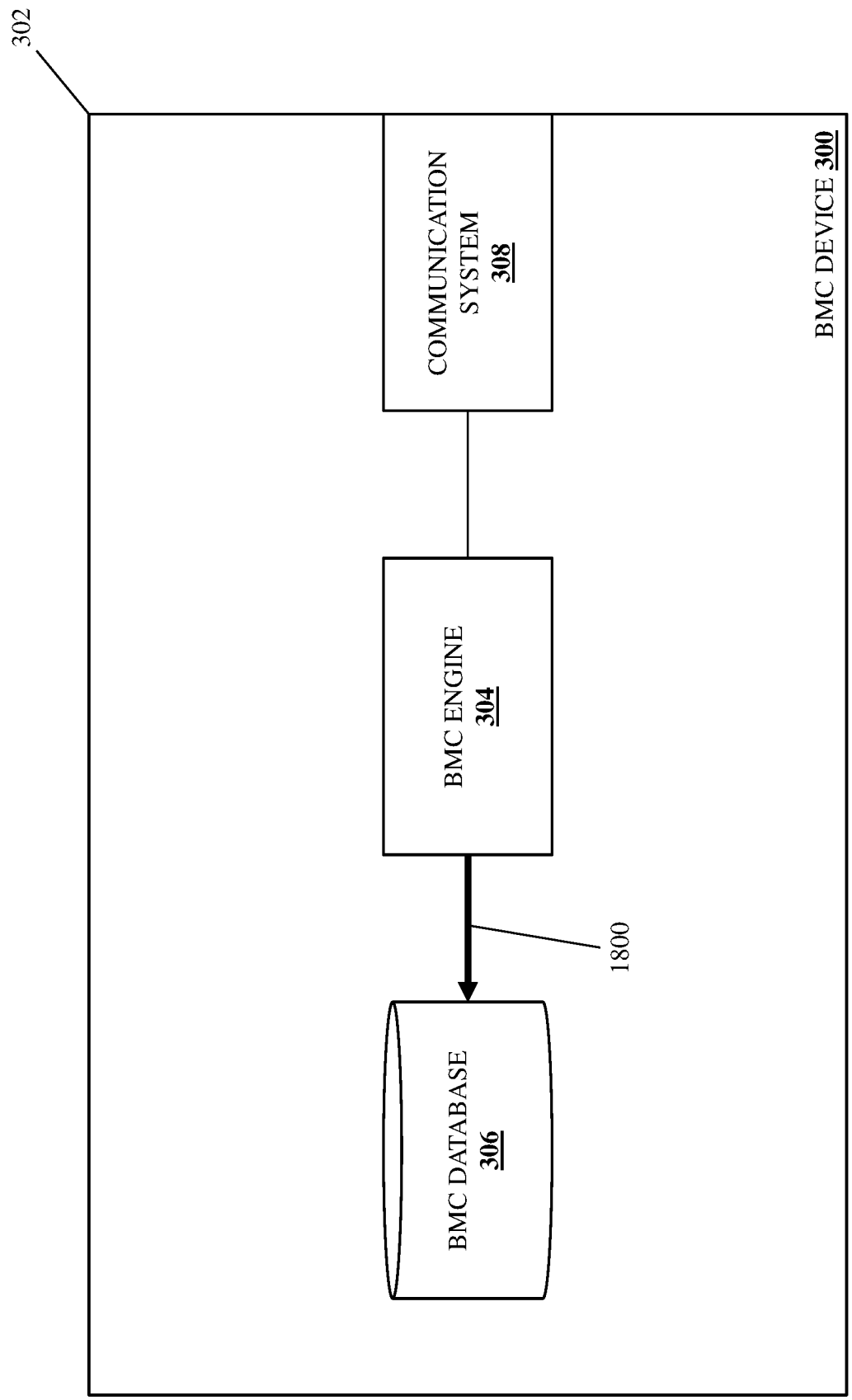

RAID INTEGRITY VERIFICATION SYSTEM

CROSS-REFERENCE TO RELATED APPLICATIONS

The present application is related to the following co-pending applications: (1) U.S. patent application Ser. No. 18/228,136, filed Jul. 31, 2023; (2) U.S. patent application Ser. No. 18/228,240, filed Jul. 31, 2023; (3) U.S. patent application Ser. No. 18/228,374, filed Jul. 31, 2023; (4) U.S. patent application Ser. No. 18/228,538, filed Jul. 31, 2023; and (5) U.S. patent application Ser. No. 18/229,360, filed Aug. 2, 2023.

BACKGROUND

The present disclosure relates generally to information handling systems, and more particularly to verifying the integrity of a Redundant Array of Independent Disk (RAID) provided in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices and/or other computing devices known in the art, sometimes include a management subsystem such as a Baseboard Management Controller (BMC) device (e.g., an integrated DELL® Remote Access Controller (iDRAC) device included in server devices provided by DELL® Inc. of Round Rock, Texas, United States) and/or other management subsystems known in the art. Furthermore, server devices are sometimes configured to provide a software Redundant Array of Independent Disk (RAID) subsystem (e.g., including a MICROSOFT® software RAID miniport driver available from MICROSOFT® Corp. of Redmond, Washington, United States; an ESXi® software RAID driver available from VMWARE® Inc. of Palo Alto, California, United States; an open-source LINUX® software RAID driver; etc.) that may be configured to utilize hardware resources in the server device (e.g., a processing system such as a Central Processing Unit (CPU) in the server device) in order to provide data storage virtualization technology and perform any of a variety of RAID operations that combine physical storage device(s) into logical storage device(s) for the purposes of data redundancy, perform improvements, and/or other RAID services that would be apparent to one of skill in the art. However, the conventional provisioning of software RAID subsystems in server devices with management systems suffers from several deficiencies.

For example, conventional software RAID subsystems and management subsystems in server devices are relatively limited in their communications. To provide a specific example, the software RAID subsystem and the management subsystem in a server device may benefit from the sharing of relatively critical real-time data such as virtual disk state changes, software RAID critical logs, software RAID initialization failures (e.g., during initialization/boot of the server device, during storage device hot plug operations, etc.), and/or other critical data known in the art, and conventional server devices do not enable the communication of such relatively critical real-time data between the software RAID subsystem and the management subsystem. As such, conventional server devices do not provide any option for a software RAID subsystem to provide software RAID subsystem logs, software RAID subsystem data, Input/Output (I/O) failures, hot-plug information, and/or other software RAID subsystem information in real-time to the management subsystem in its server device.

To provide another specific example, the software RAID subsystem may require information about storage devices that are coupled to the software RAID subsystem via a server backplane. While a System Management Basic Input/Output System (BIOS) (SMBIOS) may be used to read management information available via the BIOS in the server device such as storage device slot-related information (e.g., storage device form factor information, storage device slot length information, etc.) and/or other SMBIOS management information known in the art, the SMBIOS does not make that SMBIOS management information available in real-time, and does not make available a variety of information that would benefit the operation of the software RAID subsystem.

Furthermore, the SMBIOS is implemented according to the SMBIOS specification, and thus any changes/updates to the SMBIOS required to make further information available to the software RAID subsystem will require the relatively long time periods needed for SMBIOS specification change approval and implementation, BIOS implementation, and/or other implementation issues that would be apparent to one of skill in the art, and will then subsequently be dependent on any BIOS updates/releases. Similarly, the Intelligent Platform Management Interface (IPMI) may be used to perform management and monitoring independently of the CPU, BIOS, and operating system in the server device in order to obtain information similar to the SMBIOS management information discussed above, but suffers from similar deficiencies in that that IPMI management information is not made available in real-time, and does not make available a variety of information (e.g., Enterprise and Data Center Standard Form Factor (EDSFF) information) that would benefit the operation of the software RAID subsystem.

Accordingly, it would be desirable to provide a software RAID/management communication system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a management engine that is configured to: retrieve, from each of a plurality of storage devices that are coupled to the processing system, first Redundant Array of Independent Disk (RAID) configuration information associated with a logical storage device provided by a software RAID subsystem using the plurality of storage devices; generate, using the first RAID configuration information, a first RAID logical storage device integrity verification measurement block; retrieve, from each of the plurality of storage devices that are coupled to the processing system subsequent to generating the first RAID logical storage device integrity verification measurement block, second RAID configuration information associated with the logical storage device; generate, using the second RAID configuration information, a second RAID logical storage device integrity verification measurement block; and determine that the second RAID logical storage device integrity verification measurement block does not match the first RAID logical storage device integrity verification measurement block and, in response, perform at least one RAID logical storage device integrity remediation operation.

BRIEF DESCRIPTION OF THE DRAWINGS

FIG. 4 is a schematic view illustrating an embodiment of a storage device may be included in the computing device of FIG. 2.

FIG. 6A is a schematic view illustrating an embodiment of the operation of the computing device of FIG. 2 during the method of FIGS. 5A and 5B.

FIG. 6C is a schematic view illustrating an embodiment of the operation of the computing device of FIG. 2 during the method of FIGS. 5A and 5B.

FIG. 7A is a schematic view illustrating an embodiment of the operation of the computing device of FIG. 2 during the method of FIGS. 5A and 5B.

FIG. 7B is a schematic view illustrating an embodiment of the operation of the storage device of FIG. 4 during the method of FIGS. 5A and 5B.

FIG. 7D is a schematic view illustrating an embodiment of the operation of the storage device of FIG. 4 during the method of FIGS. 5A and 5B.

FIG. 8E is a schematic view illustrating an embodiment of the operation of the computing device of FIG. 2 during the method of FIGS. 5A and 5B.

FIG. 8G is a schematic view illustrating an embodiment of the operation of the management subsystem of FIG. 3 during the method of FIGS. 5A and 5B.

FIG. 8H is a schematic view illustrating an embodiment of the operation of the computing device of FIG. 2 during the method of FIGS. 5A and 5B.

FIG. 8M is a schematic view illustrating an embodiment of the operation of the management subsystem of FIG. 3 during the method of FIGS. 5A and 5B.

FIG. 9B is a schematic view illustrating an embodiment of the operation of the storage device of FIG. 4 during the method of FIGS. 5A and 5B.

FIG. 18 is a schematic view illustrating an embodiment of the operation of the management subsystem of FIG. 3 during the method of FIG. 10.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
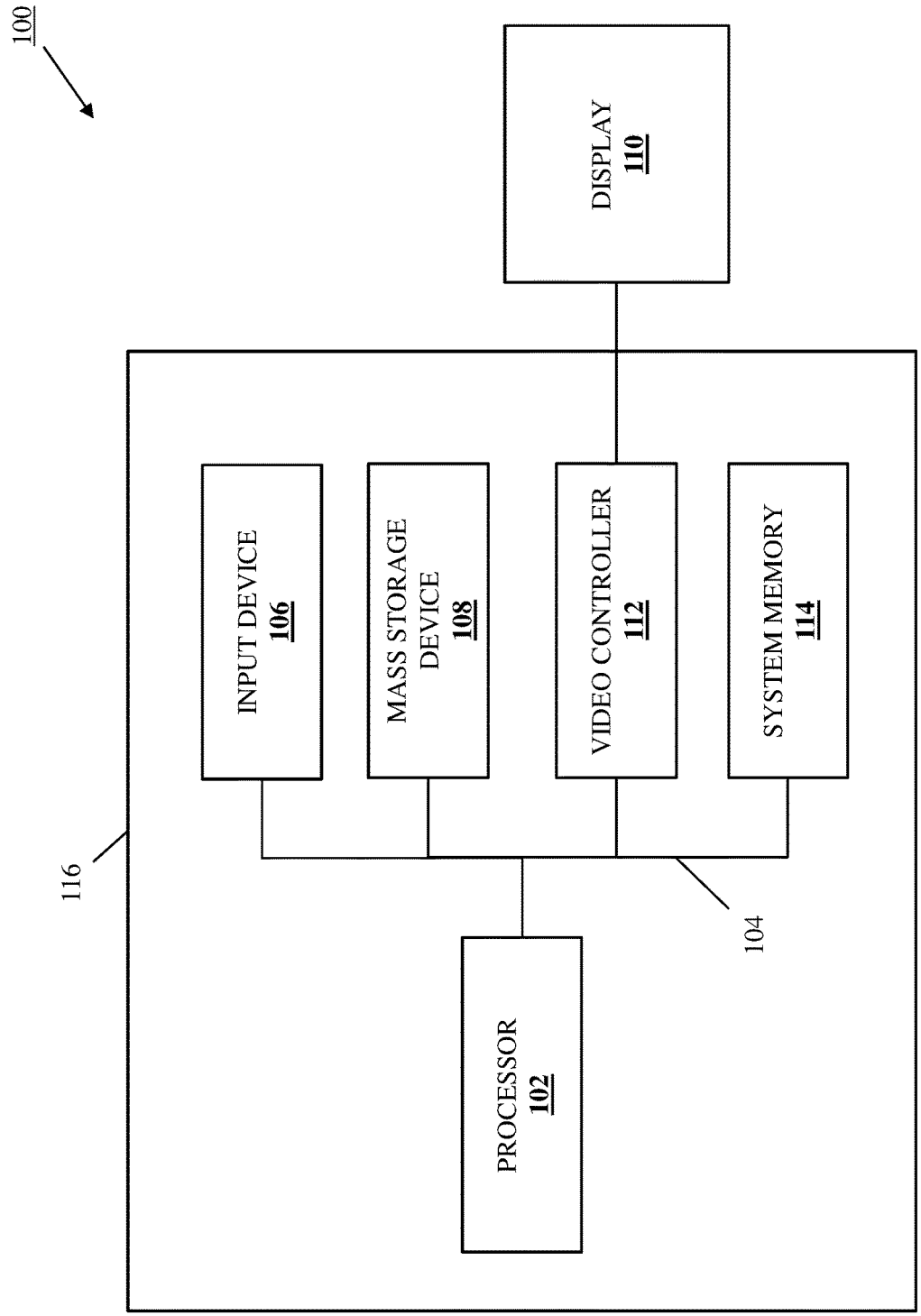
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
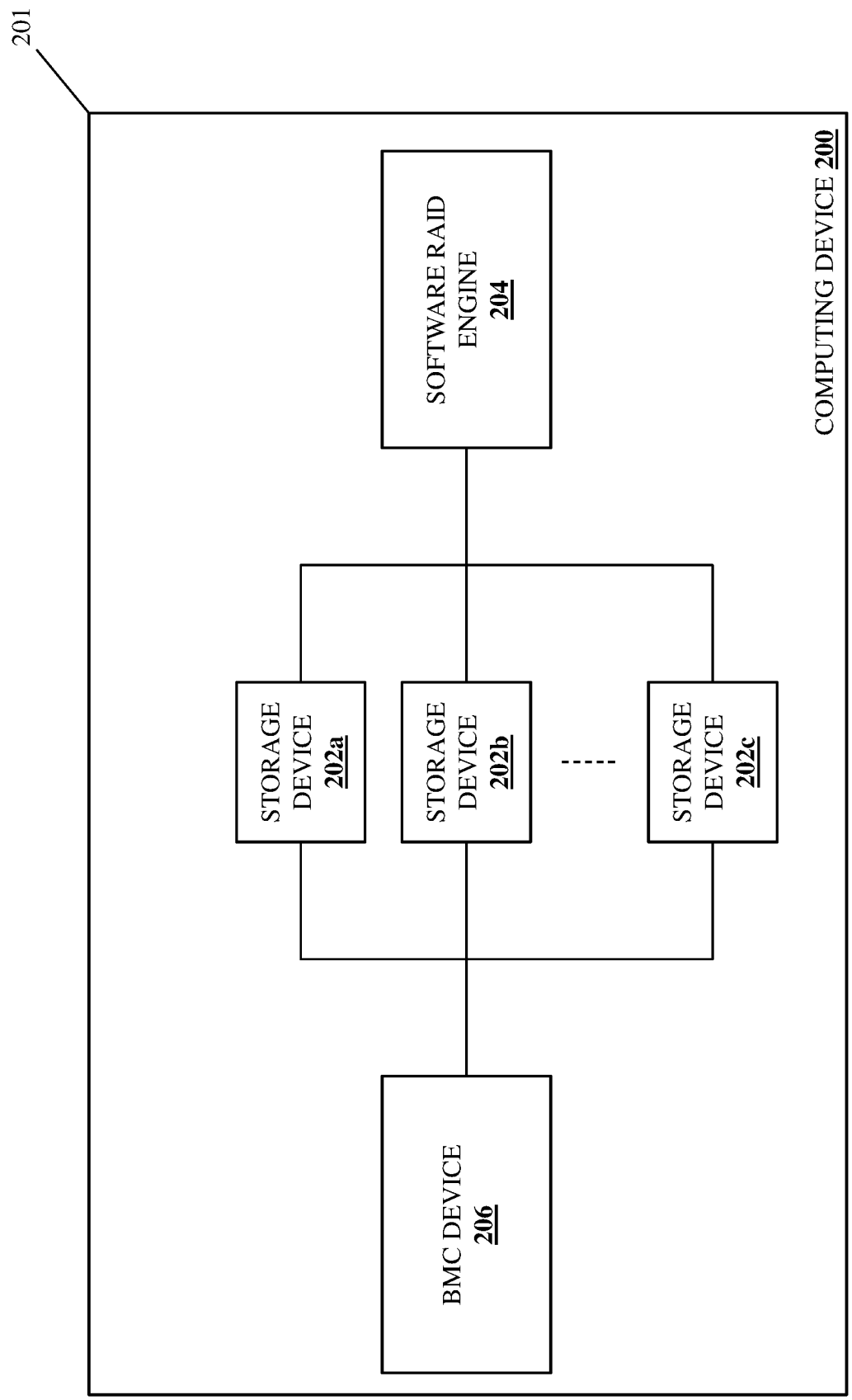
FIG. 2 is a schematic view illustrating an embodiment of a computing device that may provide the software RAID/management communication system of the present disclosure.

Referring now to FIG. 2, an embodiment of a computing device 200 is illustrated that may provide the software RAID/management communication system of the present disclosure. In an embodiment, the computing device 200 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the functionality of the computing device 200 discussed below may be provided by other devices that are configured to operate similarly as the computing device 200 discussed below. In the illustrated embodiment, the computing device 200 includes a chassis 201 that houses the components of the computing device 200, only some of which are illustrated and described below.

In the embodiments illustrated and described below, the chassis 201 houses a plurality of storage devices 202a, 202b, and up to 202c. However, while a plurality of storage devices 202a-202c are illustrated and described, one of skill in the art in possession of the present disclosure will appreciate how embodiments in which a single storage device is provided in the computing device 200 will fall within the scope of the present disclosure as well. In a specific example, the storage devices 202a-202c may be provided by Non-Volatile Memory express (NVMe) storage devices, although one of skill in the art in possession of the present disclosure will appreciate how other types of storage devices (and/or other types of devices with memory subsystem similar to the storage device memory subsystems described below) may allow for the software RAID/management communication functionality described below, and thus will fall within the scope of the present disclosure as well.

The chassis 201 may also house a processing system (not illustrated, but which may include the processor 102 (e.g., a Central Processing Unit (CPU)) discussed above with reference to FIG. 1) and a memory system (not illustrated, but which may include the memory 114 (e.g., Dynamic Random Access Memory (DRAM)) discussed above with reference to FIG. 1) that is coupled to the processing system and that includes instructions that, when executed by the processing system, cause the processing system to provide a software RAID engine 204 that is configured to perform the functionality of the software RAID engines, software RAID subsystems, and/or computing devices discussed below. As illustrated, the software RAID engine 204 is coupled to each of the storage devices 202a-202c (e.g., via a coupling between the processing system and the storage devices 202a-202c).

To provide a specific example, the software RAID engine 204 may be provided by dedicated hardware in the computing device 200 (e.g., a software RAID processing system and software RAID memory system) and may be configured to provide data storage virtualization technology and perform any of a variety of RAID operations that combine physical storage device(s) (e.g., the storage devices 202a-202c) into logical storage device(s) for the purposes of data redundancy, perform improvements, and/or other RAID services that would be apparent to one of skill in the art. However, the inventors of the present disclosure are developing a software RAID engine that may be included in an operating system provided in a computing device, and thus software RAID engines integrated into an operating system provided by a CPU and DRAM in the computing device 200 are envisioned as falling within the scope of the present disclosure as well. However, while a specific software RAID engine and software RAID functionality has been described, one of skill in the art in possession of the present disclosure will appreciate how the software RAID engine of the present disclosure may be provided in a variety of manners to perform a variety of software RAID functionality while remaining within the scope of the present disclosure as well.

The chassis 201 may also house a management subsystem that, in the illustrated embodiment, is provided by a Baseboard Management Controller (BMC) device 206 such as, for example, an integrated DELL® Remote Access Controller (iDRAC) device that is included in server devices available from DELL® Inc. of Round Rock, Texas, United States, and that is configured to provide an out-of-band management platform that utilizes resources that are primarily separate from the resources of the server device, and may provide a browser-based interface and/or Command Line Interface (CLI) for managing and monitoring hardware in the server device. As illustrated, the BMC device 206 is coupled to each of the storage devices 202a-202c. However, while a specific management subsystem is illustrated and described, one of skill in the art in possession of the present disclosure will appreciate how other management subsystems will fall within the scope of the present disclosure as well. Furthermore, while a specific computing device 200 has been illustrated and described, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the software RAID/management communication functionality discussed below, while remaining within the scope of the present disclosure as well.

Figure 3:
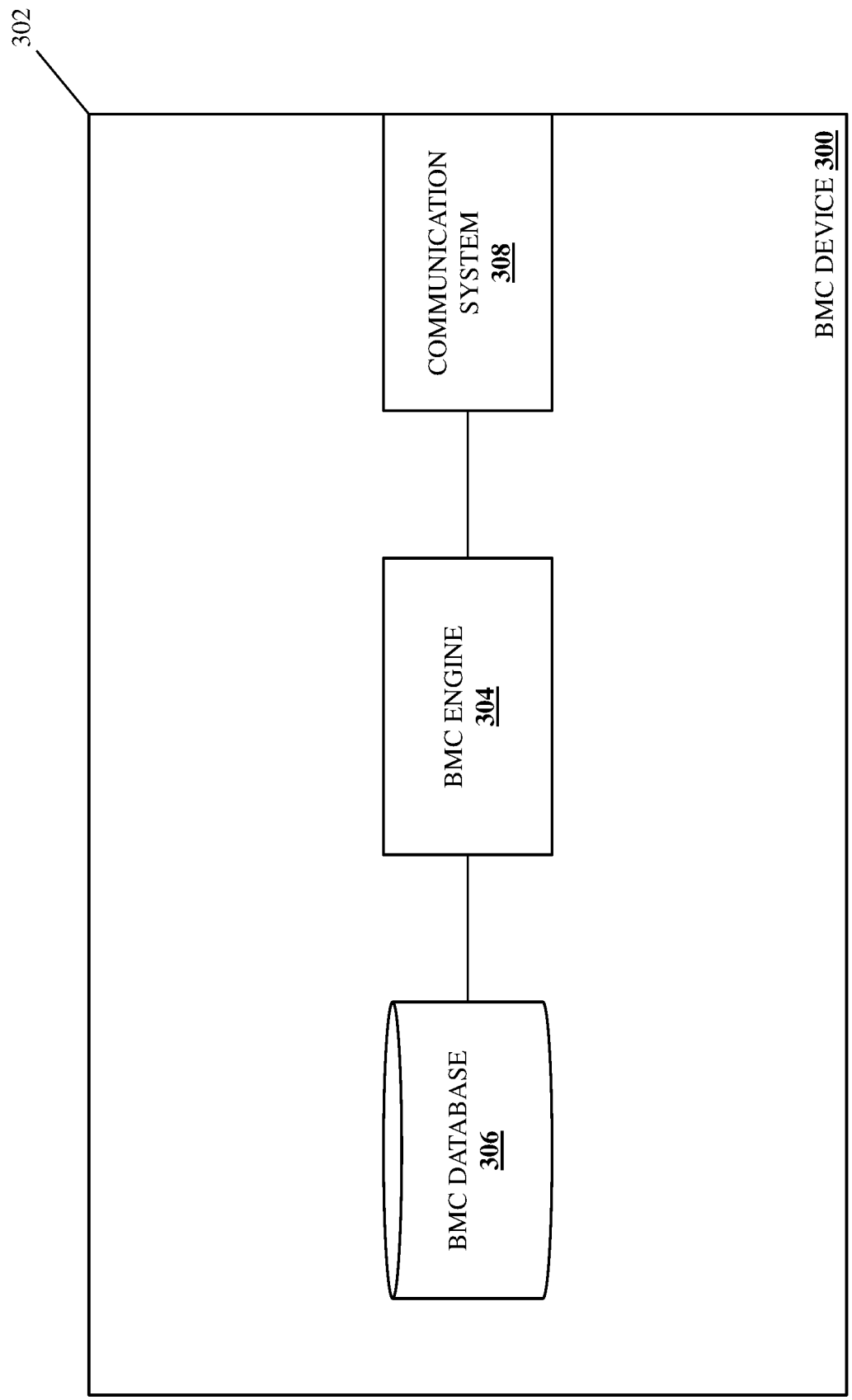
FIG. 3 is a schematic view illustrating an embodiment of a management subsystem that may be included in the computing device of FIG. 2.

Referring now to FIG. 3, an embodiment of a Baseboard Management Controller (BMC) device 300 is illustrated that may provide the BMC device 206 discussed above with reference to FIG. 2. As such, the BMC device 300 may be provided by the IHS 100 discussed above with reference to FIG. 1 and/or may include some or all of the components of the IHS 100, and in specific example, may be provided by the iDRAC device described above. Furthermore, while illustrated and discussed as being provided by a BMC device/iDRAC device, one of skill in the art in possession of the present disclosure will recognize that the functionality of the BMC device 300 discussed below may be provided by other management subsystems that are configured to operate similarly as the BMC device 300 discussed below. In the illustrated embodiment, the BMC device 300 includes a chassis 302 that supports the components of the BMC device 300, only some of which are illustrated and described below. For example, the chassis 302 may support a BMC processing system (not illustrated, but which may be similar to the processor 102 discussed above with reference to FIG. 1) and a BMC memory system (not illustrated, but which may be similar to the memory 114 discussed above with reference to FIG. 1) that is coupled to the BMC processing system and that includes instructions that, when executed by the BMC processing system, cause the BMC processing system to provide a BMC engine 304 that is configured to perform the functionality of the BMC engines, management subsystems, and/or BMC devices discussed below.

The chassis 302 may also house a storage system (not illustrated, but which may include the storage 108 discussed above with reference to FIG. 1) that is coupled to the BMC engine 304 (e.g., via a coupling between the storage system and the processing system) and that includes a BMC database 306 that is configured to store any of the information utilized by the BMC engine 304 discussed below. The chassis 302 may also house a communication system 308 that is coupled to the BMC engine 304 (e.g., via a coupling between the communication system 308 and the BMC processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific BMC device 300 has been illustrated and described, one of skill in the art in possession of the present disclosure will recognize that management subsystems (or other devices operating according to the teachings of the present disclosure in a manner similar to that described below for the BMC device 300) may include a variety of components and/or component configurations for providing conventional management device functionality, as well as the software RAID/management communication functionality discussed below, while remaining within the scope of the present disclosure as well.

Referring now to FIG. 4, an embodiment of a storage device 400 is illustrated that may provide any or each of the storage devices 202a-202c discussed above with reference to FIG. 2. As such, the storage device 400 may be provided by an NVMe storage device in specific examples. However, while illustrated and discussed as being provided by an NVMe storage device, one of skill in the art in possession of the present disclosure will recognize that the functionality of the storage device 400 discussed below may be provided by other types of devices that are configured to operate similarly as the storage device 400 discussed below in order to allow for the software RAID/management communication functionality described below. In the illustrated embodiment, the storage device 400 includes a chassis 402 that houses the components of the storage device 400, only some of which are illustrated and described below.

For example, the chassis 402 may house a storage processing system (not illustrated, but which may be similar to the processor 102 discussed above with reference to FIG. 1 and may be included in a storage controller device) and a storage memory system (not illustrated, but which may be similar to the memory 114 discussed above with reference to FIG. 1 and may be included in a storage controller device) that is coupled to the storage processing system and that includes instructions that, when executed by the storage processing system, cause the storage processing system to provide a storage engine 404 that is configured to perform any of a variety of conventional storage functionality (e.g., NVMe storage functionality) that would be apparent to one of skill in the art in possession of the present disclosure, as well as any of the functionality of the storage engines and/or storage devices described below. The chassis 402 may also house a storage subsystem (not illustrated, but which may be similar to the storage 108 discussed above with reference to FIG. 1) that is coupled to the storage engine 404 (e.g., via a coupling between the storage subsystem and the storage processing system) and that includes a storage database 406 that is configured to store any of the information utilized by the storage engine 404 discussed below.

The chassis 402 may also house a storage device memory subsystem that, in the embodiments illustrated and described below, is provided by a Controller Memory Buffer (CMB) device 408 in an NVMe storage device that is conventionally utilized by a host in a server device to provide Input/Output (I/O) commands for the NVMe storage device in a controller memory subsystem of an NVMe controller in that NVMe storage device, to perform Direct Memory Access (DMA) operations, to store non-persistent data, and/or provide other CMB functionality known in the art, and one of skill in the art in possession of the present disclosure with appreciate how the CMB device 408 may be configured for use with general purpose memory read/write operations to provide those I/O commands. However, while illustrated and described as being provided by a CMB device, one of skill in the art in possession of the present disclosure will appreciate how other memory subsystems in other devices may be utilized to enable the software RAID/management communication functionality described below, and thus will fall within the scope of the present disclosure as well.

The chassis 402 may also house a communication system 410 that is coupled to the storage engine 404 (e.g., via a coupling between the communication system 408 and the processing system) and the CMB device 408 and that may be provided by any of a variety of storage device communication components that would be apparent to one of skill in the art in possession of the present disclosure. However, while a specific storage device 400 has been illustrated and described, one of skill in the art in possession of the present disclosure will recognize that other types of storage devices (or other types of devices operating according to the teachings of the present disclosure in a manner similar to that described below for the storage device 400) may include a variety of components and/or component configurations for providing conventional device functionality, as well as the software RAID/management communication functionality discussed below, while remaining within the scope of the present disclosure as well.

Figure 5A:
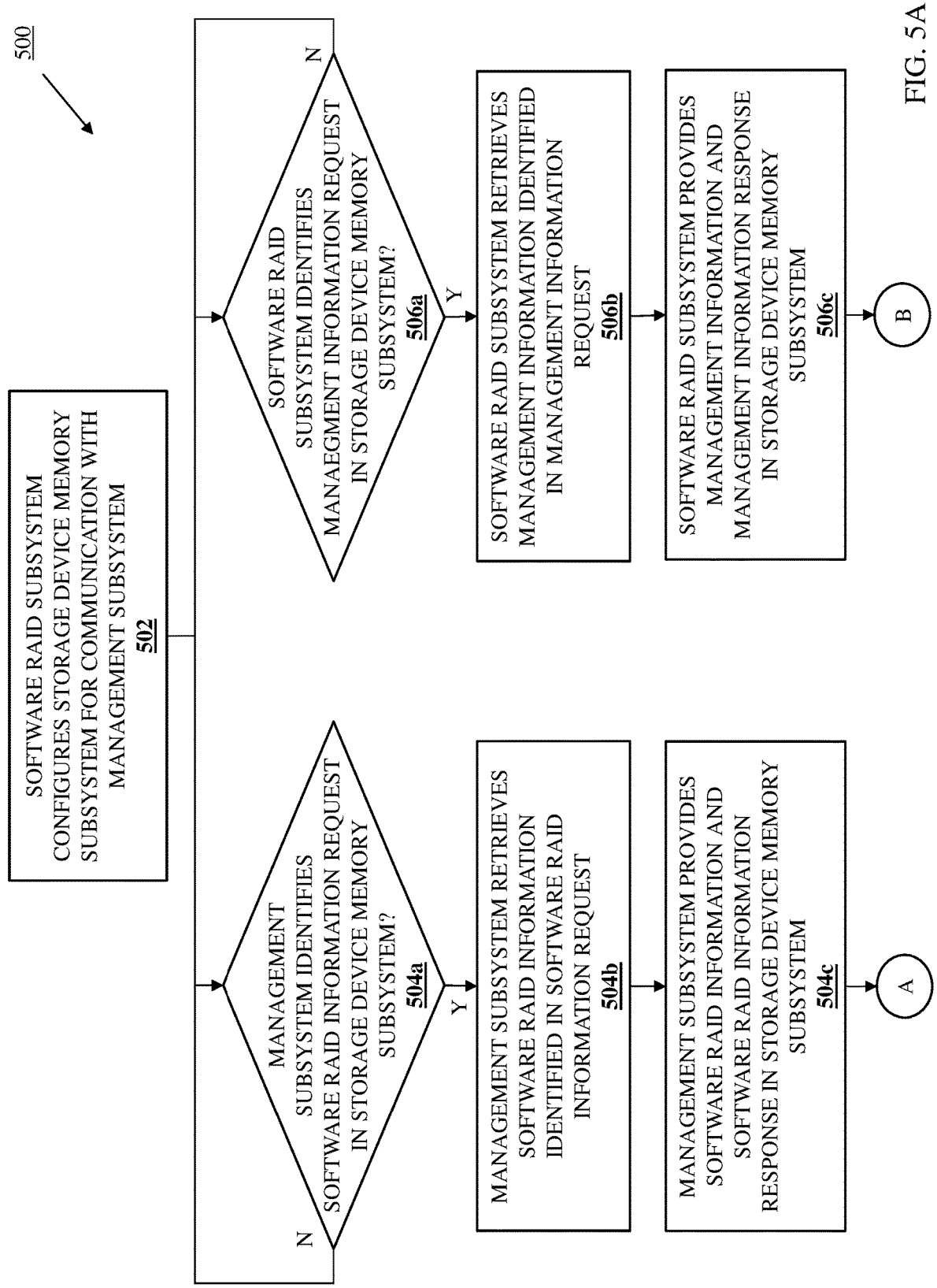
FIG. 5A is a flow chart illustrating an embodiment of a portion of a method for providing communication between a software RAID subsystem and a management subsystem in a computing device.
Figure 5B:
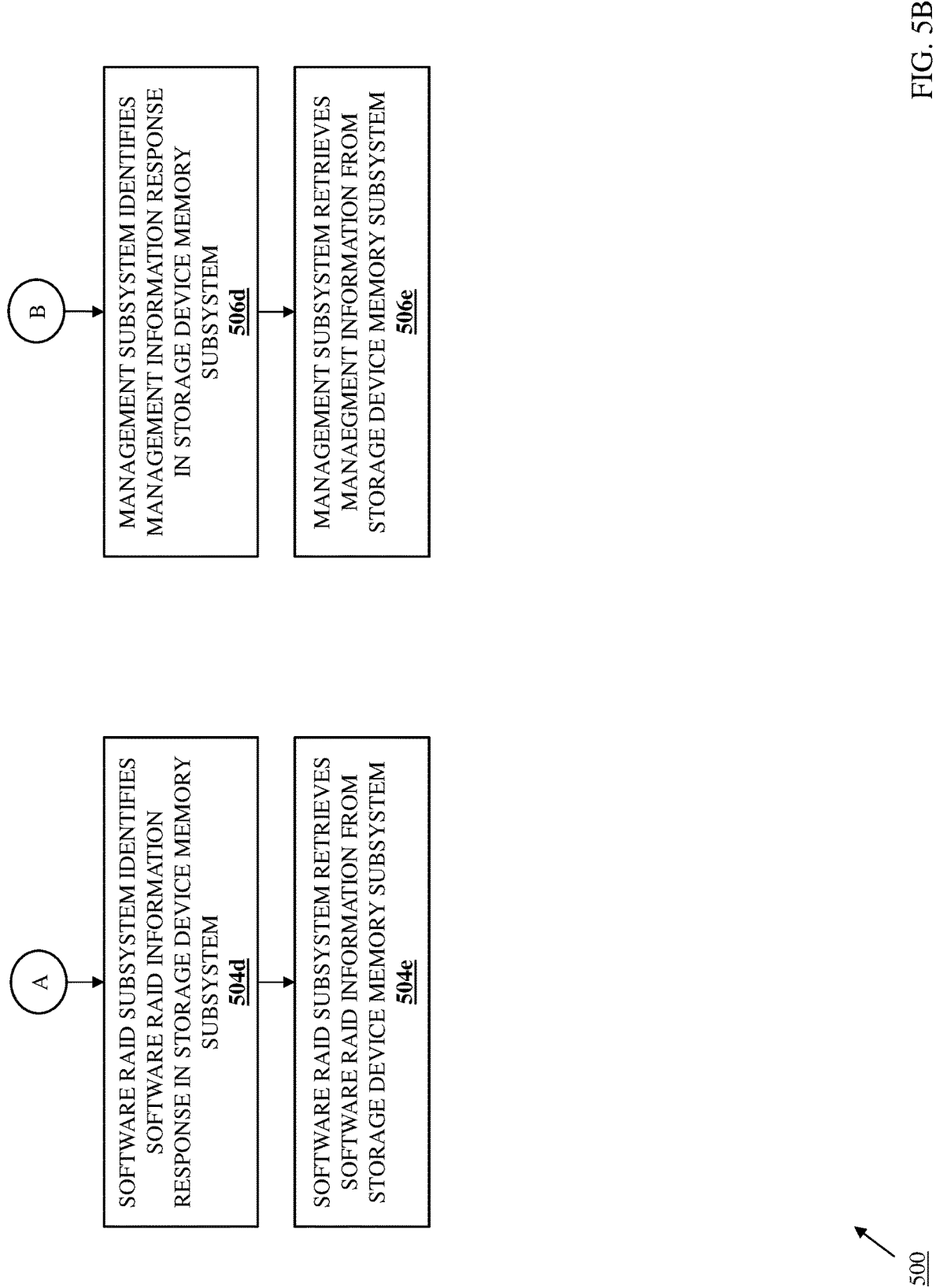
FIG. 5B is a flow chart illustrating an embodiment of a portion of a method for providing communication between a software RAID subsystem and a management subsystem in a computing device.

Referring now to FIGS. 5A and 5B, an embodiment of a method 500 for providing communication between a software Redundant Array of Independent Disk (RAID) subsystem and a management subsystem in a computing device is illustrated. As discussed below, the systems and methods of the present disclosure utilize a storage device memory subsystem in a storage device for communications between a software RAID subsystem and a management subsystem. For example, the software RAID/management communication system of the present disclosure may include a chassis housing a software Redundant Array of Independent Disk (RAID) subsystem and a management subsystem that are each coupled to a storage device having a storage device memory subsystem. The software RAID subsystem provides a software RAID information request in the storage device memory subsystem that requests the management subsystem provide software RAID information associated with the operation of a software RAID provided by the software RAID subsystem, the software RAID subsystem then periodically accesses the storage device memory subsystem and, when the software RAID subsystem determines that the management subsystem has provided a management information response in the storage device memory subsystem, the software RAID subsystem retrieves the software RAID information that was provided in the storage device memory subsystem by the management subsystem. As such, critical, real-time data may be exchanged between software RAID subsystems and management subsystems without the need to rely on changes/updates to an SMBIOS, BIOS, and/or IPMI and the corresponding time delays required for such changes/updates.

The method 500 begins at block 502 where a software RAID subsystem configures a storage device memory subsystem for communication with a management subsystem. In an embodiment, prior to the method 500, a "software RAID/management communication" memory space in the CMB device 408 of the storage device 202a/400 may be reserved for software RAID subsystem/management subsystem communications. For example, the software RAID/management communication memory space may be mapped to a "software RAID/management communication" Base Address Register (BAR), and Controller Memory Buffer LOCation (CMBLOC) registers may store information identifying a mapped "software RAID/management communication" BAR number and "software RAID/management communication" memory space offset in the CMB device 408 of the storage device 202a/400 for the software RAID/management communication memory space. As will be appreciated by one of skill in the art in possession of the present disclosure, the software RAID/management communication BAR number and software RAID/management communication memory space offset in the CMBLOC registers may be utilized by the software RAID engine 204 and the BMC engine 304 to establish communications.

As will be appreciated by one of skill in the art in possession of the present disclosure, a storage device provider of the storage device (e.g., a storage device "vendor") may provide vendor-specific memory address areas (e.g., BAR0 and/or BAR1) that may be utilized by the manufacturer of the computing device 200 to provide the software RAID/management communication memory space in the CMB device 408 of the storage device 202a/400. However, in some examples, there may be restrictions on the use of those vendor-specific memory address areas (e.g., restrictions on PCIe read/write operations), and thus the use of other BARs to provide the software RAID/management communication memory space in the CMB device 408 of the storage device 202a/400 will fall within the scope of the present disclosure as well.

For example, as will be appreciated by one of skill in the art in possession of the present disclosure, the CMBLOC registers discussed above may store information identifying a "conventional" CMB memory space offset for a conventional CMB memory space in the CMB device 408 of the storage device 202a/400 that may be used by the storage device 202a/400 for conventional CMB operations, and the software RAID/management communication memory space of the present disclosure may be located inside the conventional CMB memory space that begins at the conventional CMB memory space offset. To provide a specific example, if the conventional CMB memory space offset is provided at a 0x100 memory address in the CMB device 408 of the storage device 202a/400 included in BAR2 (e.g., outside of the vendor-specific memory address areas BAR0 and BAR1), and if the software RAID/management communication memory space offset is 0x200 with a 0x300 size requirement for the software RAID/management communication memory space, then software RAID/management communication memory space may be provided between the 0x300 address and the 0x600 address in the CMB device 408 included in BAR2. However, while a specific example of the use of non-vendor-specific memory address areas for the software RAID/management communication memory space has been described, one of skill in the art in possession of the present disclosure will appreciate how the software RAID/management communication memory space may be provided in a variety of manners that will fall within the scope of the present disclosure as well.

In any of the embodiments discussed above, the software RAID/management communication memory space (e.g., the software RAID/management communication memory space offset and the size of the software RAID/management communication memory space) may be identified to the software RAID engine 204 and the BMC engine 304 in the BMC device 206/300 during or prior to the method 500 in order to enable use of the software RAID/management communication memory space by the software RAID engine 204 and the BMC engine 304. In addition, the software RAID/management communication memory space (e.g., the software RAID/management communication memory space offset and the size of the software RAID/management communication memory space) may be identified to a host (e.g., an operating system) in the computing device 200 to prevent use of the software RAID/management communication memory space by the host. As such, one of skill in the art in possession of the present disclosure will appreciate how the software RAID/management communication memory space in the CMB device 408 may be configured in any of a variety of manners that ensure that it is not utilized for purposes other than the software RAID/management communications described below.

Figure 6B:
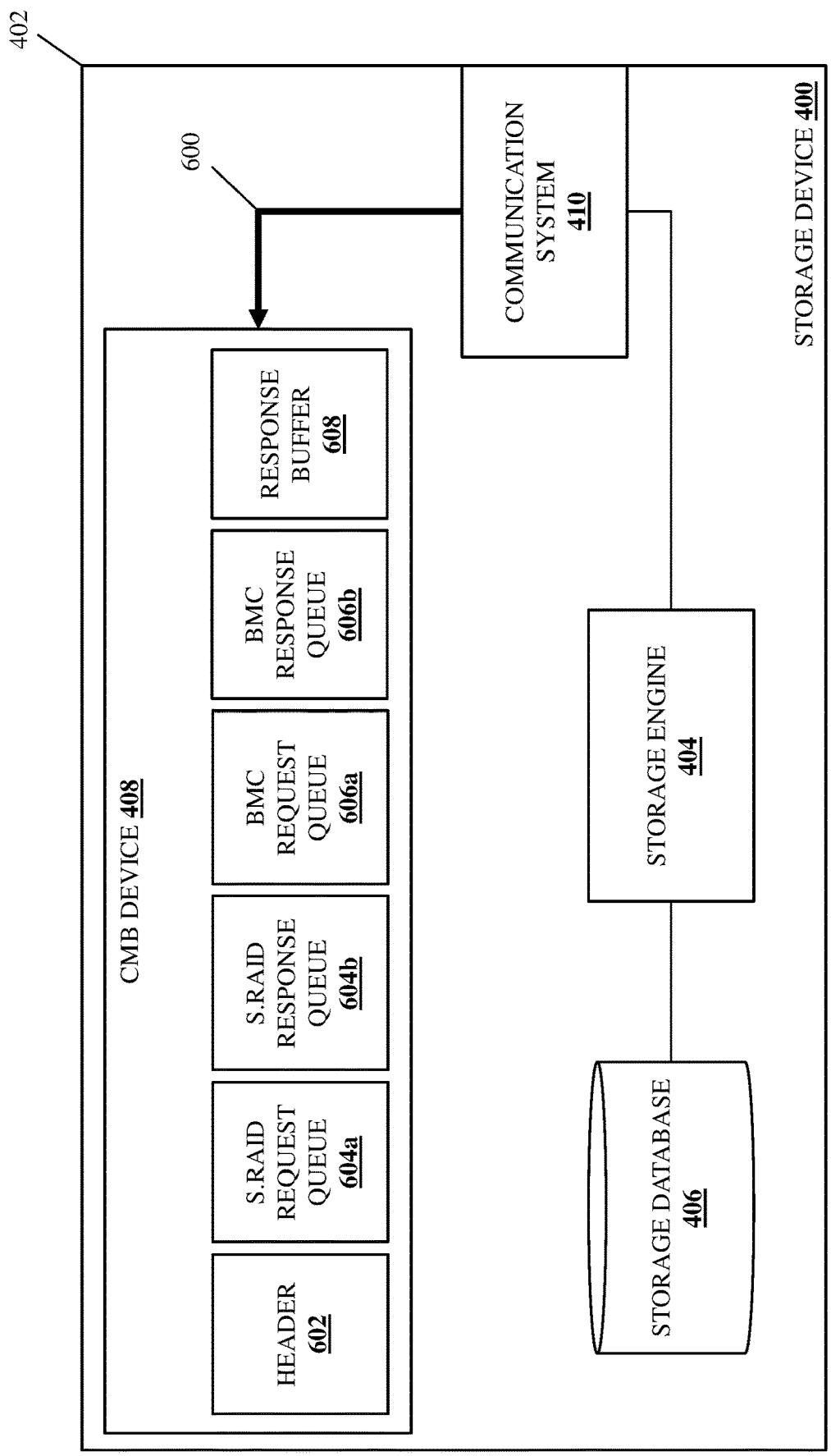
FIG. 6B is a schematic view illustrating an embodiment of the operation of the storage device of FIG. 4 during the method of FIGS. 5A and 5B.

With reference to FIGS. 6A and 6B, in an embodiment of block 502, the software RAID engine 204 in the computing device 200 may perform storage device memory subsystem configuration operations 600 that include configuring the CMB device 408 of the storage device 202a/400 (e.g., the software RAID/management communication memory space discussed above) via the communication system 410 in the storage device 202a/400 with a header 602, a software RAID request queue 604a, a software RAID response queue 604b, a BMC request queue 606a, a BMC response queue 606b, a response buffer 608, and/or any other storage device memory subsystem elements that one of skill in the art in possession of the present disclosure would recognize as providing for the functionality described below.

For example, in response to initialization of the computing device 200, the software RAID engine 204 (e.g., a software RAID driver) may load, the storage device 202a (e.g., an NVMe storage device) may initialize, the CMB device 408 in the storage device 202a/400 may be enabled, and the software RAID engine 204 may create the software RAID request queue 604a, the software RAID response queue 604b, the BMC request queue 606a, and the BMC response queue 606b in the software RAID/management communication memory space of the CMB device 408. The software RAID engine 204 may then provide and/or update the header 602 in the software RAID/management communication memory space of the CMB device 408 with queue address information (e.g., queue base addresses for the software RAID request/response queues and the BMC request/response queues discussed above), CMB device ready information (e.g., indicating that the software RAID/management communication memory space of the CMB device 408 is ready for use), authentication information (e.g., a signature, key, or other authentication information that may be authenticated by the BMC device 206/300 as discussed below), head/tail information (e.g., initially set to "0/0" as discussed below), and/or any other information that would be apparent to one of skill in the art in possession of the present disclosure.

As will be appreciated by one of skill in the art in possession of the present disclosure, the header 602 configured in the software RAID/management communication memory space of the CMB device 408 of the storage device 202a/400 may store any information that is required to use the software RAID/management communication memory space as described below, including queue numbering information, the queue address information discussed above, information about a number of queues, basic communication data, the CMB device ready information discussed above, the head/tail information discussed above, and/or any other information that one of skill in the art in possession of the present disclosure would recognize as enabling the functionality described below. However, while a specific example of a header and the data included therein that enable communications via the software RAID/management communication memory space of the CMB device 408 is provided above, one of skill in the art in possession of the present disclosure will appreciate how communications via the software RAID/management communication memory space of the CMB device 408 may be enabled in a variety of manners that will fall within the scope of the present disclosure as well.

As discussed in further detail below, in a specific example, the software RAID request queue 604a configured in the software RAID/management communication memory space of the CMB device 408 of the storage device 202a/400 may provide a management queue (e.g., rather than an Input/

Output (I/O) queue) for the submission of software RAID information requests by the software RAID engine 204 in the computing device 200, while the software RAID response queue 604b configured in the software RAID/management communication memory space of the CMB device 408 may provide a management queue (e.g., rather than an I/O queue) for submission of software RAID information responses to software RAID information requests by the BMC engine 304 in the BMC device 206/300 in the computing device 200. As such, the software RAID request queue 604a and the software RAID response queue 604b may include any management queue features that one of skill in the art in possession of the present disclosure would recognize as providing for the functionality described below.

As also discussed in further detail below, in a specific example, the BMC request queue 606a configured in the software RAID/management communication memory space of the CMB device 408 of the storage device 202a/400 may provide a management queue (e.g., rather than an (I/O) queue) for the submission of management information requests by the BMC engine 304 in the BMC device 206/300 in the computing device 200, while the BMC response queue 606b configured in the software RAID/management communication memory space of the CMB device 408 may provide a management queue (e.g., rather than an I/O queue) for submission of management information responses to management information requests by the software RAID engine 204 in the computing device 200. As such, the BMC request queue 606a and the BMC response queue 606b may include any management queue features that one of skill in the art in possession of the present disclosure would recognize as providing for the functionality described below.

As will be appreciated by one of skill in the art in possession of the present disclosure, in response to configuring the software RAID request/response queues and the BMC request/response queues, the software RAID engine 204 may update any associated queue information in the header 602 of the CMB device 408 of the storage device 202a/400. However, while specific software RAID request/response queues and the BMC request/response queues are illustrated and described herein, one of skill in the art in possession of the present disclosure will appreciate how different numbers and/or configurations of the management queues described herein may be provided in the software RAID/management communication memory space of the CMB device 408 while remaining within the scope of the present disclosure as well. For example, one of skill in the art in possession of the present disclosure will appreciate how a minimum of one management queue pair may be provided to allow for the exchange of requests and responses between the software RAID engine 204 and the BMC engine 304 in the BMC device 206/300 while remaining within the scope of the present disclosure as well.

As discussed in further detail below, in a specific example, the response buffer 608 configured in the software RAID/management communication memory space of the CMB device 408 of the storage device 202a/400 may provide for the provisioning and retrieval of software RAID information requested by the software RAID engine 204 in the computing device 200, as well as the provisioning and retrieval of management information requested by the BMC engine 304 in the BMC device 206/300 in the computing device 200. However, while a specific example of a response buffer is provided herein, one of skill in the art in possession of the present disclosure will appreciate that the software RAID/management communication memory space of the CMB device 408 may be configured to transfer the software RAID information and/or management information described below in a variety of manners that will fall within the scope of the present disclosure as well.

In some embodiments, the software RAID engine 204 in the computing device 200 may set a register in the CMB device 408 of the storage device 202a/400 (e.g., by setting a CMBMSC.CRE register to "1") in order to indicate an intent to utilize the software RAID/management communication memory space of the CMB device 408 for communication with the BMC device 206/300 in the computing device 200. Furthermore, in response to providing the indication of an intent to the utilize the software RAID/management communication memory space of the CMB device 408 for communication with the BMC device 206/300 in the computing device 200, the software RAID engine 204 in the computing device 200 may populate the header 602 in the CMB device 408 (e.g., with any of the information described above) and subsequently begin periodically accessing the header 602 in the CMB device 408 to determine whether the BMC engine 304 has provided a management communication.

Figure 6D:
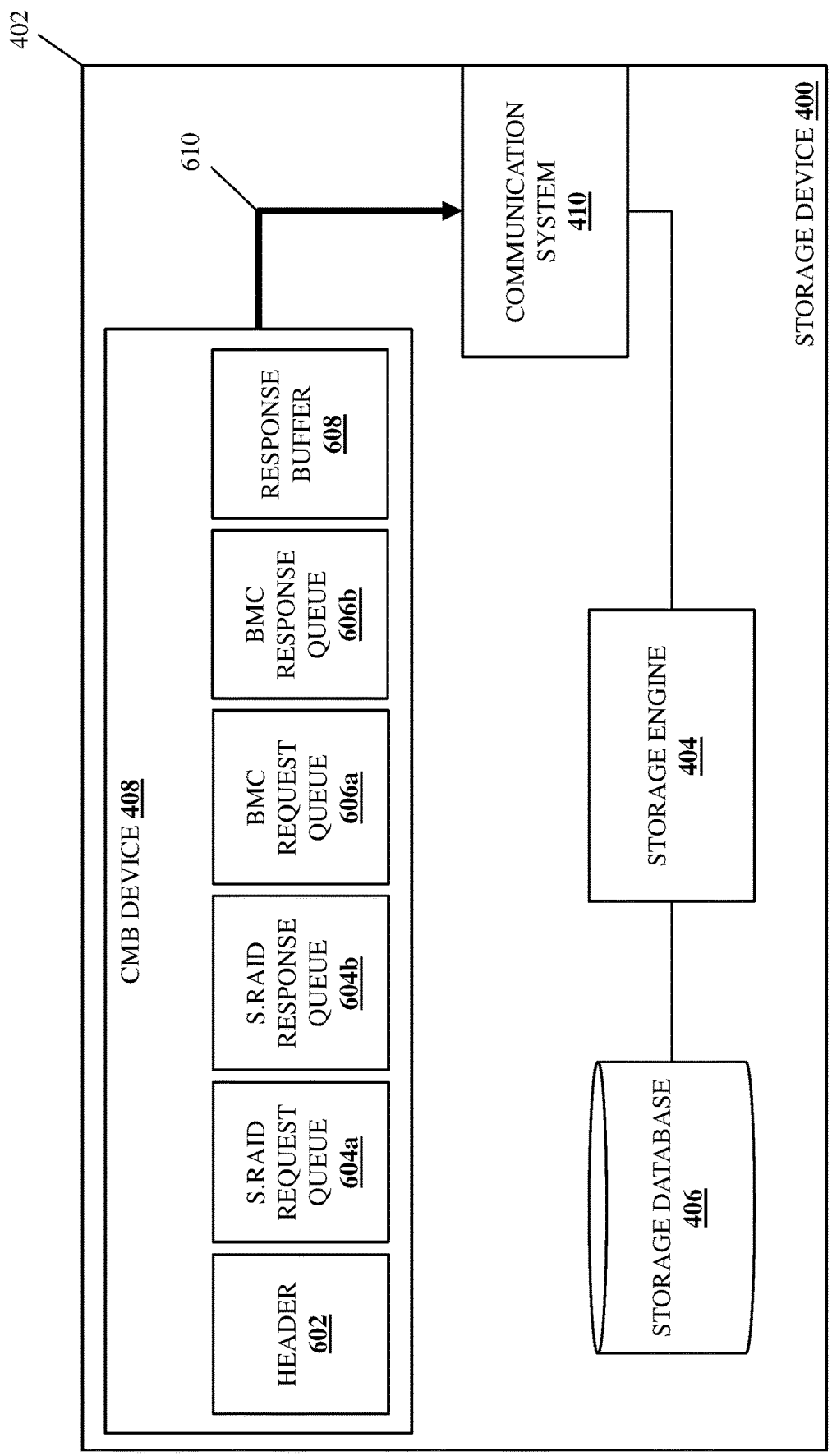
FIG. 6D is a schematic view illustrating an embodiment of the operation of the storage device of FIG. 4 during the method of FIGS. 5A and 5B.

With reference to FIGS. 6C and 6D, the BMC engine 304 in the BMC device 206/300 in the computing device 200 may perform CMB device read operations 610 that include reading any of a variety of information from the CMB device 400 via the communication system 410 in the storage device 202a/400. As will be appreciated by one of skill in the art in possession of the present disclosure, the CMB device read operations 610 performed by the BMC engine 304 in the BMC device 206/300 in the computing device 200 may include reading (e.g., via NVMe-Management Interface (MI)-PCIe reads) CMB registers in the CMB device 408 of the storage device 202a/400 in order to identify CMB support information, BAR location information, CMB offset information, CMB size information, read/write bit information, and/or other CMB information that one of skill in the art in possession of the present disclosure will recognize enables the use of the CMB device 408 by the BMC engine 304. Furthermore, the CMB device read operations 610 may allow the BMC engine 304 to determine that the register in the CMB device 408 was set by the software RAID engine 204 to indicate an intent to utilize the software RAID/management communication memory space of the CMB device 408 for communication with the BMC device 206/300, and in response the BMC engine 304 in the BMC device 206/300 may determine that it should begin periodically accessing the header 602 in the CMB device 408 (e.g., via NVMe-MI-PCIe reads) to determine whether the software RAID engine 204 has provided a software RAID communication.

In an embodiment, the CMB device read operations 610 may also include the BMC engine 304 accessing the header 602 in the software RAID/management communication memory space of the CMB device 408 to retrieve authentication information (e.g., the signature, key, or other authentication information discussed above), and using any of a variety of authentication technique to authenticate the data provided by the software RAID engine 204 in the software RAID/management communication memory space of the CMB device 408. For example, the authentication information may be provided by the software RAID engine 204 in one or more fields in the header 602 using information that is already known to the BMC engine 304, and following its authentication the BMC engine 304 may proceed with performing the remainder of the method 500. As will be appreciated by one of skill in the art in possession of the present disclosure, if the BMC engine 304 cannot authenticate information retrieved from the header 602 in the CMB device 408, the BMC engine 304 may assume that the software RAID engine 204 has not yet configured the software RAID/management communication memory space of the CMB device 408, and may periodically perform the CMB device read operations 610 until information that can be authenticated is retrieved from the header 602.

The method 500 may then proceed to decision block 504*a* where the method 500 proceeds depending on whether the management subsystem identifies a software RAID information request in the storage device memory subsystem, as well as to decision block 506*a* where the method 500 proceeds depending on whether the software RAID subsystem identifies a management information request in the storage device memory subsystem. As will be appreciated by one of skill in the art in possession of the present disclosure, blocks 504*a*-504*e* of the method 500 describe embodiments in which the software RAID subsystem may initiate communication with the management subsystem, while blocks 506*a*-506*e* of the method 500 describe embodiments in which the management subsystem may initiate communication with the software RAID subsystem, and while the software-RAID-initiated communication of blocks 504*a*-504*e* are described in detail below, the management-initiated communication of blocks 506*a*-506*e* may be performed in a substantially similar manner except for where detailed below.

Beginning with the software-RAID-initiated communication of blocks 504*a*-504*c*, in an embodiment of decision block 504*a*, the BMC engine 304 in the BMC device 206/300 in the computing device 200 may access the software RAID/management communication memory space in the CMB device 408 of the storage device 202*a*/400 to determine whether a software RAID information request was provided by the software RAID engine 204 in the CMB device 408. As discussed above, in response to determining that the software RAID engine 204 indicated an intent to utilize the software RAID/management communication memory space of the CMB device 408 for communication with the BMC device 206/300, the BMC engine 304 in the BMC device 206/300 may begin periodically accessing the header 602 in the CMB device 408 to determine whether the software RAID engine 204 has provided a software RAID information request in the software RAID request queue 604*a* in the CMB device 408.

In a specific example, the software RAID engine 204 may be configured to increment a "tail" portion of the head/tail information stored in the header 602 in the CMB device 408 in response to submitting a software RAID information request in the software RAID request queue 604*a* in the CMB device 408, and thus the BMC engine 304 may be configured to periodically access the head/tail information stored in the header 602 in the CMB device 408 to determine whether the tail portion of the head/tail information matches a "head" portion of the head/tail information in order to determine whether a software RAID information request was provided by the software RAID engine 204 in the CMB device 408. In other words, if the tail portion is greater than the head portion in the head/tail information, then the software RAID engine 204 has incremented that tail portion following the provisioning of the software RAID information request, while if the tail portion is equal to the head portion in the head/tail information, then the software RAID engine 204 has not provided a software RAID information request.

If, at decision block 504*a*, the management subsystem does not identify a software RAID information request in the storage device memory subsystem, the method 500 returns to decision block 504*a*. For example, if at decision block 504*a* the BMC engine 304 in the BMC device 206/300 in the computing device 200 determines that the tail portion of the head/tail information in the header 602 in the CMB device 408 is equal to the head portion of the head/tail information in the header 602 in the CMB device 408 (e.g., the head/tail information remains as initially set during block 502 at "0/0"), the BMC engine 304 will determine that the software RAID engine 204 in the computing device 200 has not submitted a software RAID information request to the software RAID request queue 604*a*, and the method 500 will return to decision block 504*a*. As such, the method 500 may loop such that the BMC engine 304 periodically accesses the header 602 in the CMB device 408 at decision block 504*a* as long as no software RAID information request is identified in the CMB device 408 (e.g., as long as the tail portion of the head/tail information is equal to the head portion of the head/tail information in the header 602 in the CMB device 408).

With reference now to the management-initiated communication of blocks 506*a*-506*e*, similarly as described above, the software RAID engine 204 in the computing device 200 may periodically access the software RAID/management communication memory space in the CMB device 408 of the storage device 202*a*/400 at decision block 506*a* to determine whether a management information request was provided by the BMC engine 304 in the CMB device 408. As discussed above, following the configuration of the software RAID/management communication memory space of the CMB device 408 for communication with the BMC device 206/300, the software RAID engine 204 may periodically access the header 602 in the CMB device 408 to determine whether the BMC engine 304 has provided a management information request in the BMC request queue 606*a* in the CMB device 408.

In a specific example, the BMC engine 304 may be configured to increment the head portion of the head/tail information stored in the header 602 in the CMB device 408 in response to submitting a management information request in the BMC request queue 606*a* in the CMB device 408, and thus the software RAID engine 204 may be configured to periodically access the head/tail information stored in the header 602 in the CMB device 408 to determine whether the head portion of the head/tail information matches the tail portion of the head/tail information in order to determine whether a management information request was provided by the BMC engine 304 in the CMB device 408. In other words, if the head portion is greater than the tail portion in the head/tail information, then the BMC engine 304 has incremented that head portion following the provisioning of the management information request, while if the head portion is equal to the tail portion in the head/tail information, then the BMC engine 304 has not provided a management information request.

If, at decision block 506*a*, the software RAID subsystem does not identify a management information request in the storage device memory subsystem, the method 500 returns to decision block 506*a*. For example, if at decision block 506*a* the software RAID engine 204 in the in the computing device 200 determines that the head portion of the head/tail information in the header 602 in the CMB device 408 is equal to the tail portion of the head/tail information in the header 602 in the CMB device 408 (e.g., the head/tail information remains as initially set during block 502 at "0/0"), the software RAID engine 204 will determine that the BMC engine 304 in the BMC device 206/300 in the computing device 200 has not submitted a management information request to the BMC request queue 606a, and the method 500 will return to decision block 506a. As such, the method 500 may loop such that the software RAID engine 204 periodically accesses the header 602 in the CMB device 408 at decision block 504a as long as no management information request is identified in the CMB device 408 (e.g., as long as the head portion of the head/tail information is equal to the tail portion of the head/tail information in the header 602 in the CMB device 408).

Returning to the software-RAID-initiated communication of blocks 504a-504e, if at decision block 504a the management subsystem identifies a software RAID information request in the storage device memory subsystem, the method 500 proceeds to block 504b where the management subsystem retrieves software RAID information identified in the software RAID information request. With reference to FIGS. 7A and 7B, in an embodiment of decision block 504a, the software RAID engine 204 in the computing device 200 may perform software RAID information request submission operations 700 that include submitting a software RAID information request in the software RAID request queue 604a via the communication system 410 in the storage device 202a/400. For example, the software RAID information request may include any of a variety of formats (e.g., formats that may be defined by a vendor of the storage device 202a/400), and may request any particular software RAID information, may identify the response buffer 608 as the location where the software RAID information should be provided, and/or may include any other information that one of skill in the art in possession of the present disclosure would recognize as allowing for the functionality discussed below.

In the specific examples provided below, the software RAID information request includes a request by the software RAID engine 204 for a bay identifier (e.g., the software RAID information request may include a vendor-defined opcode for "BAYID") of a storage device (e.g., an NVMe storage device) in the computing device 200, but one of skill in the art in possession of the present disclosure will appreciate that the software RAID engine 204 may request any of a variety of software RAID information (e.g., a slot identifier ("SlotID"), a form factor, etc.) while remaining within the scope of the present disclosure as well. As will be appreciated by one of skill in the art in possession of the present disclosure, any software RAID information requests (and/or alignments) submitted at decision block 504a may conform to Management Component Transport Protocol (MCTP) standards.

Figure 7C:
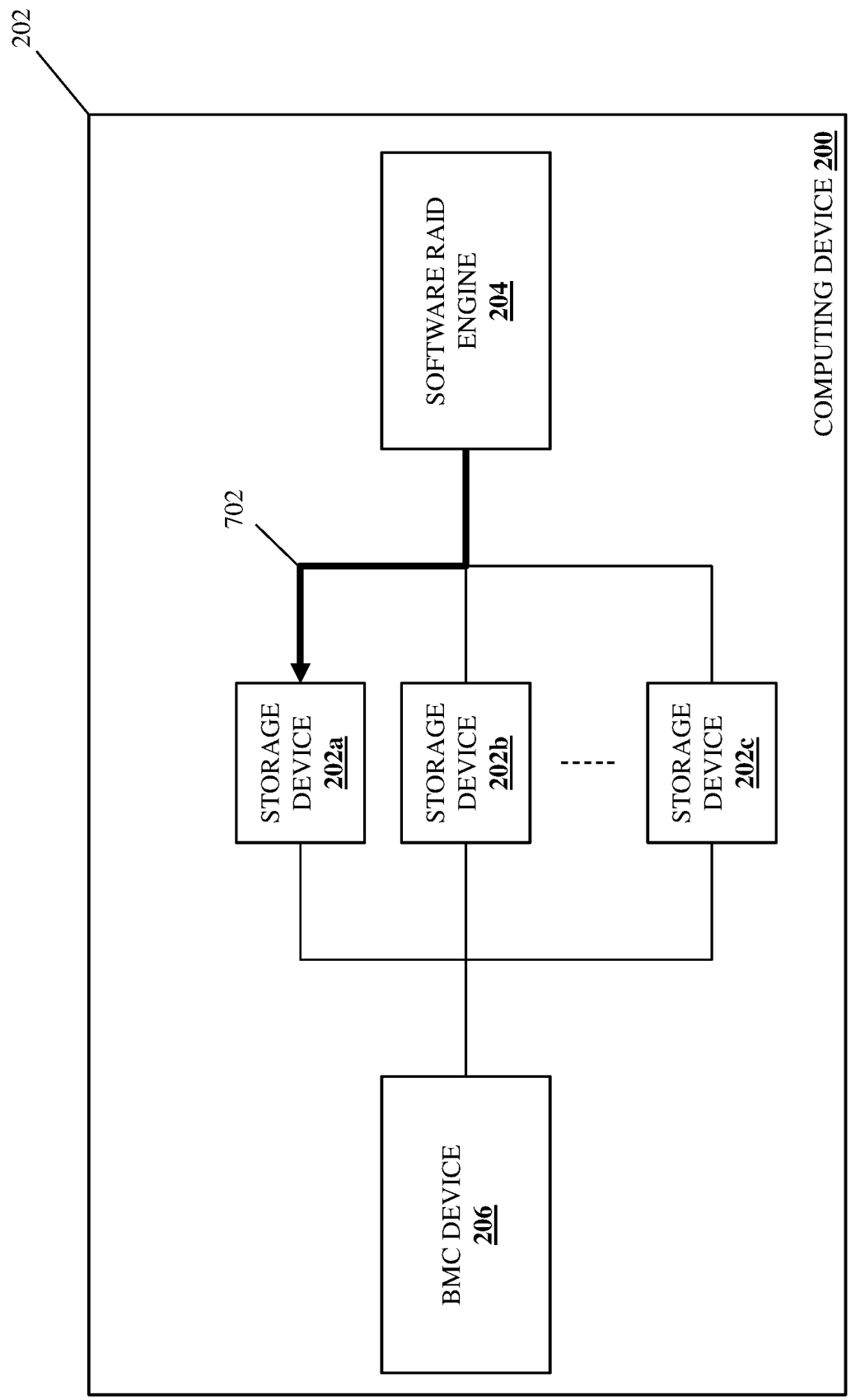
FIG. 7C is a schematic view illustrating an embodiment of the operation of the computing device of FIG. 2 during the method of FIGS. 5A and 5B.

Furthermore, with reference to FIGS. 7C and 7D, in an embodiment of decision block 504a, the software RAID engine 204 in the computing device 200 may perform software RAID information request header identification operations 702 that include identifying the submission of the software RAID information request in the header 602 configured in the CMB device 408 via the communication system 410 in the storage device 202a/400. Similarly as discussed above, the software RAID engine 204 may increment a tail portion of the head/tail information stored in the header 602 in the CMB device 408 (e.g., from the "0/0" as initially set during block 502 to "0/1") in response to submitting the software RAID information request in the software RAID request queue 604a in the CMB device 408 at decision block 504a.

Figure 8A:
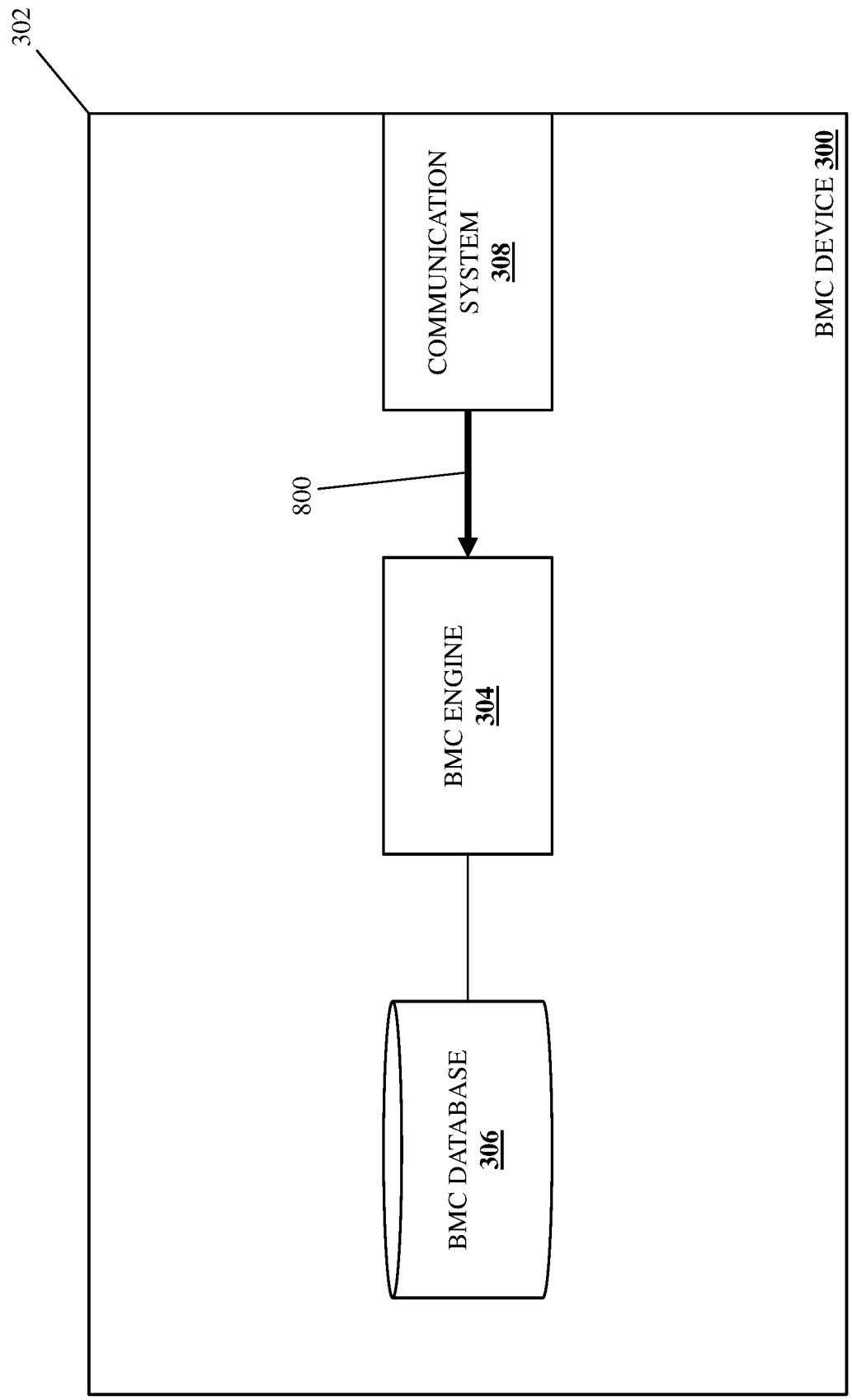
FIG. 8A is a schematic view illustrating an embodiment of the operation of the management subsystem of FIG. 3 during the method of FIGS. 5A and 5B.
Figure 8B:
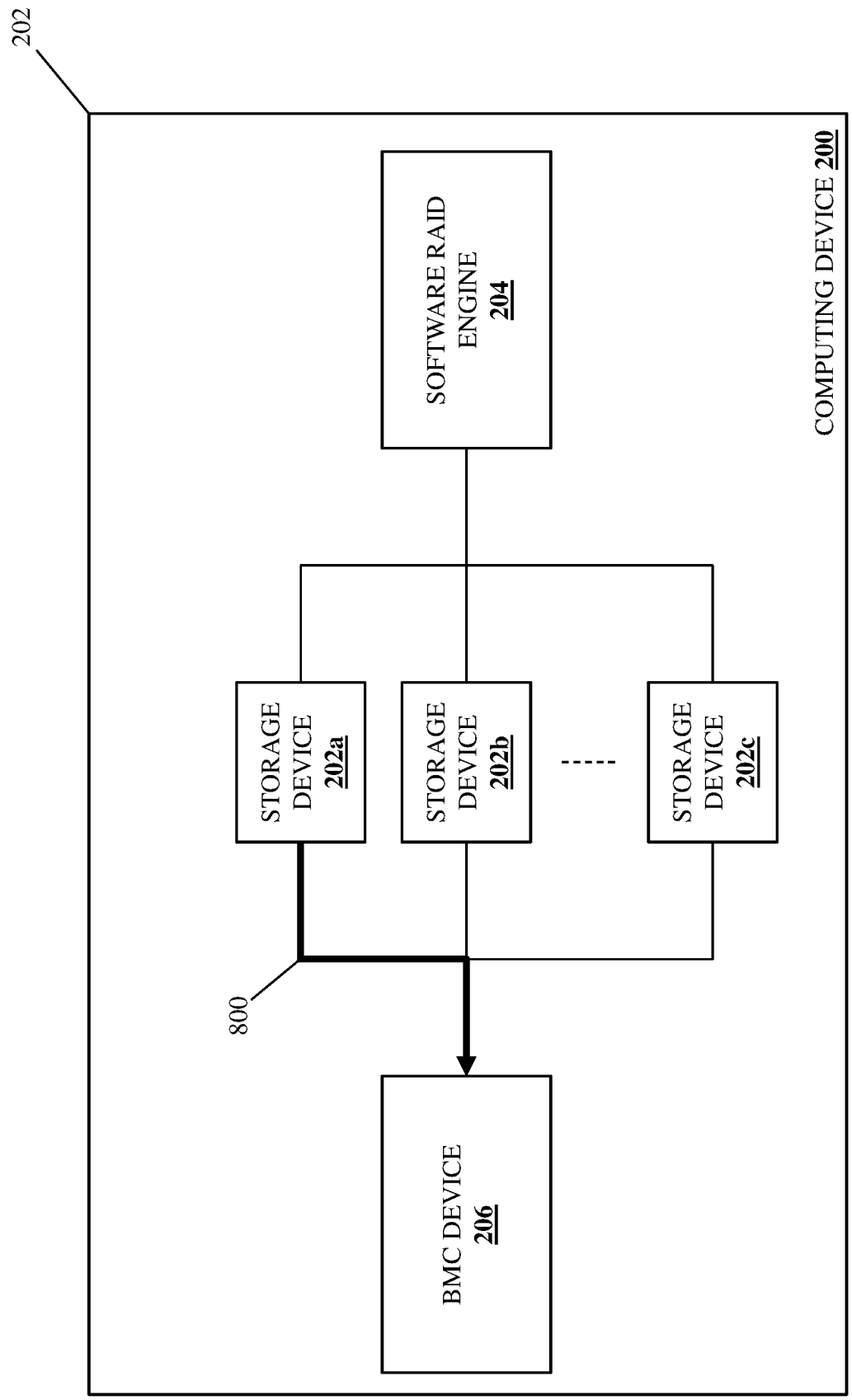
FIG. 8B is a schematic view illustrating an embodiment of the operation of the computing device of FIG. 2 during the method of FIGS. 5A and 5B.
Figure 8C:
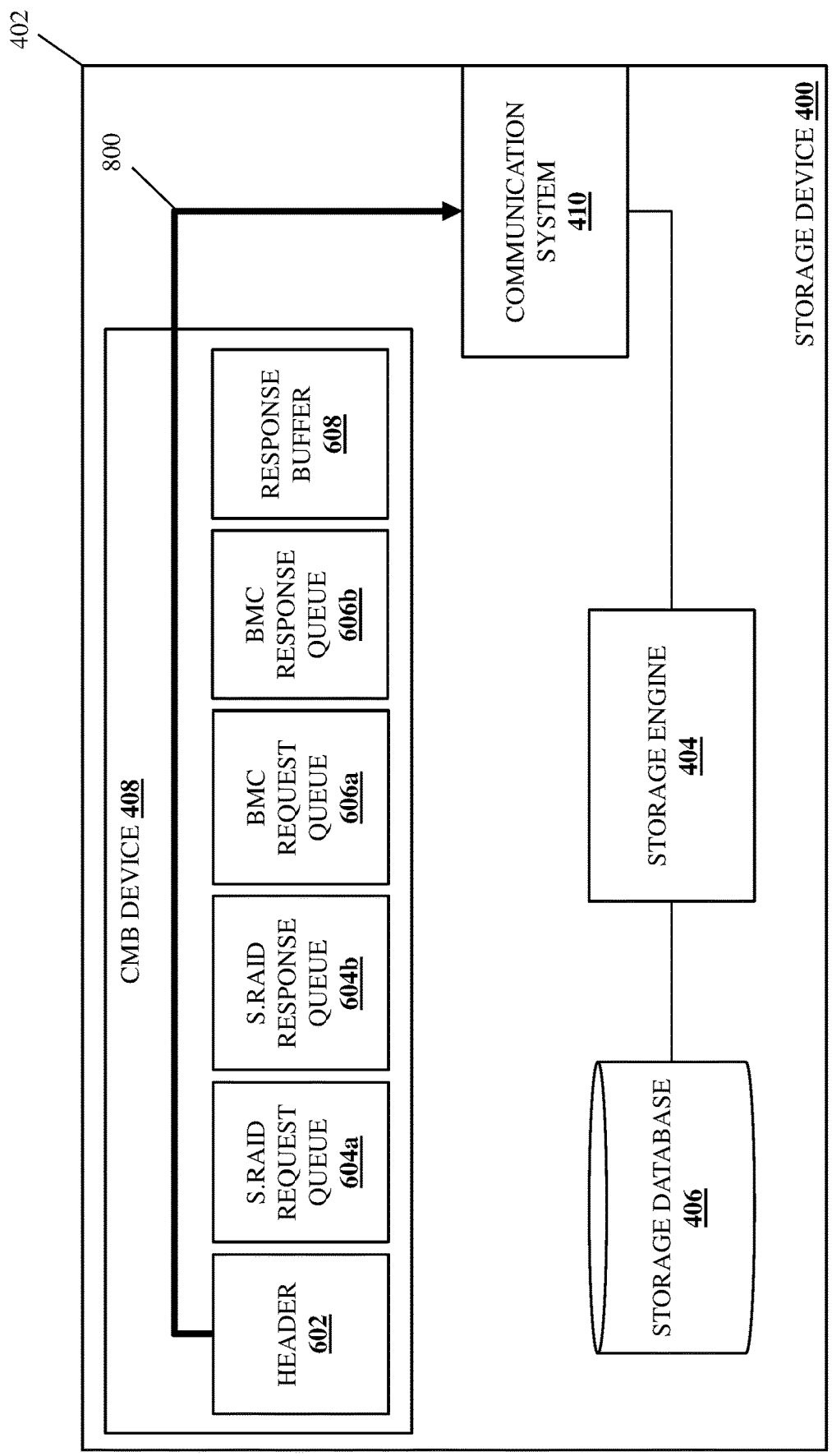
FIG. 8C is a schematic view illustrating an embodiment of the operation of the storage device of FIG. 4 during the method of FIGS. 5A and 5B.

As such, with reference to FIGS. 8A, 8B, and 8C, in an embodiment of decision block 504a and as part of the periodic accesses of the header 602 in the CMB device 408 of the storage device 202a/300, the BMC engine 304 in the BMC device 206/300 in the computing device 200 may perform software RAID information request identification operations 800 that include accessing the header 602 in the CMB device 408 in the storage device 202a/400 via the communication system 410 in the storage device 202a/400 and the communication system 308 in the BMC device 206/300, and determining that the software RAID engine 204 in the computing device 200 has submitted a software RAID information request in the software RAID request queue 604a based on the tail portion not matching the head portion of the head/tail information stored in the header 602 in the CMB device 408 (e.g., head/tail information such as "0/1" following an initial submission of a software RAID information request).

Figure 8D:
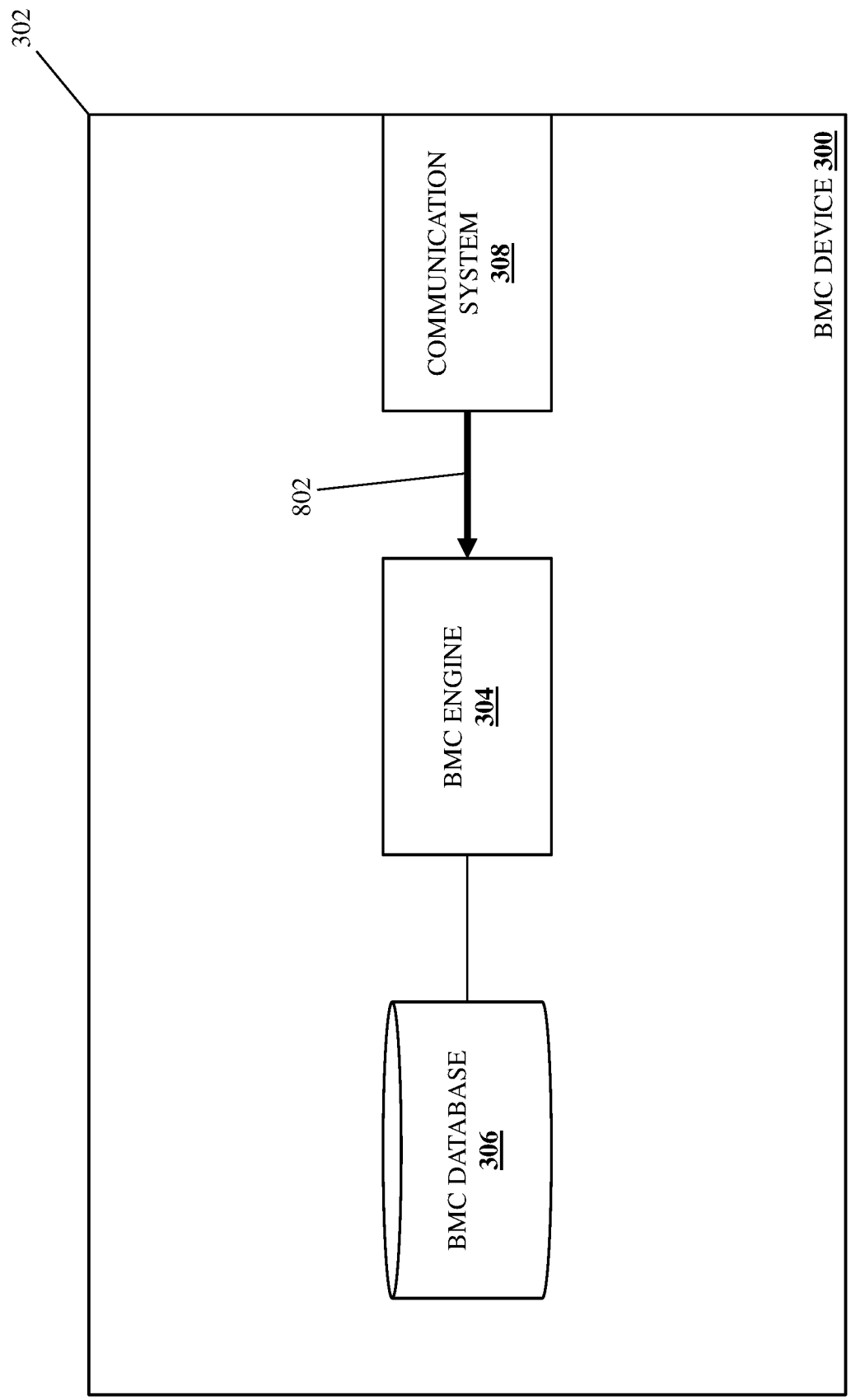
FIG. 8D is a schematic view illustrating an embodiment of the operation of the management subsystem of FIG. 3 during the method of FIGS. 5A and 5B.
Figure 8F:
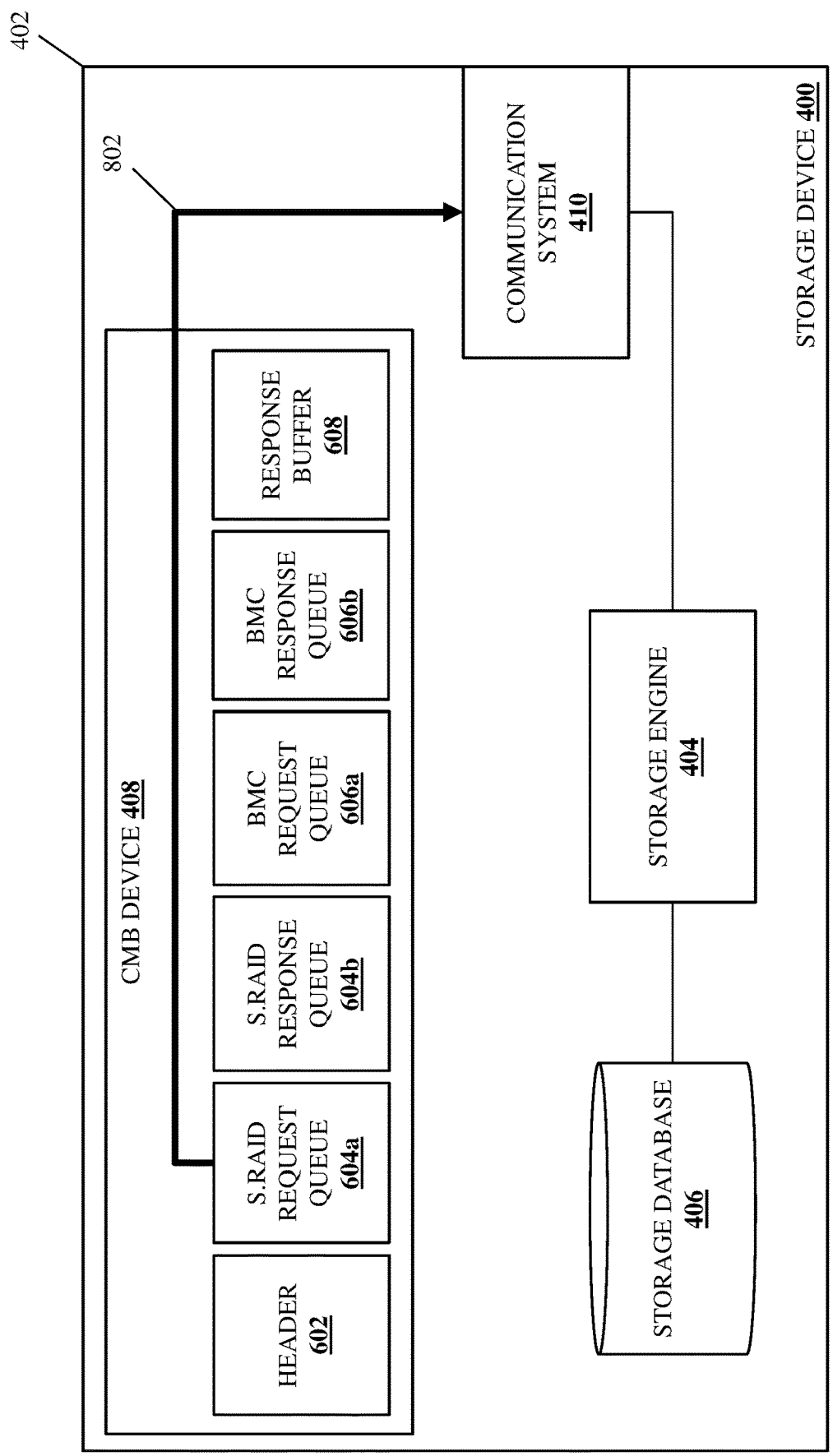
FIG. 8F is a schematic view illustrating an embodiment of the operation of the storage device of FIG. 4 during the method of FIGS. 5A and 5B.

With reference to FIGS. 8D, 8E, and 8F, in an embodiment of block 504b and in response to determining that the software RAID engine 204 in the computing device 200 has submitted a software RAID information request in the software RAID request queue 604a, the BMC engine 304 in the BMC device 206/300 in the computing device 200 may perform software RAID information request retrieval operations 802 that include accessing the software RAID request queue 604a in the CMB device 408 in the storage device 202a/400 via the communication system 410 in the storage device 202a/400 and the communication system 308 in the BMC device 206/300, and retrieving the software RAID information request.

Returning to the management-initiated communication of blocks 506a-506e, and similarly as described above, if at decision block 506a the software RAID subsystem identifies a management information request in the storage device memory subsystem, the method 500 proceeds to block 506b where the software RAID subsystem retrieves management information identified in the management information request. While not illustrated and described in detail, one of skill in the art in possession of the present disclosure will appreciate how decision block 506a and block 506b may be performed by the software RAID engine 204 in the computing device 200 similarly as described above for the performance of decision block 504a and block 504b by the BMC engine 304 in the BMC device 206/300 in the computing device 200. As such, the BMC engine 304 may submit a management information request in the BMC request queue 606a, and any management information requests (and/or alignments) submitted at decision block 506a may conform to MCTP standards. The BMC engine 304 may also identify the submission of the management information request in the header 602 configured in the CMB device 408 by incrementing a head portion of the head/tail information stored in the header 602 in the CMB device 408 in response to submitting the management information request (e.g., from the "0/0" as initially set during block 502 to "1/0").

Subsequently and as part of the periodic accesses of the header 602 in the CMB device 408 of the storage device 202a/300, the software RAID engine 204 in the computing device 200 may access the header 602 and determine that the BMC engine 304 has submitted a management information request in the BMC request queue 606a based on the head portion not matching the tail portion of the head/tail information stored in the header 602 in the CMB device 408 (e.g., head/tail information such as "1/0" following an initial submission of a management information request). The software RAID engine 204 may then access the BMC request queue 606a and retrieve the management information request.

Figure 8I:
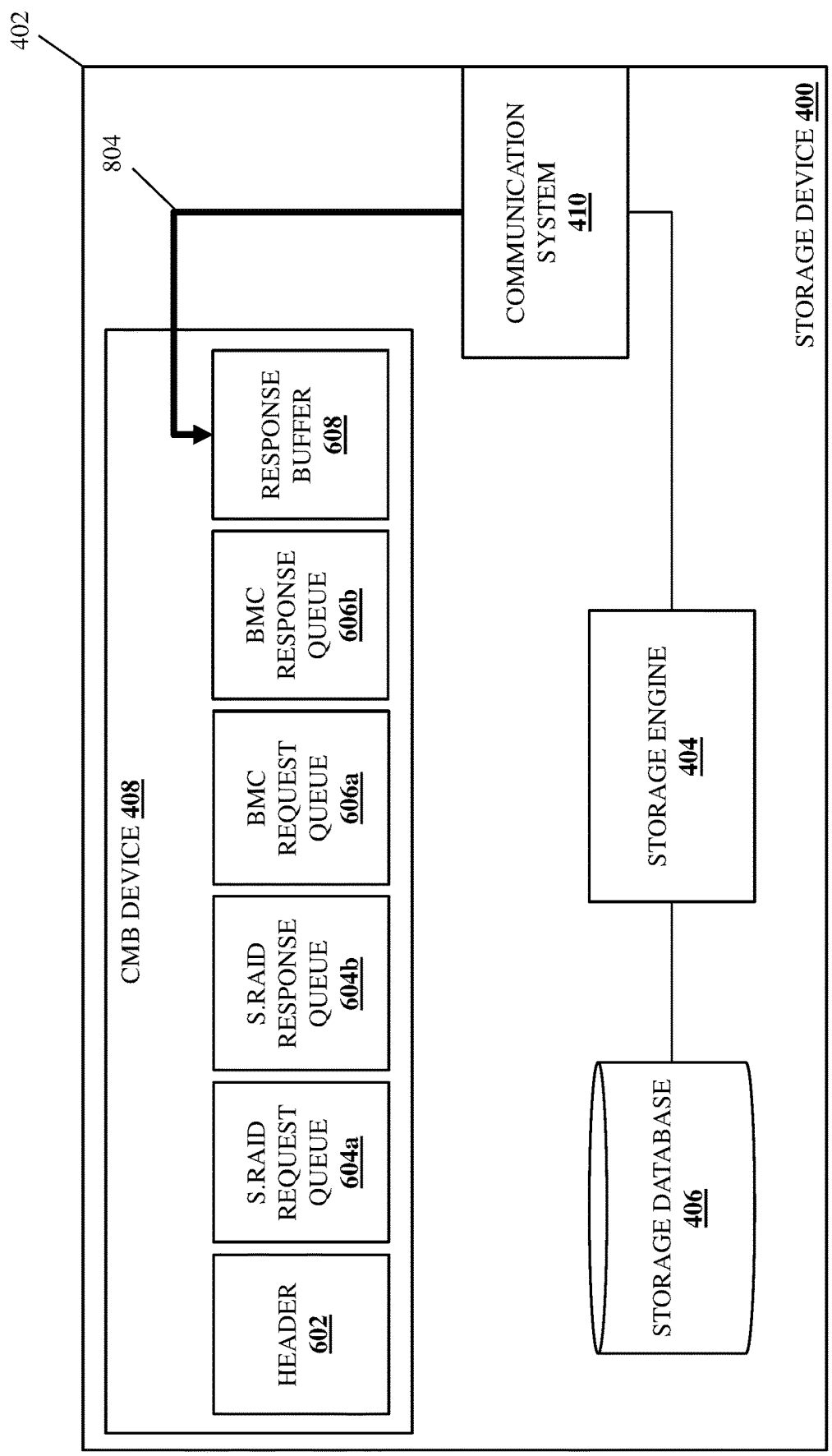
FIG. 8I is a schematic view illustrating an embodiment of the operation of the storage device of FIG. 4 during the method of FIGS. 5A and 5B.

Returning to the software-RAID-initiated communication of blocks 504a-504c, the method 500 then proceeds to block 504c where the management subsystem provides the software RAID information and a software RAID information response in the storage device memory subsystem. With reference to FIGS. 8G, 8H, and 8I, in an embodiment of block 504c, the BMC engine 304 in the BMC device 206/300 in the computing device 200 may perform software RAID information provisioning operations 804 that include retrieving the software RAID information (e.g., the BMC engine 304 may identify the vendor-defined opcode for "BAYID" in the software RAID information request and, in response, retrieve the BAYID of the NVMe storage device requested by the software RAID engine 204 in the specific example above), and transmitting that software RAID information via its communication system 308 and the communication system 410 in the storage device 202a/400 to the response buffer 608 in the CMB device 408 in the storage device 202a/400.

Figure 8J:
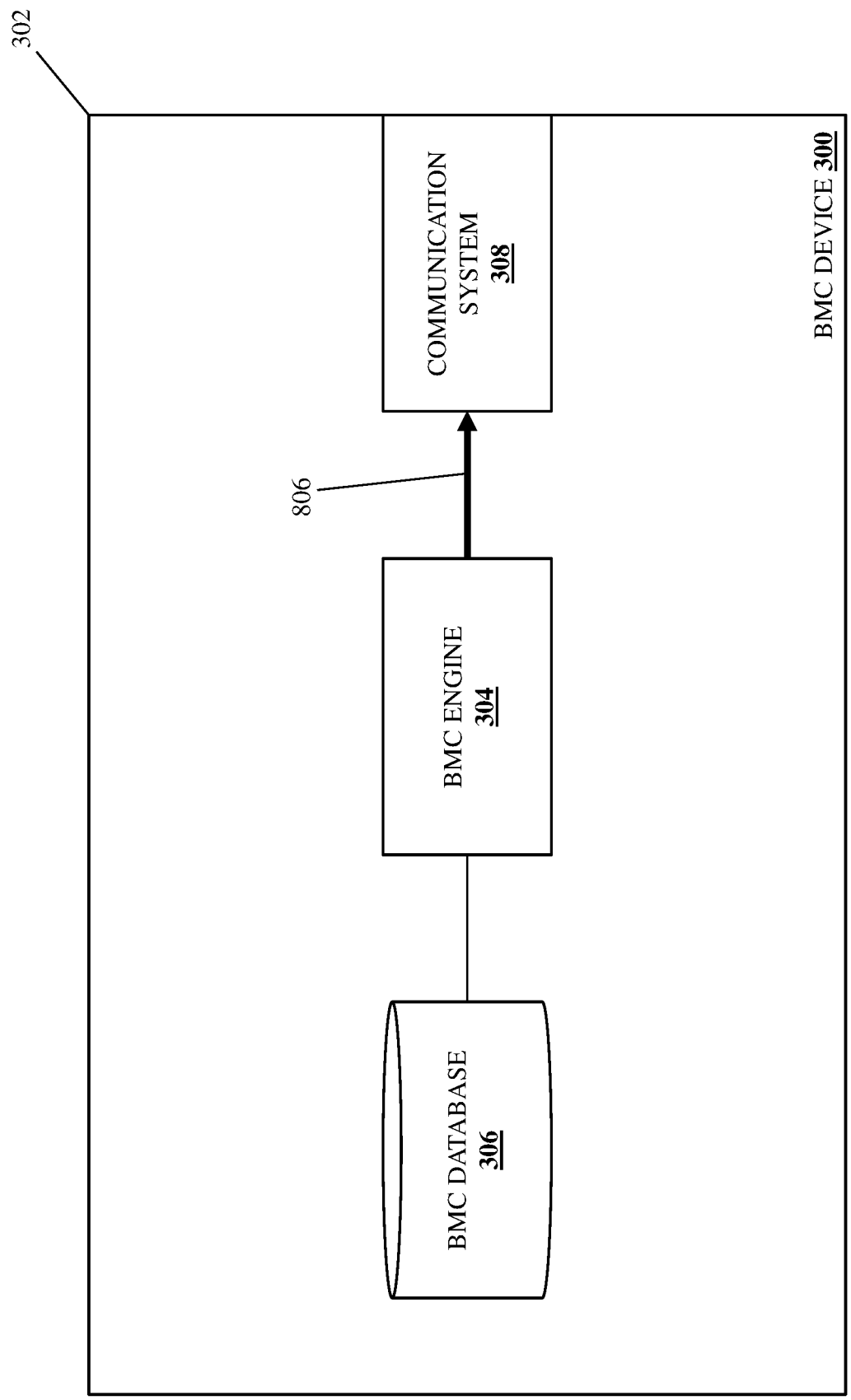
FIG. 8J is a schematic view illustrating an embodiment of the operation of the management subsystem of FIG. 3 during the method of FIGS. 5A and 5B.
Figure 8K:
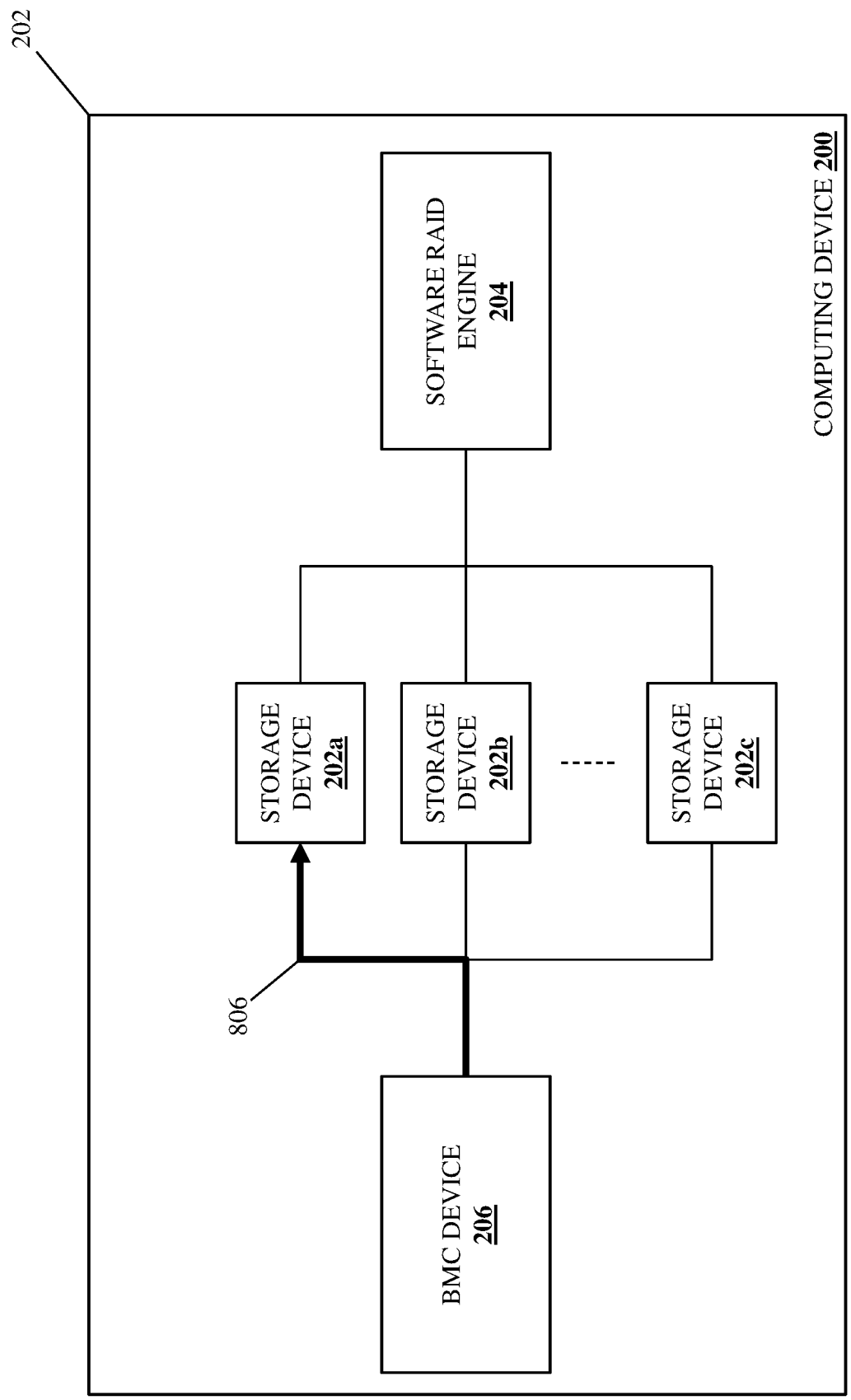
FIG. 8K is a schematic view illustrating an embodiment of the operation of the computing device of FIG. 2 during the method of FIGS. 5A and 5B.
Figure 8L:
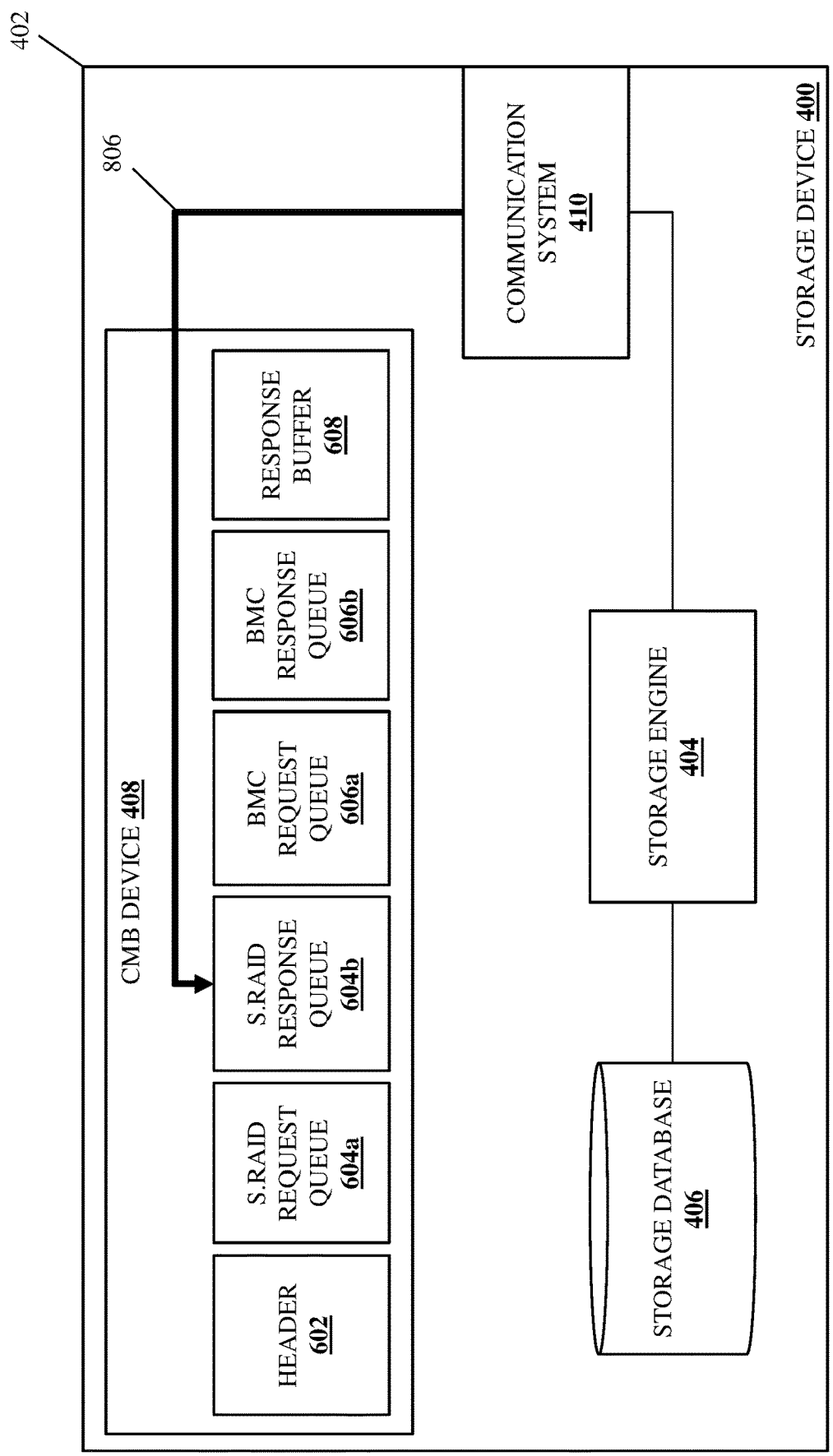
FIG. 8L is a schematic view illustrating an embodiment of the operation of the storage device of FIG. 4 during the method of FIGS. 5A and 5B.
Figure 8N:
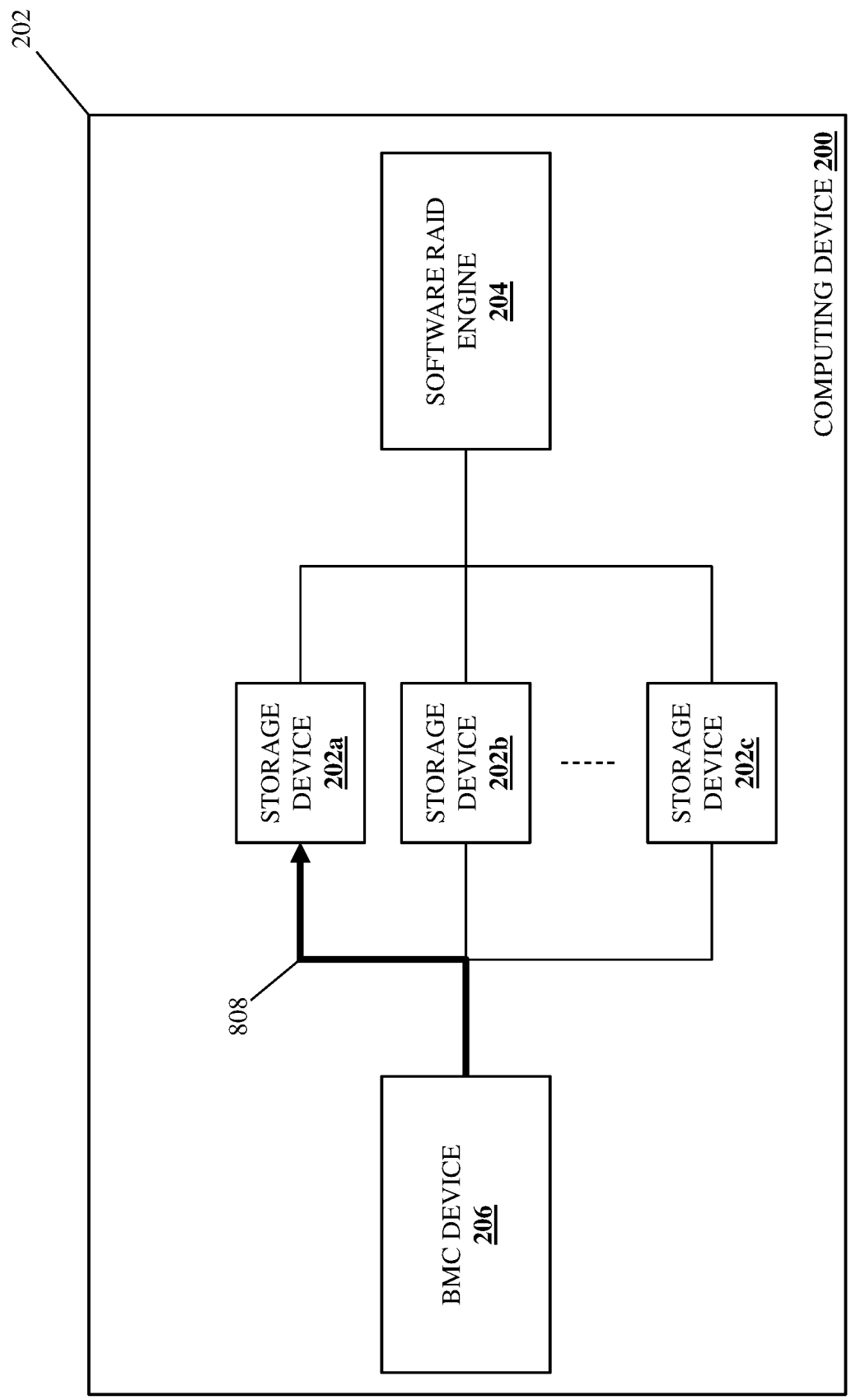
FIG. 8N is a schematic view illustrating an embodiment of the operation of the computing device of FIG. 2 during the method of FIGS. 5A and 5B.
Figure 8O:
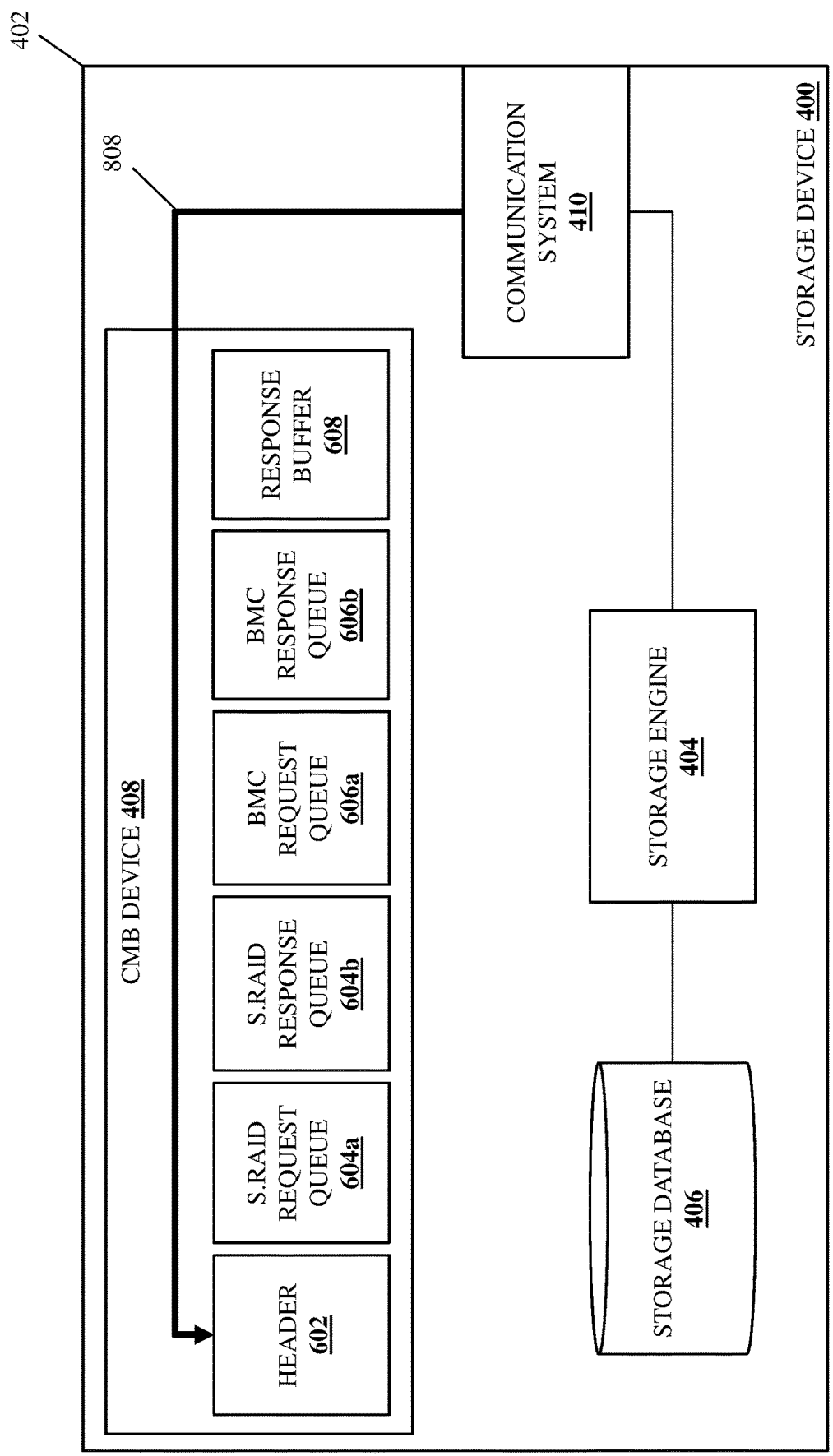
FIG. 8O is a schematic view illustrating an embodiment of the operation of the storage device of FIG. 4 during the method of FIGS. 5A and 5B.

With reference to FIGS. 8J, 8K, and 8L, in an embodiment of block 504c, the BMC engine 304 in the BMC device 206/300 in the computing device 200 may perform software RAID information response provisioning operations 806 that include transmitting a software RAID information response via its communication system 308 and the communication system 410 in the storage device 202a/400 to the software RAID response queue 604b in the CMB device 408 in the storage device 202a/400. Similarly as described above, any software RAID information responses (and/or alignments) submitted at block 504c may conform to MCTP standards. With reference to FIGS. 8M, 8N, and 8O, in an embodiment of block 504c, the BMC engine 304 in the BMC device 206/300 in the computing device 200 may perform software RAID information response identification operations 808 that include accessing the header 602 in the CMB device 408 of the storage device 202a/400 via its communication system 308 and the communication system 410 in the storage device 202a/400, and updating the head portion of the head/tail information in the header 602 (e.g., from the "0/1" following the provisioning of the software RAID information request by the software RAID engine 204 to "1/1") to indicate that the software RAID information response has been provided in response to the software RAID information request.

Returning to the management-initiated communication of blocks 506a-506c, and similarly as described above, at block 506c the software RAID subsystem provides the management information and a management information response in the storage device memory subsystem. While not illustrated and described in detail, one of skill in the art in possession of the present disclosure will appreciate how block 506c may be performed by the software RAID engine 204 in the computing device 200 similarly as described above for the performance of block 504c by the BMC engine 304 in the BMC device 206/300 in the computing device 200. As such, the software RAID engine 204 may retrieve the management information requested by the BMC engine 304, and transmit that management information to the response buffer 608 in the CMB device 408 in the storage device 202a/400. Furthermore, the software RAID engine 204 may transmit management information response to the BMC response queue 606b in the CMB device 408, and any management information responses (and/or alignments) submitted at block 506c may conform to MCTP standards. Finally, the software RAID engine 204 may also access the header 602 in the CMB device 408 of the storage device 202a/400, and update the tail portion of the head/tail information in the header 602 (e.g., from the "I/O" following the provisioning of the management information request by the BMC engine 304 to "1/1") to indicate that the management information response has been provided in response to the management information request.

Figure 9A:
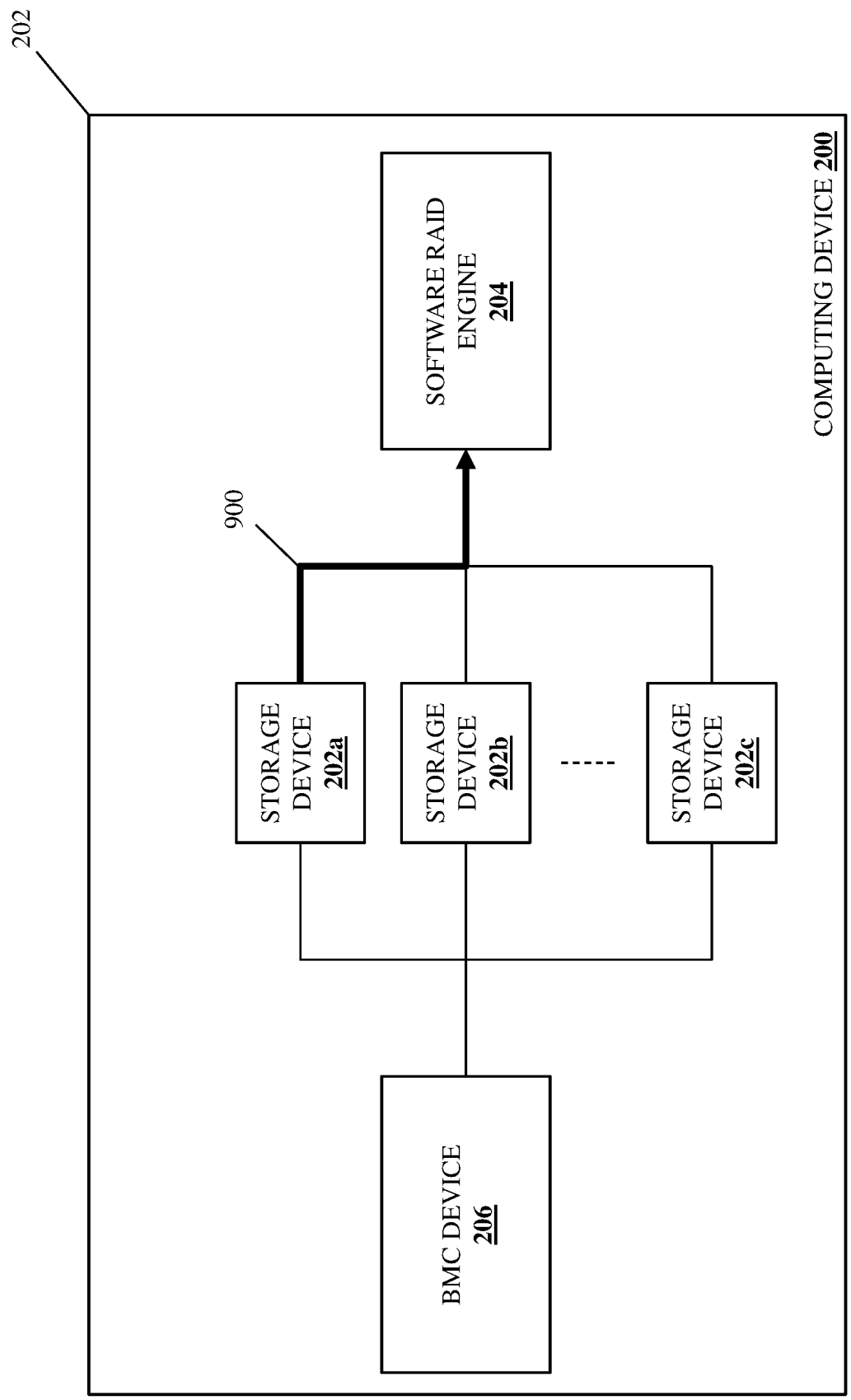
FIG. 9A is a schematic view illustrating an embodiment of the operation of the computing device of FIG. 2 during the method of FIGS. 5A and 5B.

Returning to the software-RAID-initiated communication of blocks 504a-504e, the method 500 then proceeds to block 504d where the software RAID subsystem identifies the software RAID information response in the storage device memory subsystem. With reference to FIGS. 9A and 9B, in an embodiment of block 504d and as part of the periodic accesses of the header 602 in the CMB device 408 of the storage device 202a/300, the software RAID engine 204 in the computing device 200 may perform software RAID information response identification operations 900 that include accessing the header 602 in the CMB device 408 in the storage device 202a/400 via the communication system 410 in the storage device 202a/400, and determining that the BMC engine 304 in the BMC device 206/300 in the computing device 200 has submitted a software RAID information response in the software RAID response queue 604b based on the tail portion being equal to the head portion of the head/tail information stored in the header 602 in the CMB device 408 (e.g., head/tail information such as "1/1" following a software RAID information response to an initial submission of a software RAID information request). In response to determining that the BMC engine 304 has submitted a software RAID information response in the software RAID response queue 604b, the software RAID engine 204 will retrieve the software RAID information response from the software RAID response queue 604b.

Returning to the management-initiated communication of blocks 506a-506e, and similarly as described above, at block 506d the management subsystem identifies the management information response in the storage device memory subsystem. While not illustrated and described in detail, one of skill in the art in possession of the present disclosure will appreciate how block 506d may be performed by the BMC engine 204 in the BMC device 206/300 in the computing device 200 similarly as described above for the performance of block 504d by the software RAID engine 204 in the computing device 200. As such, as part of the periodic accesses of the header 602 in the CMB device 408 of the storage device 202a/300, the BMC engine 304 in the BMC device 206/300 in the computing device 200 may access the header 602 in the CMB device 408 in the storage device 202a/400 and determine that the software RAID engine 204 has submitted a management information response in the management response queue 606b based on the head portion being equal to the tail portion of the head/tail information stored in the header 602 in the CMB device 408 (e.g., head/tail information such as "1/1" following a management information response to an initial submission of a management information request). In response to determining that the software RAID engine 204 has submitted a management information response in the management response queue 606b, the BMC engine 304 will retrieve the management information response from the management response queue 606b.

Figure 9C:
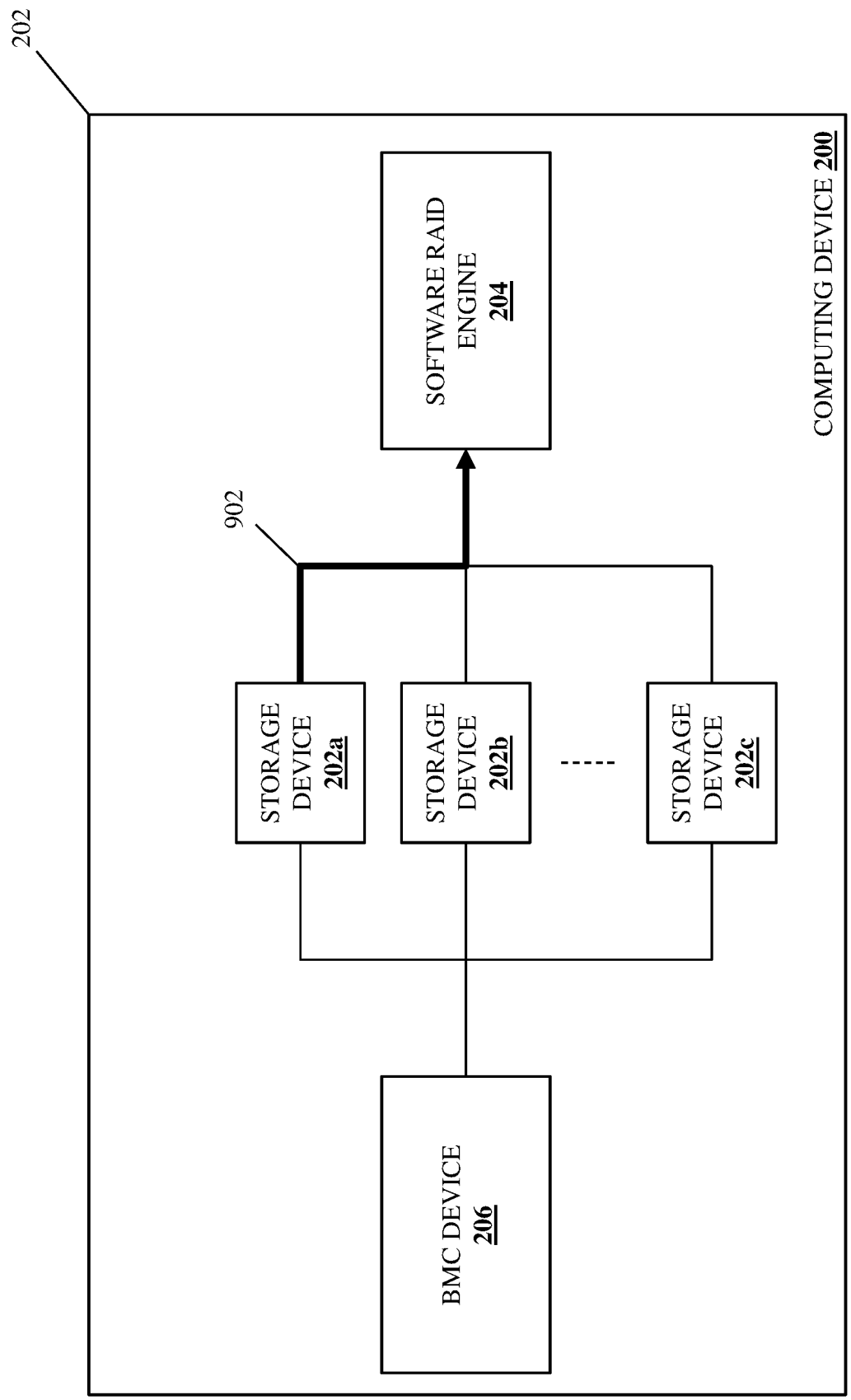
FIG. 9C is a schematic view illustrating an embodiment of the operation of the computing device of FIG. 2 during the method of FIGS. 5A and 5B.
Figure 9D:
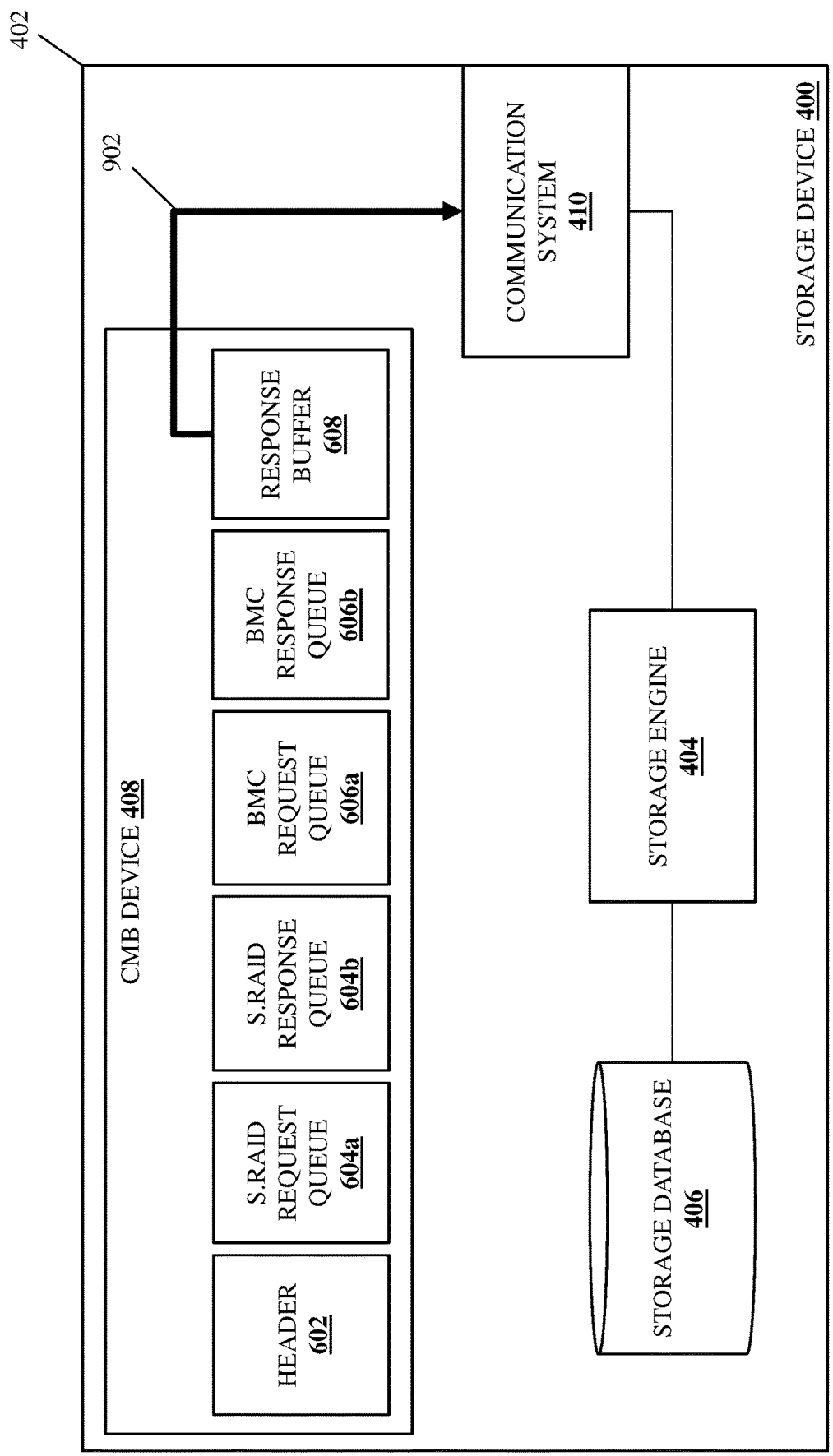
FIG. 9D is a schematic view illustrating an embodiment of the operation of the storage device of FIG. 4 during the method of FIGS. 5A and 5B.

Returning to the software-RAID-initiated communication of blocks 504a-504e, the method 500 then proceeds to block 504e where the software RAID subsystem retrieves the software RAID information from the storage device memory subsystem. With reference to FIGS. 9C and 9D, in an embodiment of block 504e and in response to determining that the BMC engine 304 in the BMC device 206/300 in the computing device 200 has submitted a management information response in the software RAID response queue 604*b*, the software RAID engine 204 in the computing device 200 may perform software RAID information retrieval operations 902 that include retrieving the software RAID information (provided by the BMC engine 304) from the response buffer 608 in the CMB device 408 in the storage device 202*a*/400 via the communication system 410 in the storage device 202*a*/400. As such, the software RAID engine 204 may request and receive software RAID information from the BMC device 206/300 using the CMB device 408 in the storage device 202*a*/400.

Returning to the management-initiated communication of blocks 506*a*-506*e*, and similarly as described above, at block 506*e* the management subsystem retrieves the management information from the storage device memory subsystem. While not illustrated and described in detail, one of skill in the art in possession of the present disclosure will appreciate how block 506*c* may be performed by the BMC engine 204 in the BMC device 206/300 in the computing device 200 similarly as described above for the performance of block 504*e* by the software RAID engine 204 in the computing device 200. As such, in response to determining that the software RAID engine 204 in the computing device 200 has submitted a management information response in the BMC response queue 606*b*, the BMC engine 304 may retrieve the management information (provided by the software RAID engine 204) from the response buffer 608 in the CMB device 408 in the storage device 202*a*/400. As such, the BMC device 206/300 may request and receive management information from the software RAID engine 204 using the CMB device 408 in the storage device 202*a*/400.

Thus, systems and methods have been described that utilize a storage device memory subsystem in a storage device for communications between a software RAID subsystem and a management subsystem. For example, the software RAID/management communication system of the present disclosure may include a chassis housing a software Redundant Array of Independent Disk (RAID) subsystem and a management subsystem that are each coupled to a storage device having a storage device memory subsystem. The software RAID subsystem provides a software RAID information request in the storage device memory subsystem that requests the management subsystem provide software RAID information associated with the operation of a software RAID provided by the software RAID subsystem, the software RAID subsystem then periodically accesses the storage device memory subsystem and, when the software RAID subsystem determines that the management subsystem has provided a management information response in the storage device memory subsystem, the software RAID subsystem retrieves the software RAID information that was provided in the storage device memory subsystem by the management subsystem. As such, critical, real-time data may be exchanged between software RAID subsystems and management subsystems without the need to rely on changes/updates to an SMBIOS, BIOS, and/or IPMI and the corresponding time delays required for such changes/updates.

As will be appreciated by one of skill in the art in possession of the present disclosure, the software RAID/management communication system described above utilizes a storage device memory subsystem (e.g., the CMB device provided in NVMe storage devices) in order to enable software RAID/management communications. However, in computing devices utilizing Serial Attached Small Computer System Interface (SCSI) (SAS) storage devices, Serial Advanced Technology Attachment (SATA) storage devices, and/or other non-NVMe storage devices that do not include storage device memory subsystems/CMB devices, Out-Of-Band (OOB) management communications via the management subsystem are not available via the software RAID/management communication techniques described above, thus presenting issues in such computing devices where inventory operations, monitoring operations, configuration operations, and/or other management operations are desirable on a RAID logical storage device provided by those storage devices.

Figure 10:
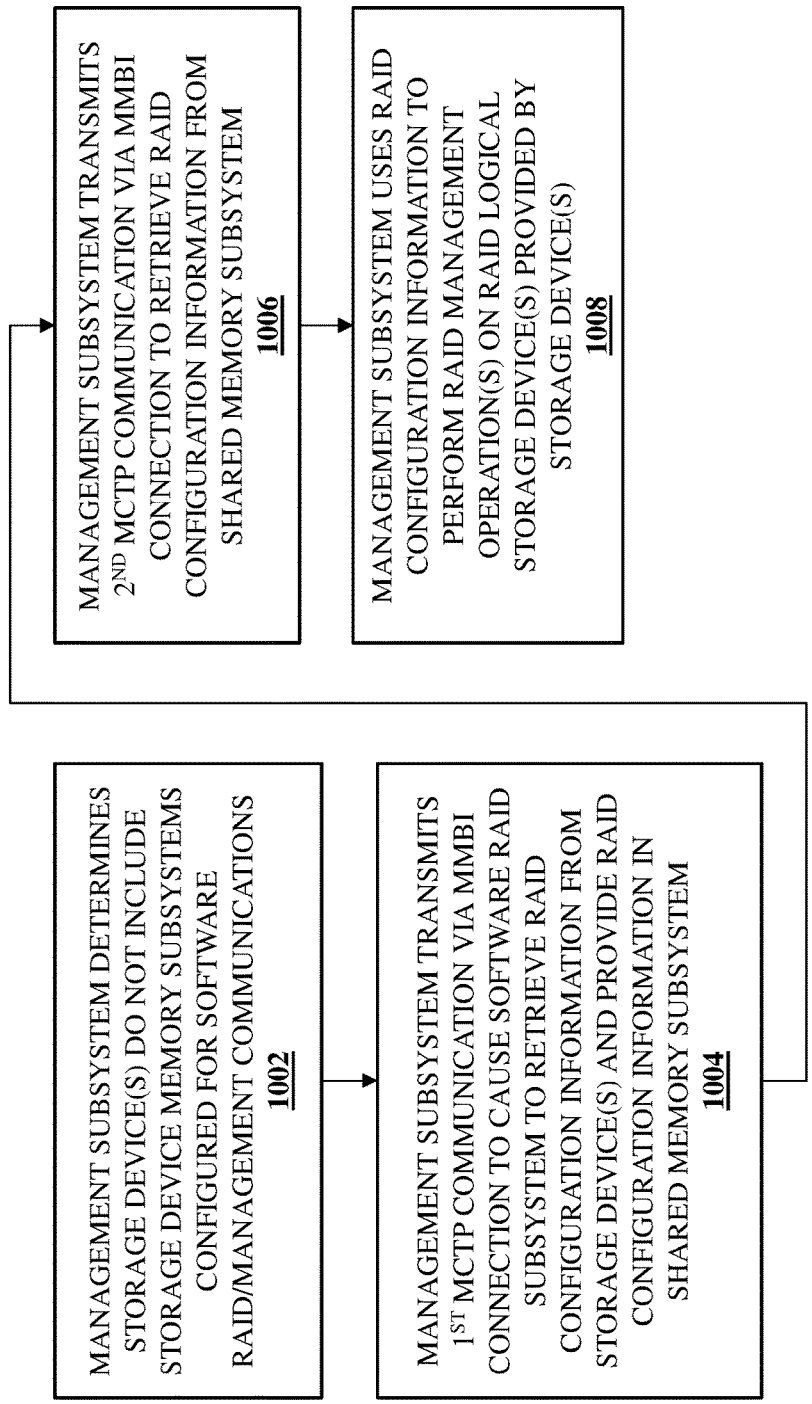
FIG. 10 is a flow chart illustrating an embodiment of a method for providing communication between a software RAID subsystem and a management subsystem in a computing device.

Referring now to FIG. 10, an embodiment of a method 1000 for providing communication between a software Redundant Array of Independent Disk (RAID) subsystem and a management subsystem in a computing device is illustrated. As discussed below, the systems and methods of the present disclosure utilize Management Component Transport Protocol (MCTP) communications via a Management Message Bus Interface (MMBI) connection of a management subsystem to a shared memory subsystem with a software RAID subsystem to provide communications between the management subsystem and the software RAID subsystem. For example, the software RAID/management communication system includes a chassis housing a software RAID subsystem coupled to a shared memory subsystem and storage devices, and a management subsystem that is coupled to the storage devices, and that is coupled to the shared memory subsystem via an MMBI connection. The management subsystem determines that at least one of the storage devices does not include a storage device memory subsystem that is configured for software RAID/management communications and, in response, transmits MCTP communications via the MMBI connection to retrieve RAID configuration information from the storage device(s) via the software RAID subsystem and the shared memory subsystem. The management subsystem then uses the RAID configuration information to perform at least one RAID management operation on at least one RAID logical storage device provided by the storage device(s). As such, the management subsystem may retrieve RAID configuration information for use in performing any of a variety of RAID management operations.

Figure 11:
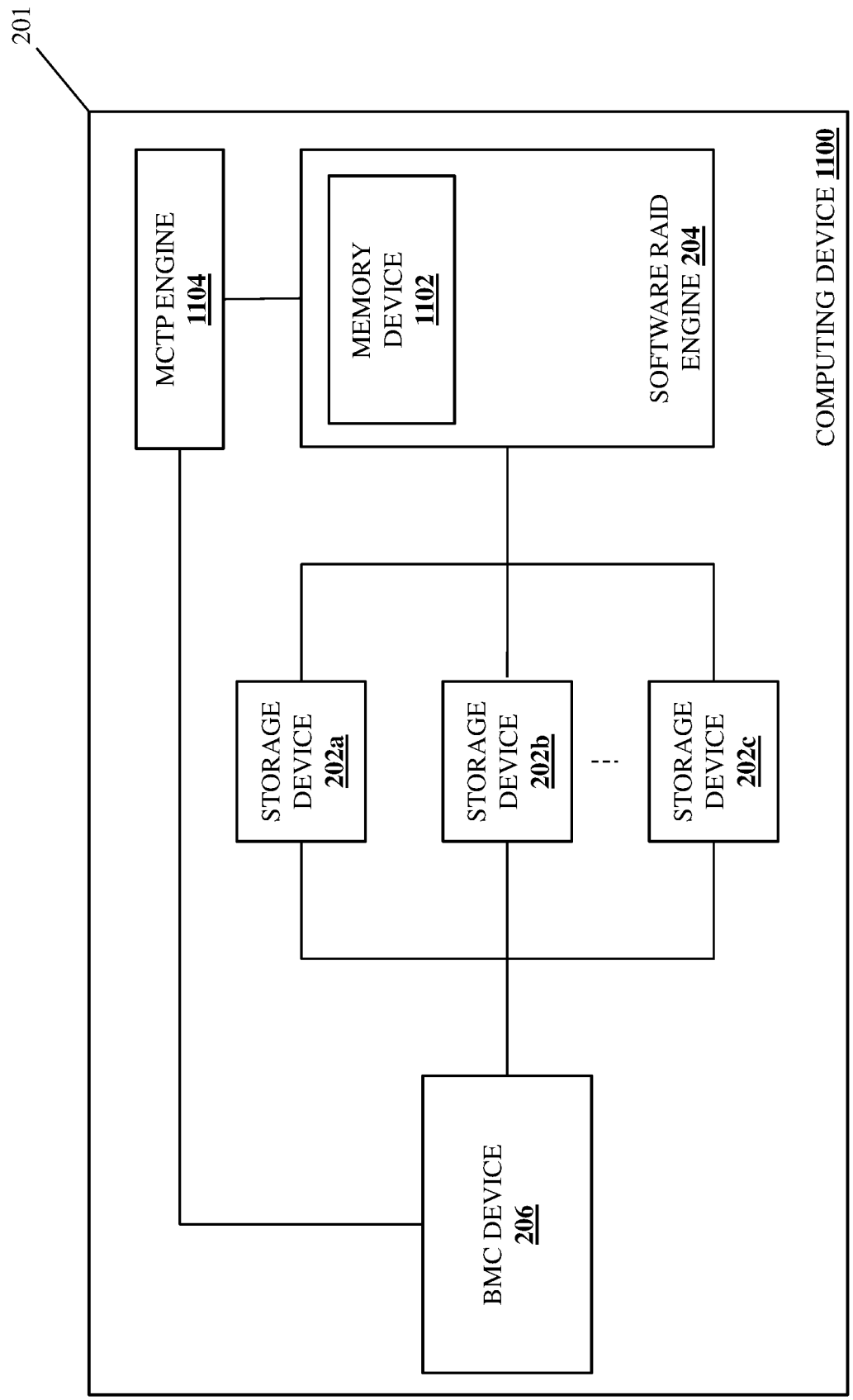
FIG. 11 is a schematic view illustrating an embodiment of the computing device of FIG. 2 that is used to discuss the method of FIG. 10.

With reference to FIG. 11, an embodiment of a computing device 1100 is illustrated that is used to describe the performance of the method 1100 in the specific examples provided below. As will be appreciated by one of skill in the art in possession of the present disclosure, the computing device 1100 is substantially similar to the computing device 200 discussed above with reference to FIG. 2, with similar elements having similar element numbers. However, the computing device 1100 is illustrated as including a shared memory subsystem that, in the illustrated embodiments, is provided by a memory device 1102 that is included in the software RAID engine 204. For example, the memory device 1102 may provide the memory system described above that is used to provide the software RAID engine 204. However, while the shared memory subsystem is illustrated and described as providing the software RAID engine 204 (and thus being "included in" the software RAID memory engine 204), one of skill in the art in possession of the present disclosure will appreciate how the shared memory subsystem may be located outside of the software RAID engine 204 and/or not used to provide the software RAID engine 204*a*, while still be accessible to the software RAID engine 204 for use as described below while remaining within the scope of the present disclosure as well.

The chassis 201 of the computing device 1100 may also include a processing system that is coupled to a memory system that includes instructions that, when executed by the processing system, cause the processing system to provide a Management Control Transfer Protocol (MCTP) engine 1104 that is configured to perform the functionality of the MCTP engines, MCTP subsystems, and/or computing devices described below. For example, the MCTP engine 1104 may be configured to provide an MCTP service for the computing device 1100. Furthermore, while not illustrated in the examples provided below, one of skill in the art in possession of the present disclosure will appreciate how the BMC engine in the BMC device 206 may include an MCTP service that is configured to communicate with the MCTP engine 1104 to provide the MCTP communications described below while remaining within the scope of the present disclosure as well.

As illustrated, the MCTP engine 1104 may be coupled to the software RAID engine 204 (e.g., via a coupling between the processing systems that provide the MCTP engine 1104 and the software RAID engine 204) and, as discussed below, may be coupled to the memory device 1102 or other shared memory subsystem that is accessible to the software RAID engine 204 as well. As described below, the MCTP engine 1104 may be coupled to the BMC device 206 to provide a Management Message Bus Interface (MMBI) connection between the processing system that provides the BMC engine 304 in the BMC device 206/300 and the memory device 1102 or other shared memory subsystem. As will be appreciated by one of skill in the art in possession of the present disclosure, the MMBI connection discussed below may include a memory mapped Peripheral Component Interconnect express (PCIe) interface between the BMC device 206 and a host operating system in the computing device 1100 that includes or has access to the memory device 1102 or other shared memory subsystem. However, while a specific computing device 1100 has been illustrated and described, one of skill in the art in possession of the present disclosure will appreciate how the computing device 1100 may include a variety of components and/or component configurations for providing conventional computing functionality, as well as the software RAID/management communication functionality described below, while remaining within the scope of the present disclosure as well.

Figure 12A:
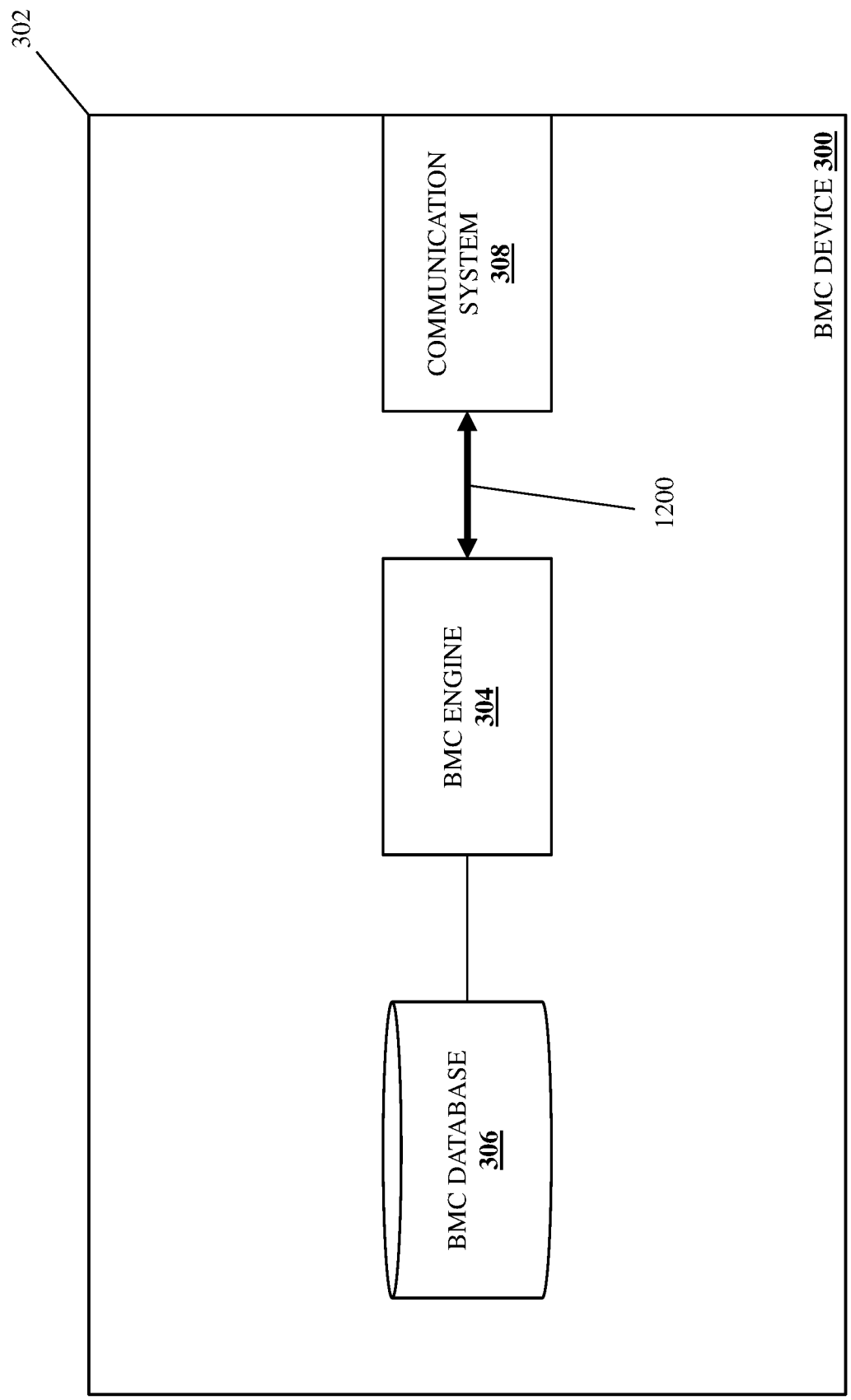
FIG. 12A is a schematic view illustrating an embodiment of the operation of the management subsystem of FIG. 3 during the method of FIG. 10.
Figure 12B:
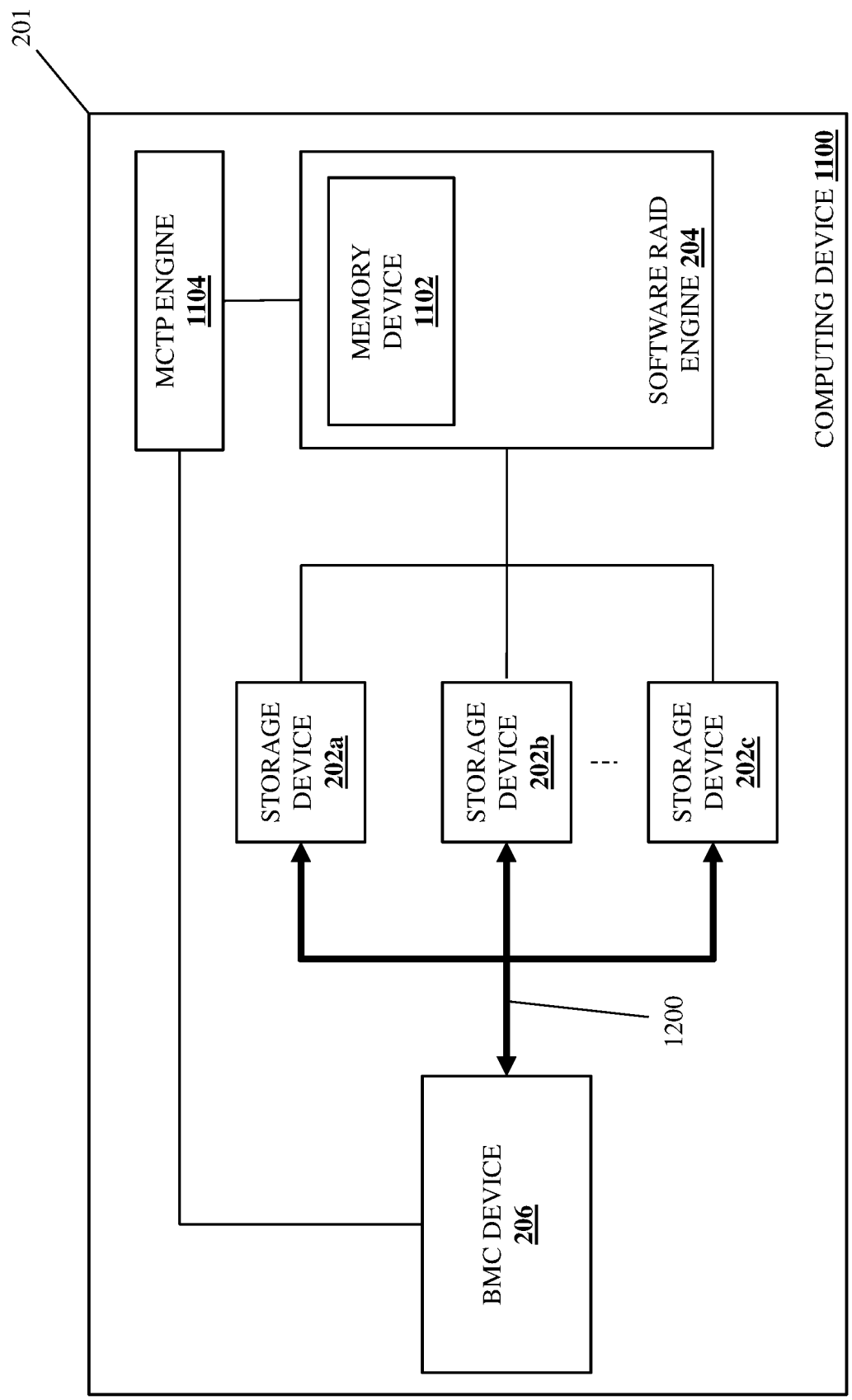
FIG. 12B is a schematic view illustrating an embodiment of the operation of the computing device of FIG. 11 during the method of FIG. 10.

The method 1000 may begin at block 1002 where a management subsystem determines at least one storage device does not include a storage device memory subsystem configured for software RAID/management communications. With reference to FIGS. 12A and 12B, in an embodiment of block 1002, the BMC engine 304 in the BMC device 206/300 may perform storage-device-memory-subsystem-free storage device determination operations 1200 that include determining via its communication system 308 whether each of the storage devices 202a-202c include a storage device memory subsystem such as the CMB device 408 described above. However, while the storage-device-memory-subsystem-free storage device determination operations 1200 illustrate the BMC engine 304/BMC device 206/300 accessing the storage devices 202a-202c to determine whether they include storage device memory subsystems, one of skill in the art in possession of the present disclosure will appreciate how the BMC engine 304/BMC device 206/300 need not physically access the storage devices 202a-202c to determine whether they include storage device memory subsystems while remaining within the scope of the present disclosure.

For example, one of skill in the art in possession of the present disclosure will appreciate how the SAS and SATA storage devices described above do not include storage device memory subsystems like the CMB device 408 in the NVMe storage devices described above, and may be accessed and controlled by the software RAID engine 204 via a Platform Controller Hub (PCH) device (e.g., a DELL® POWEREDGE® RAID Controller (PERC) S150 available from DELL® Inc. of Round Rock, Texas, United States) and/or other controller device known in the art. As such, the storage-device-memory-subsystem-free storage device determination operations 1200 may be performed by the BMC engine 304 using a Basic Input/Output System (BIOS) Peripheral Component Interconnect express (PCIe) inventory to determine whether such a controller device is present in the computing device 200, which one of skill in the art in possession of the present disclosure will recognize will indicate whether there are any SAS or SATA storage devices (or other non-NVMe storage devices) that do not include storage device memory subsystems like the CMB device 408 described above (i.e., if there is no controller device like the PCH device discussed above, then there are no SAS or SATA storage devices). However, while a few specific examples of determining whether storage devices do not include storage device memory subsystems like the CMB device 408 described above have been discussed, one of skill in the art in possession of the present disclosure will appreciate how the BMC engine 304/BMC device 206/300 may determine whether the storage devices 202a-202c include storage device memory subsystems in a variety of manners that will fall within the scope of the present disclosure.

Figure 13A:
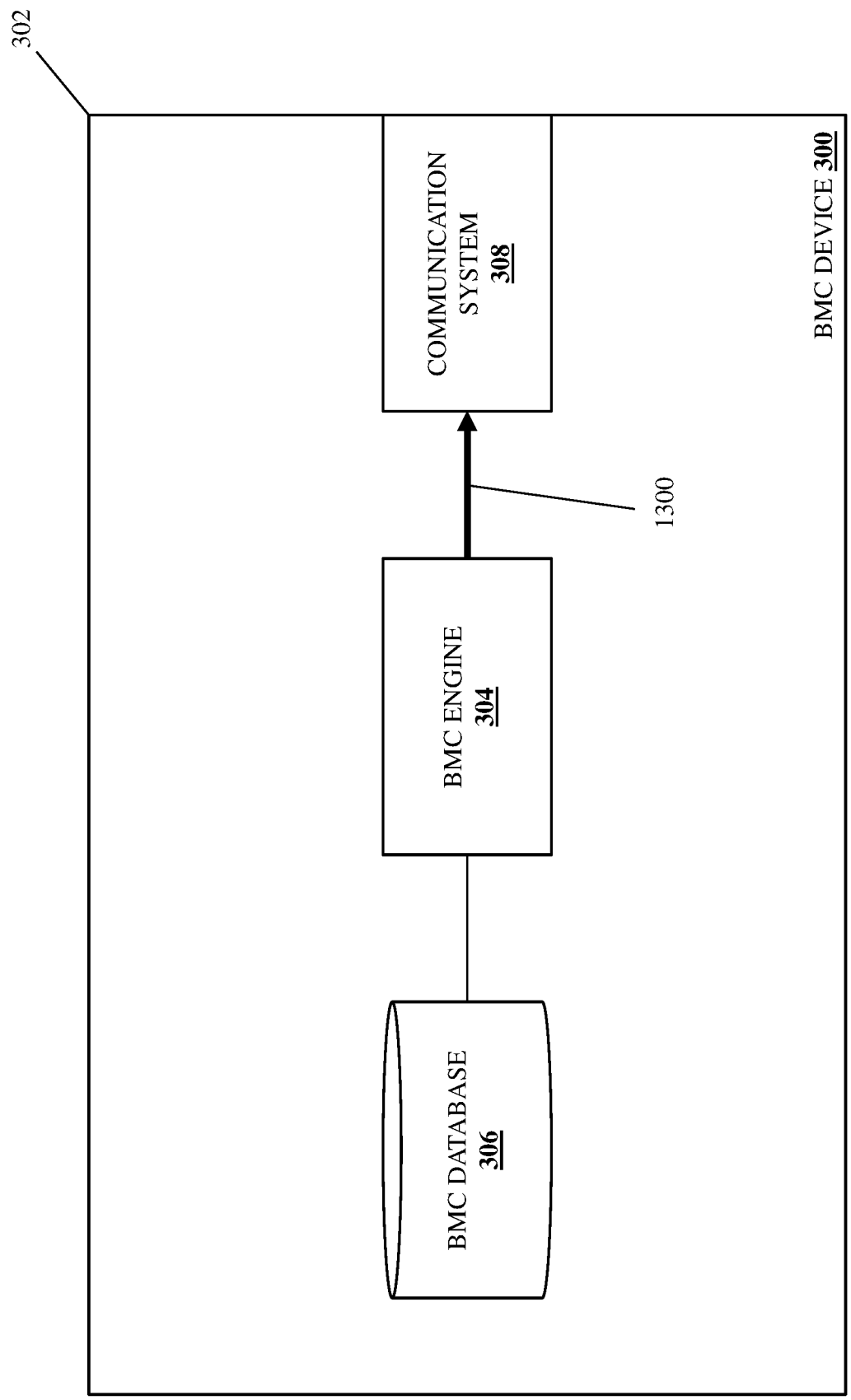
FIG. 13A is a schematic view illustrating an embodiment of the operation of the management subsystem of FIG. 3 during the method of FIG. 10.
Figure 13B:
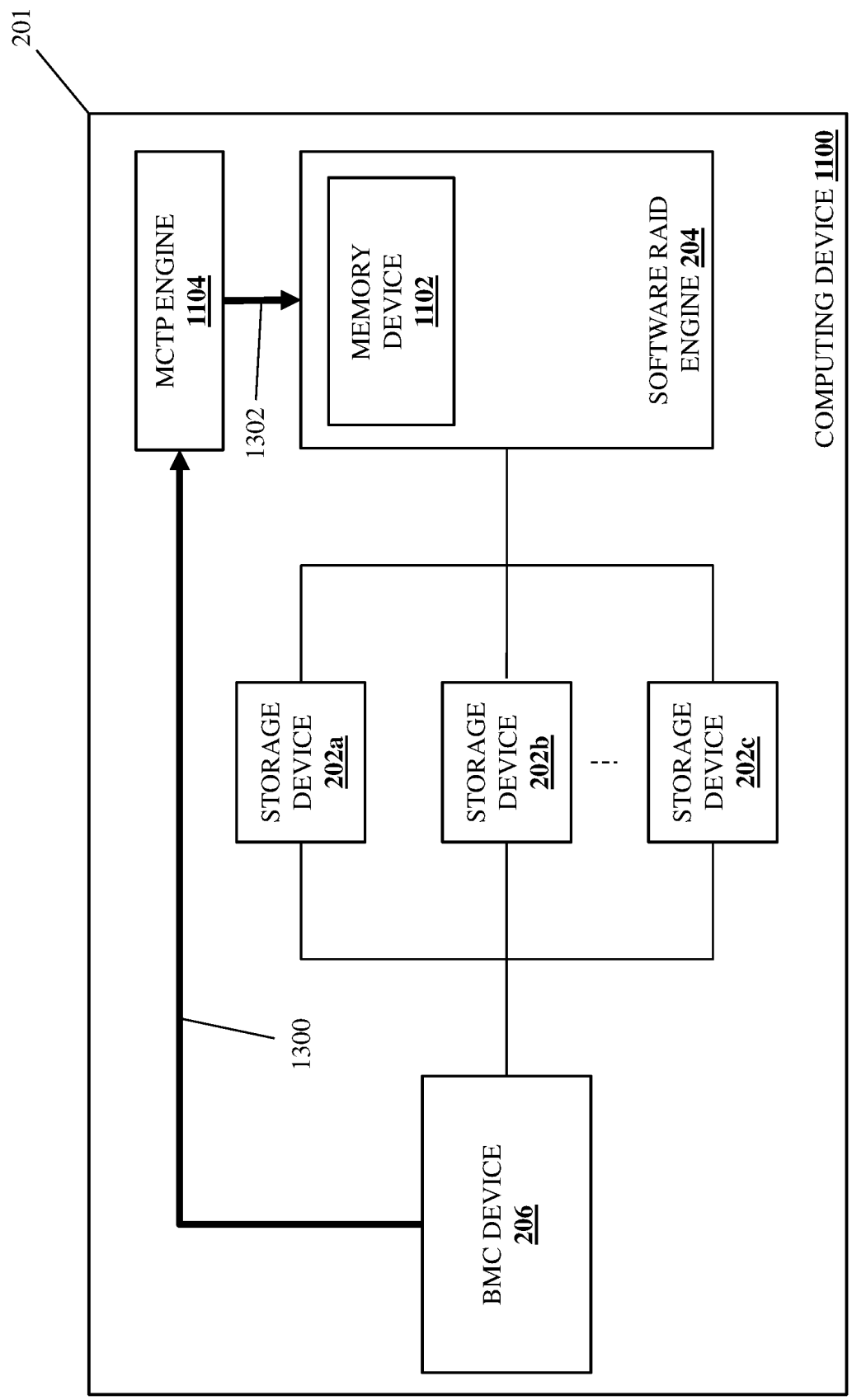
FIG. 13B is a schematic view illustrating an embodiment of the operation of the computing device of FIG. 11 during the method of FIG. 10.

The method 1000 then proceeds to block 1004 where the management subsystem transmits a first MCTP communication via an MMBI connection to cause a software RAID subsystem to retrieve RAID configuration information from the storage device(s) and provide the RAID configuration information in a shared memory subsystem. With reference to FIGS. 13A and 13B, in an embodiment of block 1004, the BMC engine 304 in the BMC device 206/300 may perform MCTP communication operations 1300 that include generating a first MCTP communication for a storage device that was determined to not include a storage device memory subsystem at block 1002, and transmitting that first MCTP communication via the MMBI connection to the MCTP engine 1104, with that first MCTP communication configure to cause the MCTP engine 1104 to instruct the software RAID engine 204 to provide RAID configuration information from that storage device in the memory device 1102.

For example, the first MCTP communication may include an MCTP header, an application header including a software RAID engine identifier for the software RAID engine 204a as its destination identifier, and a payload that includes a RAID configuration information provisioning instruction that instructs the provisioning of RAID configuration information in the memory device 1102 by the storage device that does not include the storage device memory subsystem. With reference to FIG. 13B, in response to receiving the first MCTP communication from the BMC engine 304 in the BMC device 206/300 as part of the MCTP communication operations 1300, the MCTP engine 1104 will perform first MCTP communication forwarding operations 1302 that may include accessing the destination identifier in the first MCTP communication, identifying the software RAID engine identifier for the software RAID engine 204a and, in response, forwarding the first MCTP communication/RAID configuration information provisioning instruction to the software RAID engine 204. As will be appreciated by one of skill in the art in possession of the present disclosure, the first MCTP communication forwarding operations 1302 may include any of a variety of processing operations by the MCTP engine 1104 on the first MCTP communication/RAID configuration information provisioning instruction required to forward that first MCTP communication/RAID configuration information provisioning instruction to the software RAID engine 204.

As will be appreciated by one of skill in the art in possession of the present disclosure, while block 1004 is described above as including the transmission of a first MCTP communication for a single storage device that does not include a storage device memory subsystem like the CMB device 408 discussed above, block 1004 may be performed to transmit a respective first MCTP communication for each storage device that does not include a storage device memory subsystem. As such, with reference to FIG. 13C and in response to receiving the first MCTP communications for the storage devices that do not include storage device memory subsystems, the software RAID engine 204 may perform RAID configuration information retrieval operations 1304 that include retrieving RAID configuration information from each storage device that does not include a storage device memory subsystem, and storing that RAID configuration information in the memory device 1102.

Figure 13C:
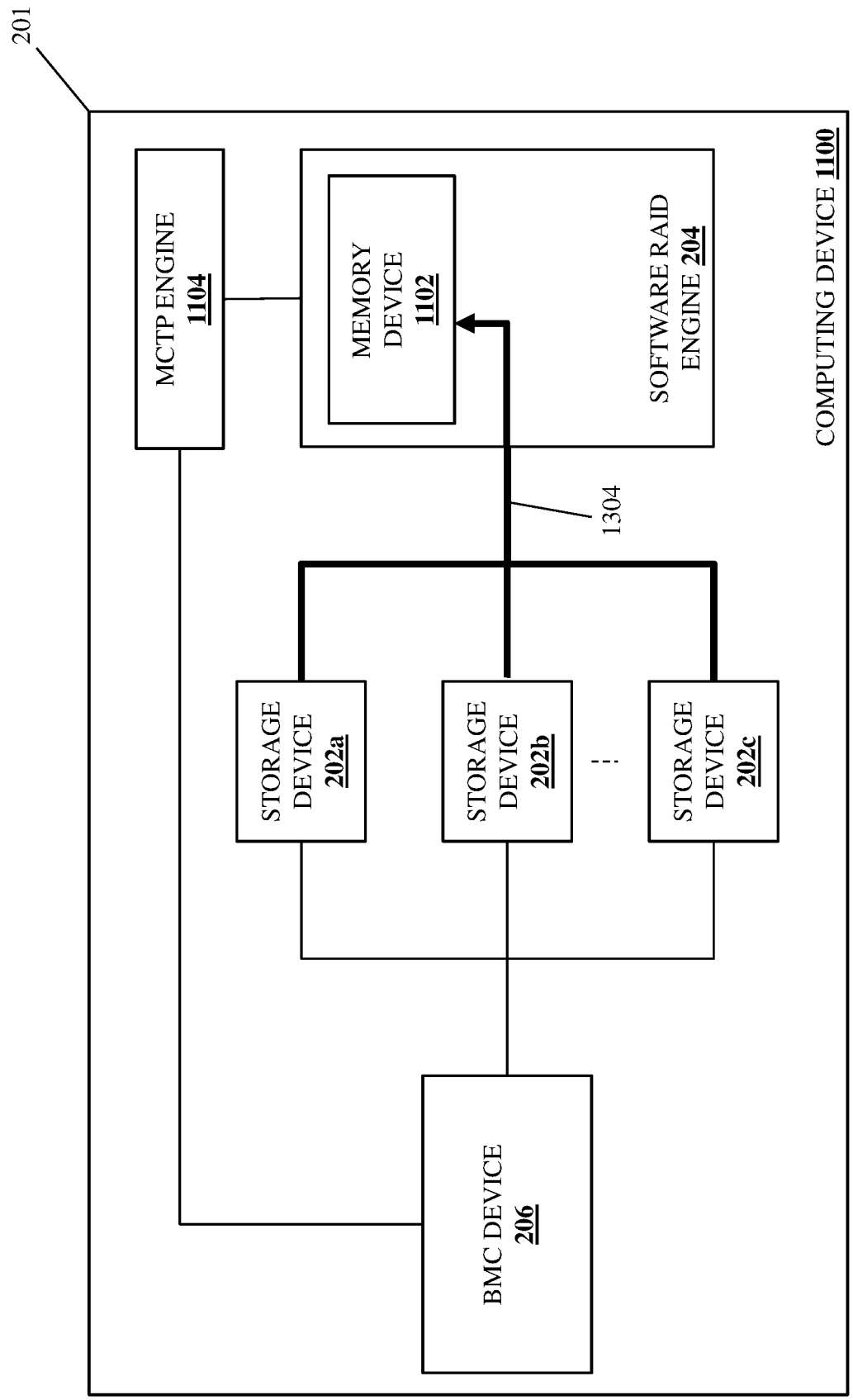
FIG. 13C is a schematic view illustrating an embodiment of the operation of the computing device of FIG. 11 during the method of FIG. 10.

For example, the RAID configuration information retrieval operations 1304 may include the software RAID engine 204 using the PCH device or other controller device discussed above to access the storage devices that do not include storage device memory subsystems and retrieve the RAID configuration information. Furthermore, while FIG. 13C illustrates RAID configuration information being retrieved from each of the storage devices 202a-202c and stored in the memory device 1102, one of skill in the art in possession of the present disclosure will appreciate how only a subset of the storage devices 202a-202c may not include a storage device memory subsystem, and thus the RAID configuration information may only be retrieved from that subset of storage devices while remaining within the scope of the present disclosure as well.

In an embodiment, the RAID configuration information described herein may include RAID metadata that may be provided in the Logical Block Addressing (LBA) scheme utilized by each storage device and that is used by the software RAID engine 204 to create the logical storage device(s), and that RAID metadata may include all the information needed by the BMC engine 304 in the BMC device 206/300 to perform RAID management operations described below. Furthermore, the retrieval of that RAID configuration information from the storage devices that do not include storage device memory subsystems and the storage of that RAID configuration information in the memory device 1102 may include providing that RAID configuration information in a RAID configuration information store (e.g., a RAID metadata store) that, as discussed below, is accessible by the BMC engine 304 in the BMC device 206/300 via the shared memory subsystem provided by the memory device 1102 using MCTP communications using the MMBI connection described above.

While not described in detail herein, the BMC engine 304 in the BMC device 206/300 may also retrieve the RAID configuration information (e.g., RAID metadata) from the storage devices that include storage memory subsystems (e.g., the NVMe storage devices including the CMB devices 408) using the techniques described above by, for example, transmitting NVMe Management Interface (NVMe-MI) commands in MCTP communications with NVMe storage devices in order to retrieve real-time inventories of RAID configuration information (e.g., RAID metadata) in the CMB device 408 of the NVMe storage devices.

Figure 14A:
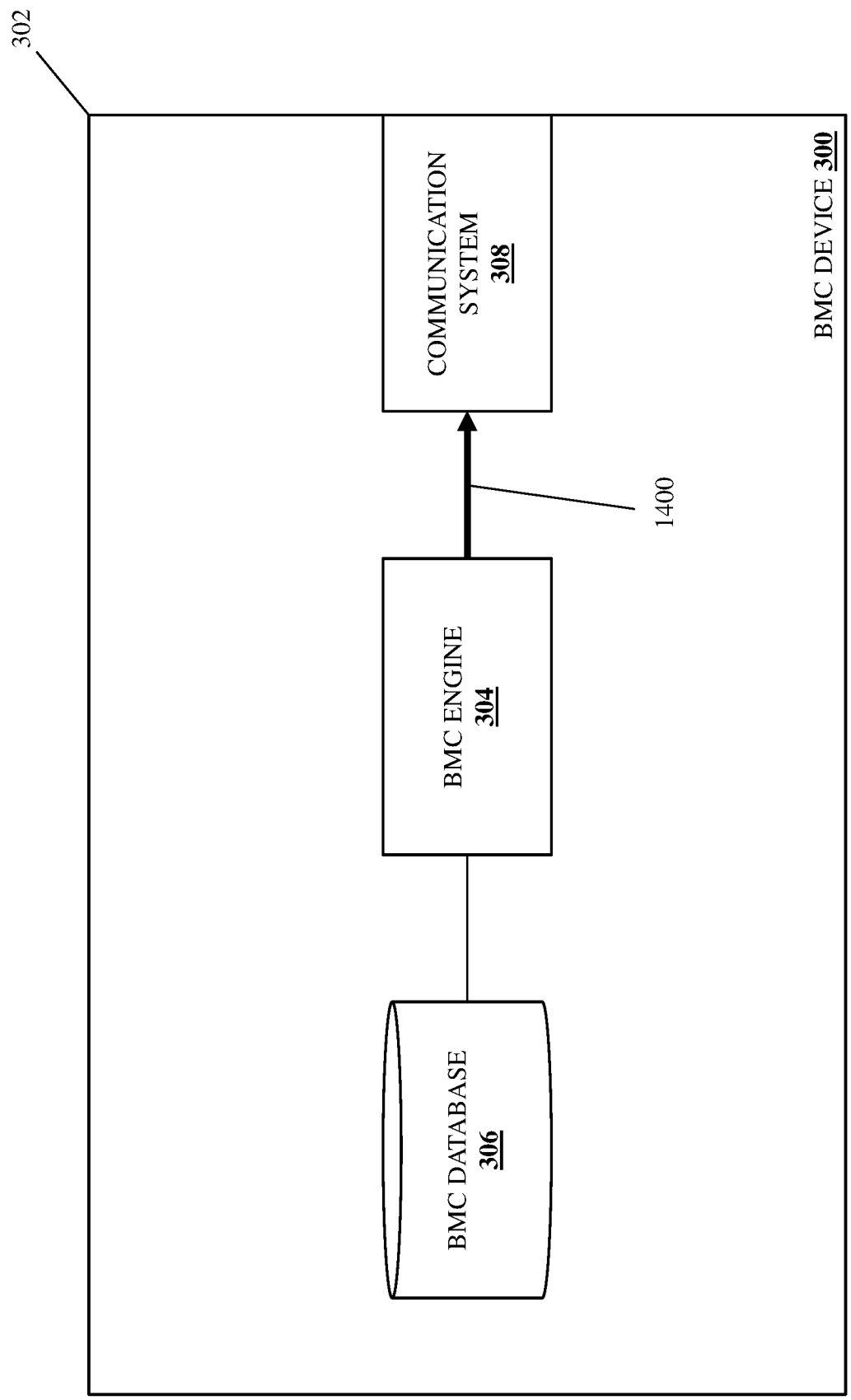
FIG. 14A is a schematic view illustrating an embodiment of the operation of the management subsystem of FIG. 3 during the method of FIG. 10.
Figure 14B:
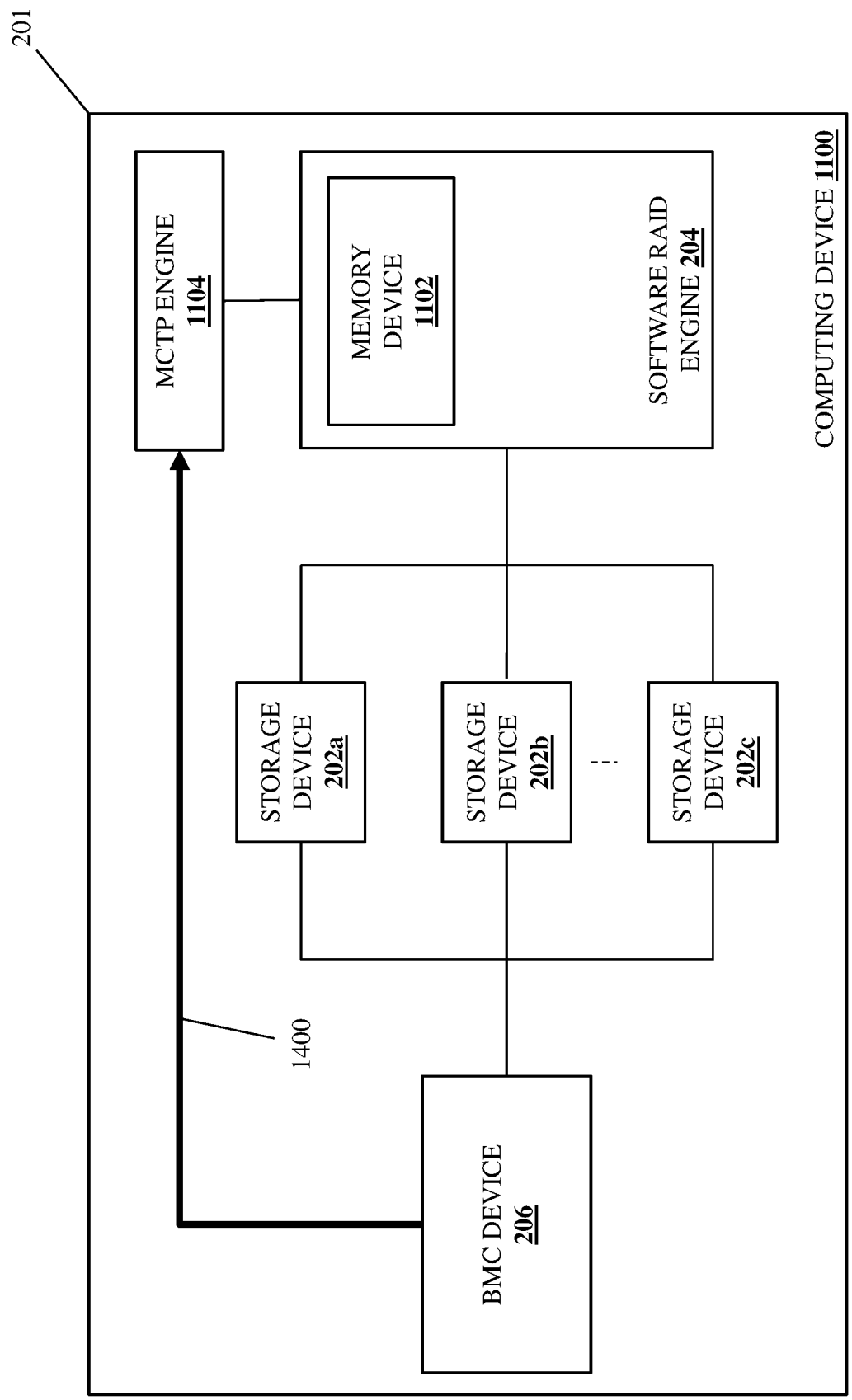
FIG. 14B is a schematic view illustrating an embodiment of the operation of the computing device of FIG. 11 during the method of FIG. 10.

The method 1000 then proceeds to block 1006 where the management subsystem transmits a second MCTP communication via the MMBI connection to retrieve the RAID configuration information from the shared memory subsystem. With reference to FIGS. 14A and 14B, in an embodiment of block 1006, the BMC engine 304 in the BMC device 206/300 may perform MCTP communication operations 1400 that include generating a second MCTP communication for each storage device that was determined to not include a storage device memory subsystem at block 1002, and transmitting the second MCTP communication(s) via the MMBI connection to the MCTP engine 1104, with the second MCTP communication(s) configured to cause the MCTP engine 1104 to retrieve RAID configuration information from the storage device(s) that was stored in the memory device 1102 at block 1004.

Figure 14C:
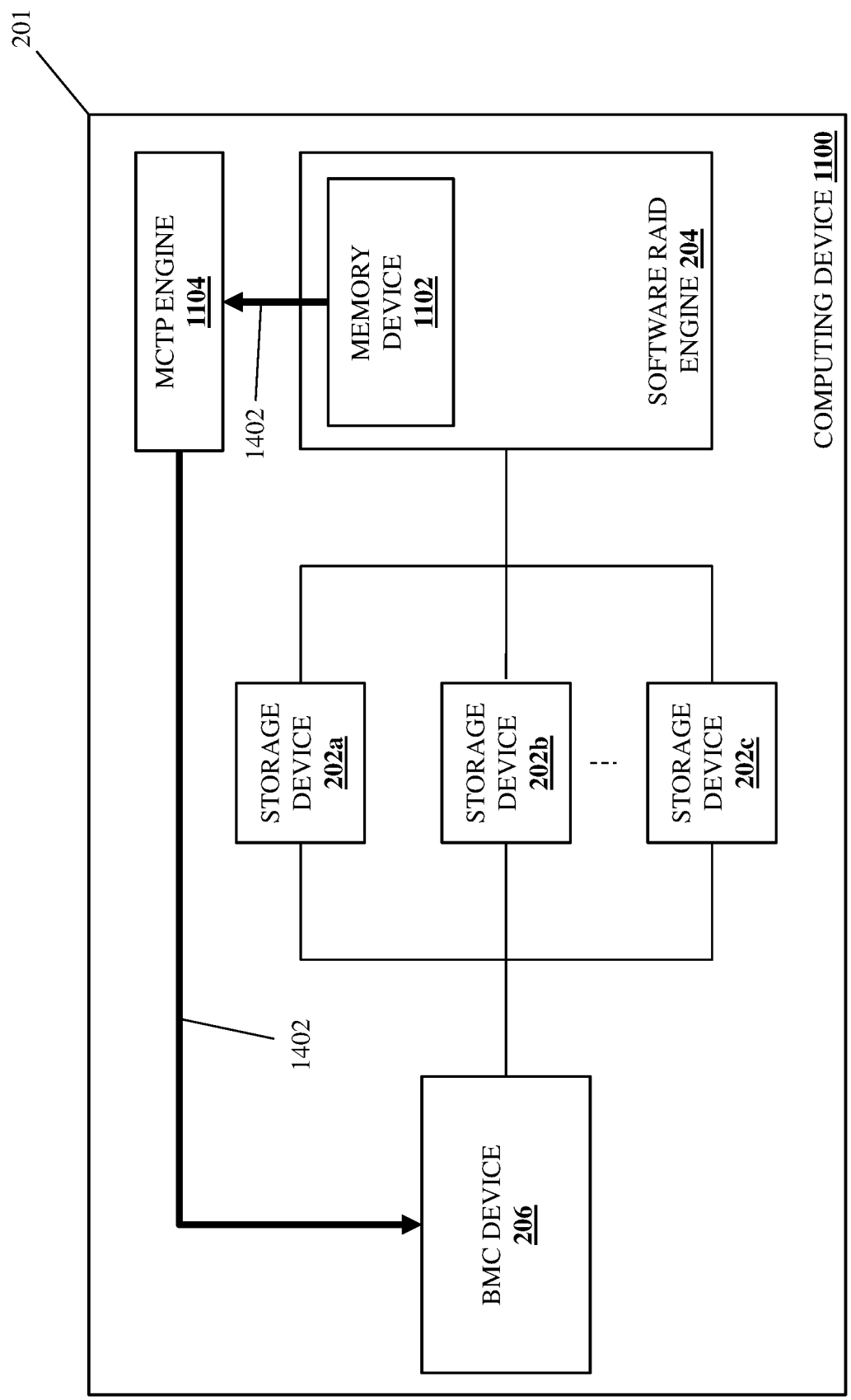
FIG. 14C is a schematic view illustrating an embodiment of the operation of the computing device of FIG. 11 during the method of FIG. 10.
Figure 14D:
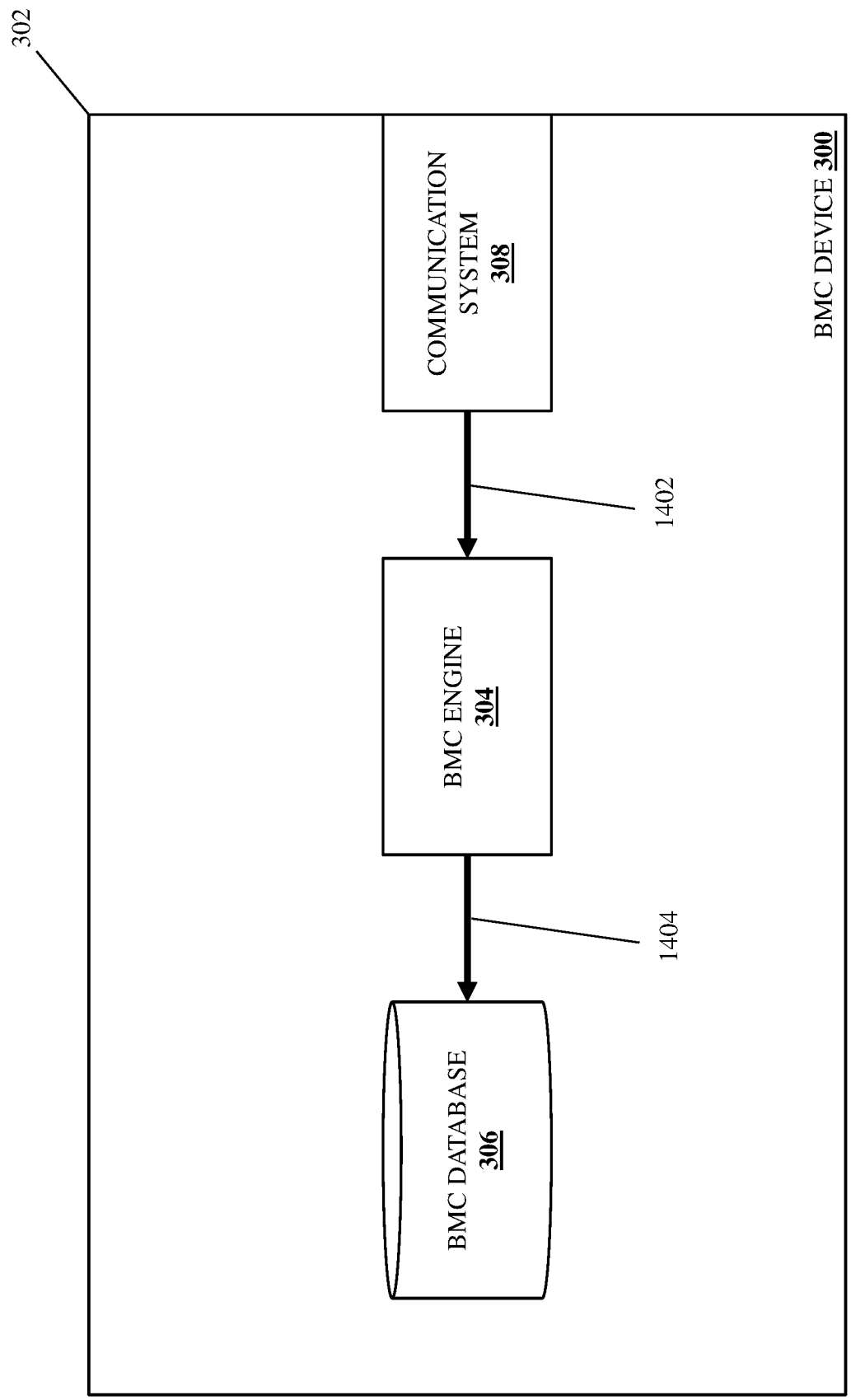
FIG. 14D is a schematic view illustrating an embodiment of the operation of the management subsystem of FIG. 3 during the method of FIG. 10.

With reference to FIGS. 14C and 14D, in response to receiving the second MCTP communication(s) from the BMC engine 304 in the BMC device 206/300 as part of the MCTP communication operations 1400, the MCTP engine 1104 will perform RAID configuration information provisioning operations 1402 that may include accessing the memory device 1102, retrieving the RAID configuration information that was stored in the memory device 1102 at block 1004, and transmitting that RAID configuration information to the BMC engine 304 in the BMC device 206/300 via its communication system 308. As such, the second MCTP communication(s) may allow the BMC engine 304 to access the RAID metadata store in the memory device 1102 and retrieve the RAID metadata from the storage devices that do not include storage device memory subsystems.

As illustrated in FIG. 14D, the BMC engine 304 in the BMC device 206/300 may then perform RAID configuration information storage operations 1404 that include storing the RAID configuration information received as part of the RAID configuration information provisioning operations 1402 in the BMC database 306. While not illustrated or described in detail herein, the BMC engine 304 in the BMC device 206/300 may also store the RAID configuration information retrieved from the storage devices including storage device memory subsystems (e.g., NVMe storage devices including the CMB devices 408 described above). As such, following block 1006, the BMC database 306 may include the RAID configuration information (e.g., RAID metadata) from all of the storage devices 202a-202c, which as described above includes all of the information needed by the BMC engine 304 in the BMC device 206/300 to perform the RAID management operations described herein on the logical storage device(s) provided by the storage devices 202a-202c.

Figure 15A:
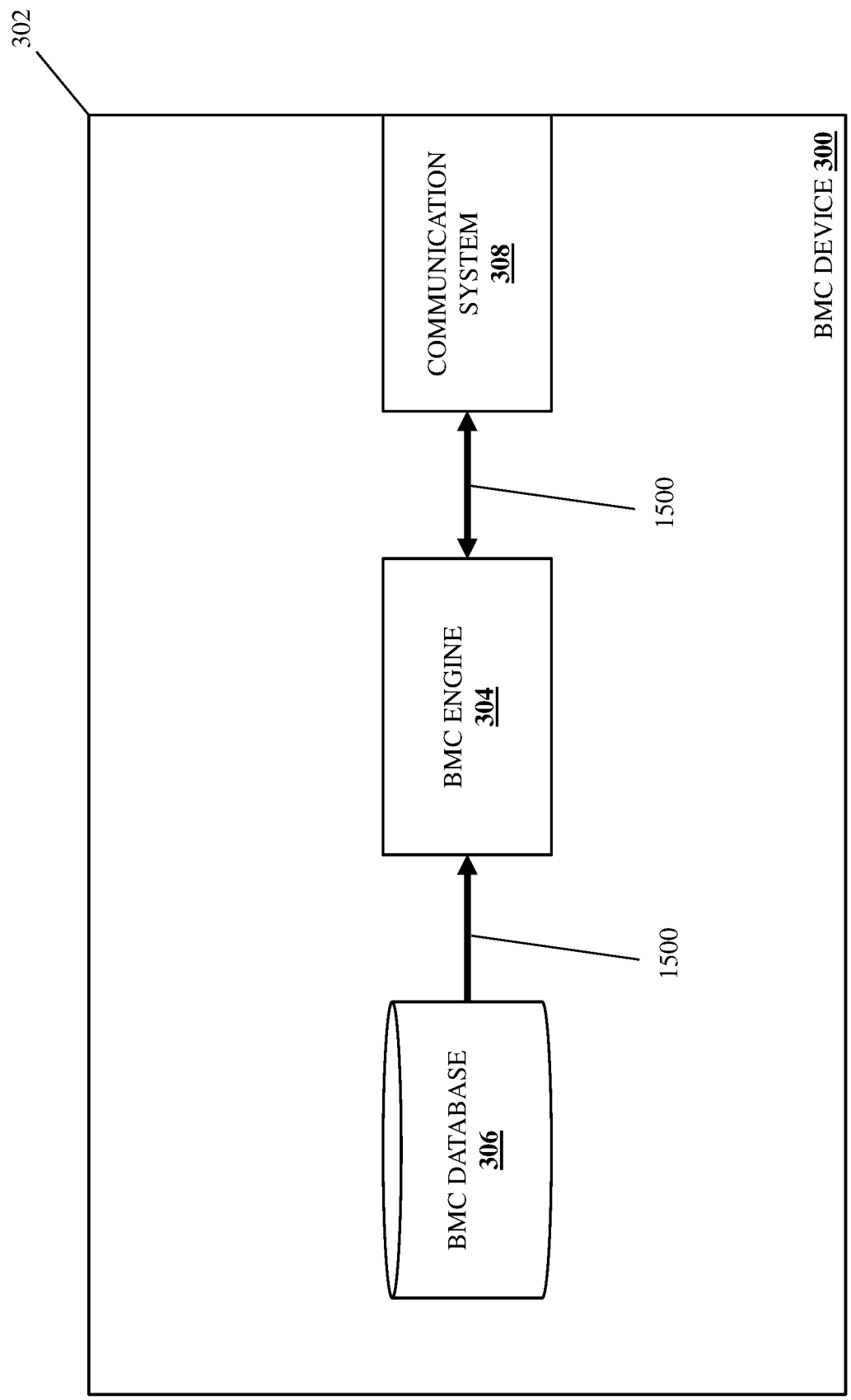
FIG. 15A is a schematic view illustrating an embodiment of the operation of the management subsystem of FIG. 3 during the method of FIG. 10.
Figure 15B:
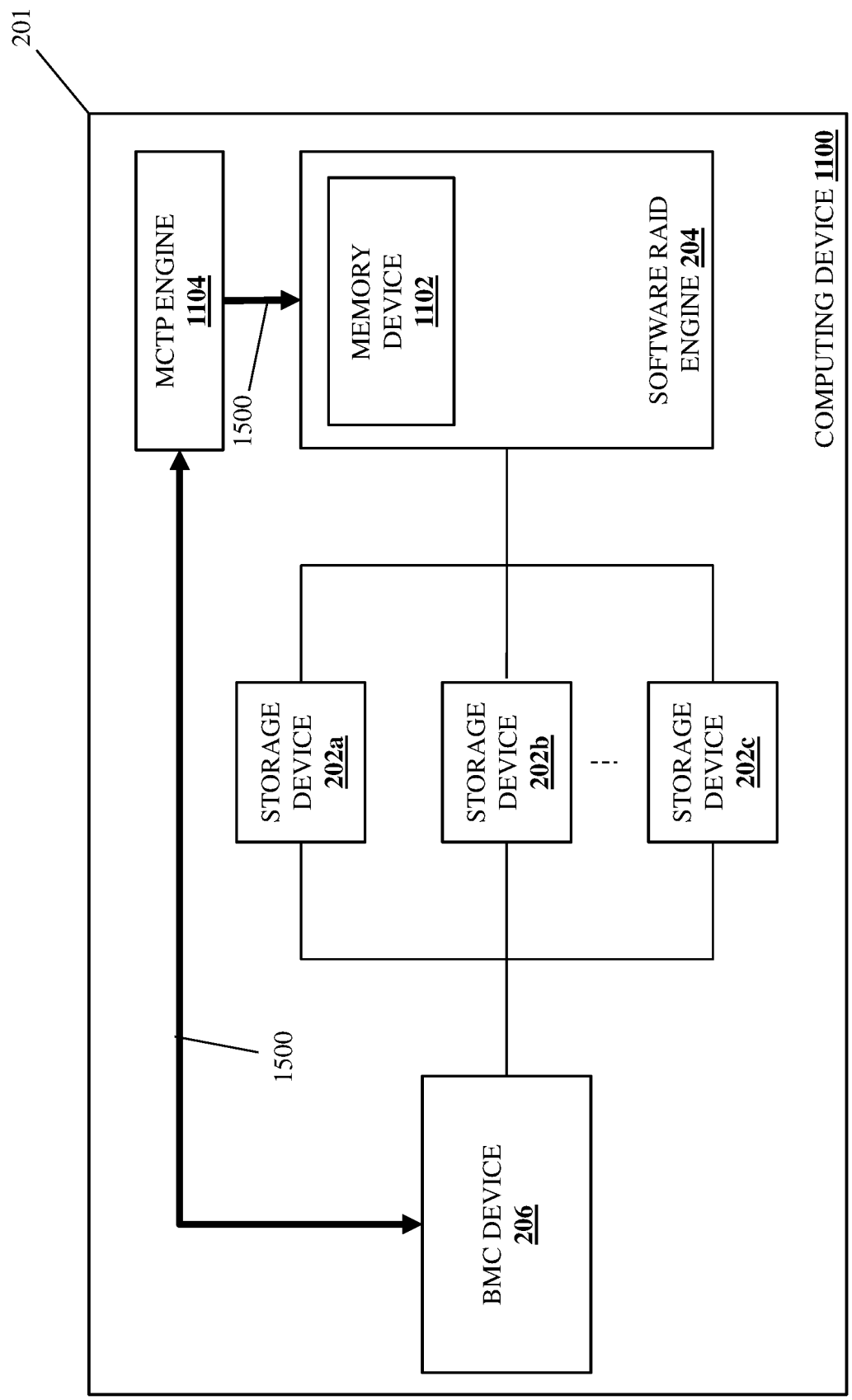
FIG. 15B is a schematic view illustrating an embodiment of the operation of the computing device of FIG. 11 during the method of FIG. 10.

The method 1000 then proceeds to block 1008 where the management subsystem uses the RAID configuration information to perform at least one RAID management operation on at least one RAID logical storage device provided by the storage device(s). With reference to FIGS. 15A and 15B, in an embodiment and as part of the RAID management operations performed at block 1008, the BMC engine 304 in the BMC device 206/300 may perform RAID management instruction transmission operations 1500 that may include the BMC engine 304 using the RAID configuration information stored in the BMC database 306 transmit MCTP communications via the MMBI connection to the MCTP engine 1104, with those MCTP communications including RAID management instructions associated with logical storage subsystems/logical storage device provided one or more of the storage devices 202a-202c.

Figure 15C:
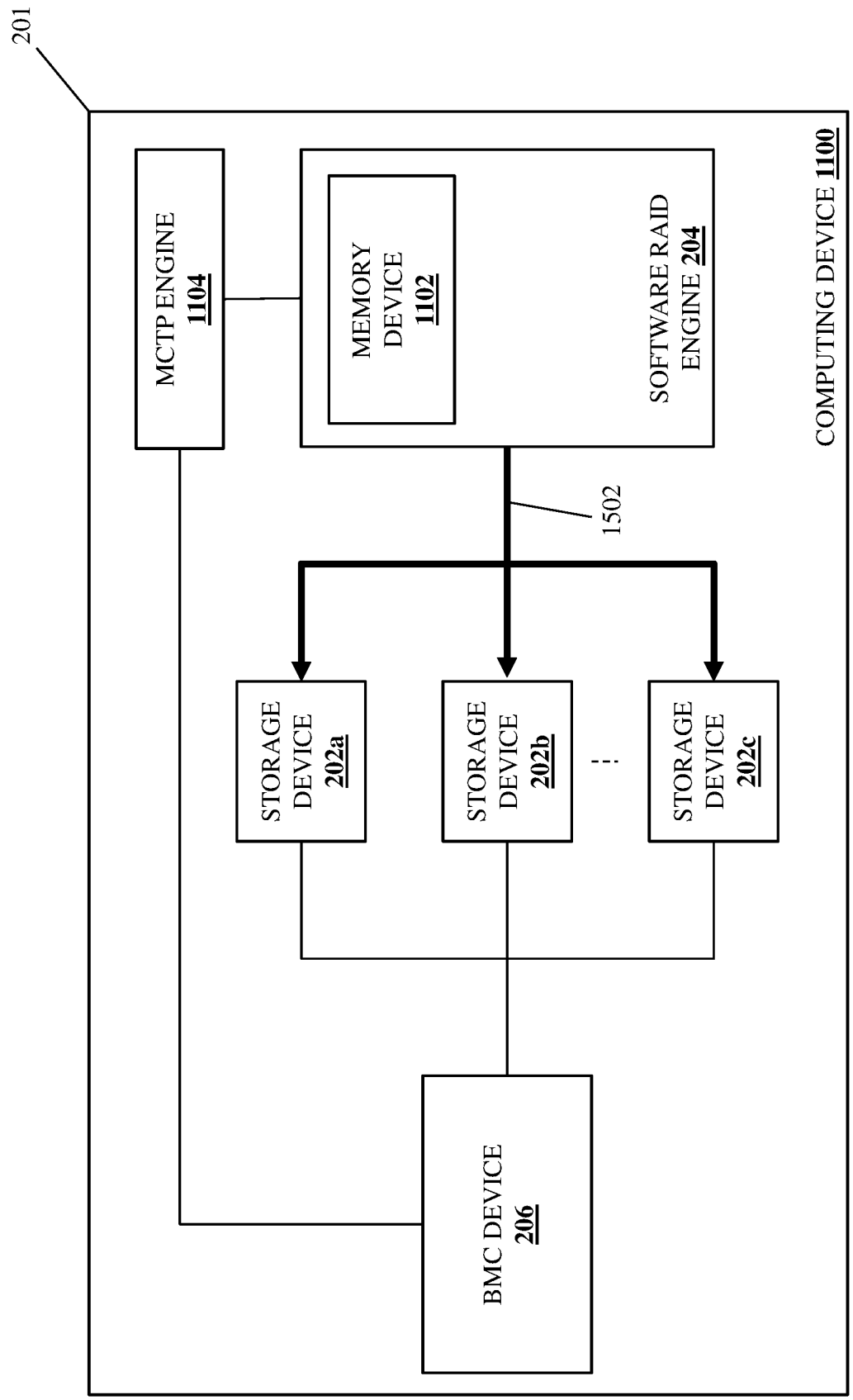
FIG. 15C is a schematic view illustrating an embodiment of the operation of the computing device of FIG. 11 during the method of FIG. 10.
Figure 15D:
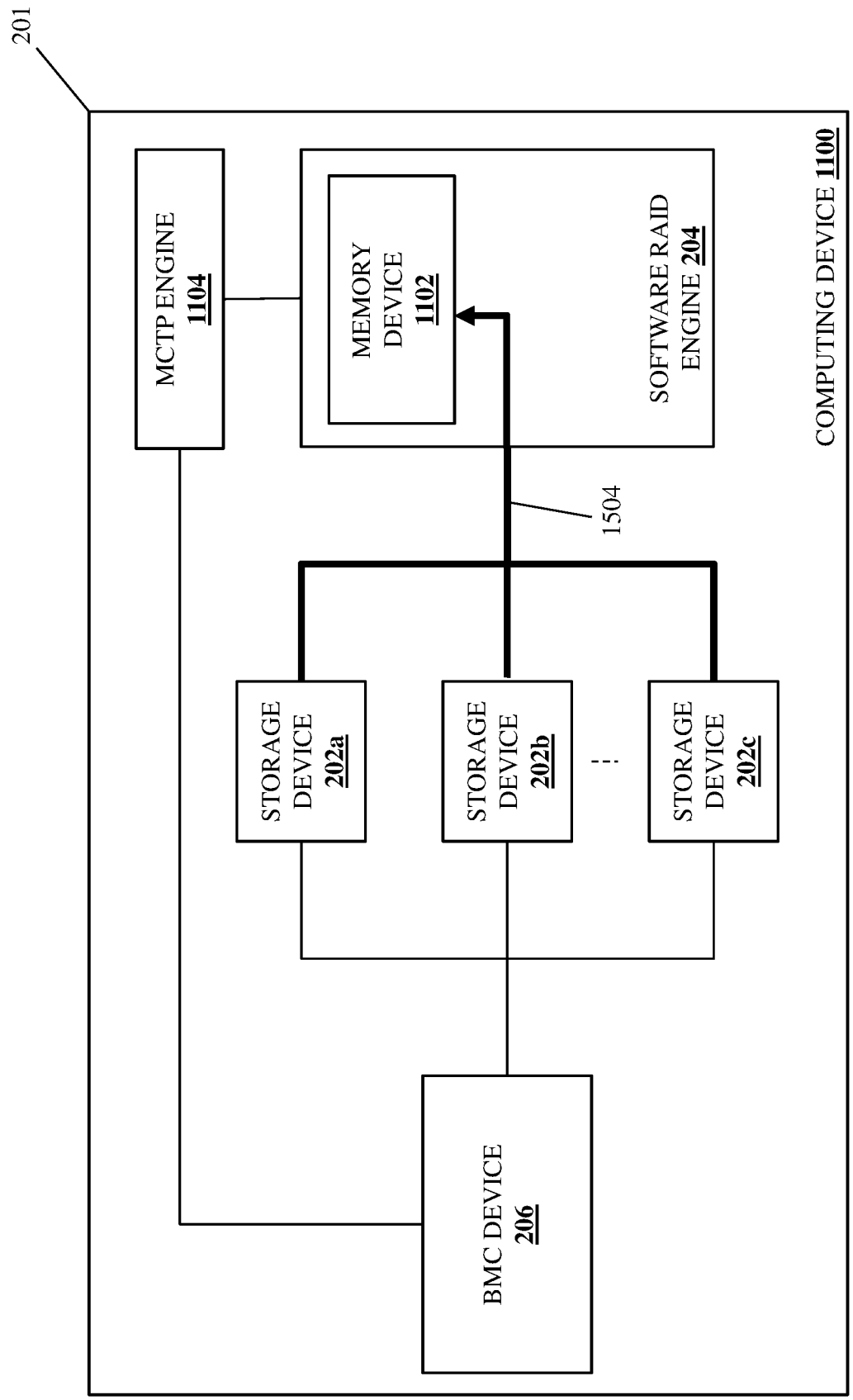
FIG. 15D is a schematic view illustrating an embodiment of the operation of the computing device of FIG. 11 during the method of FIG. 10.
Figure 15E:
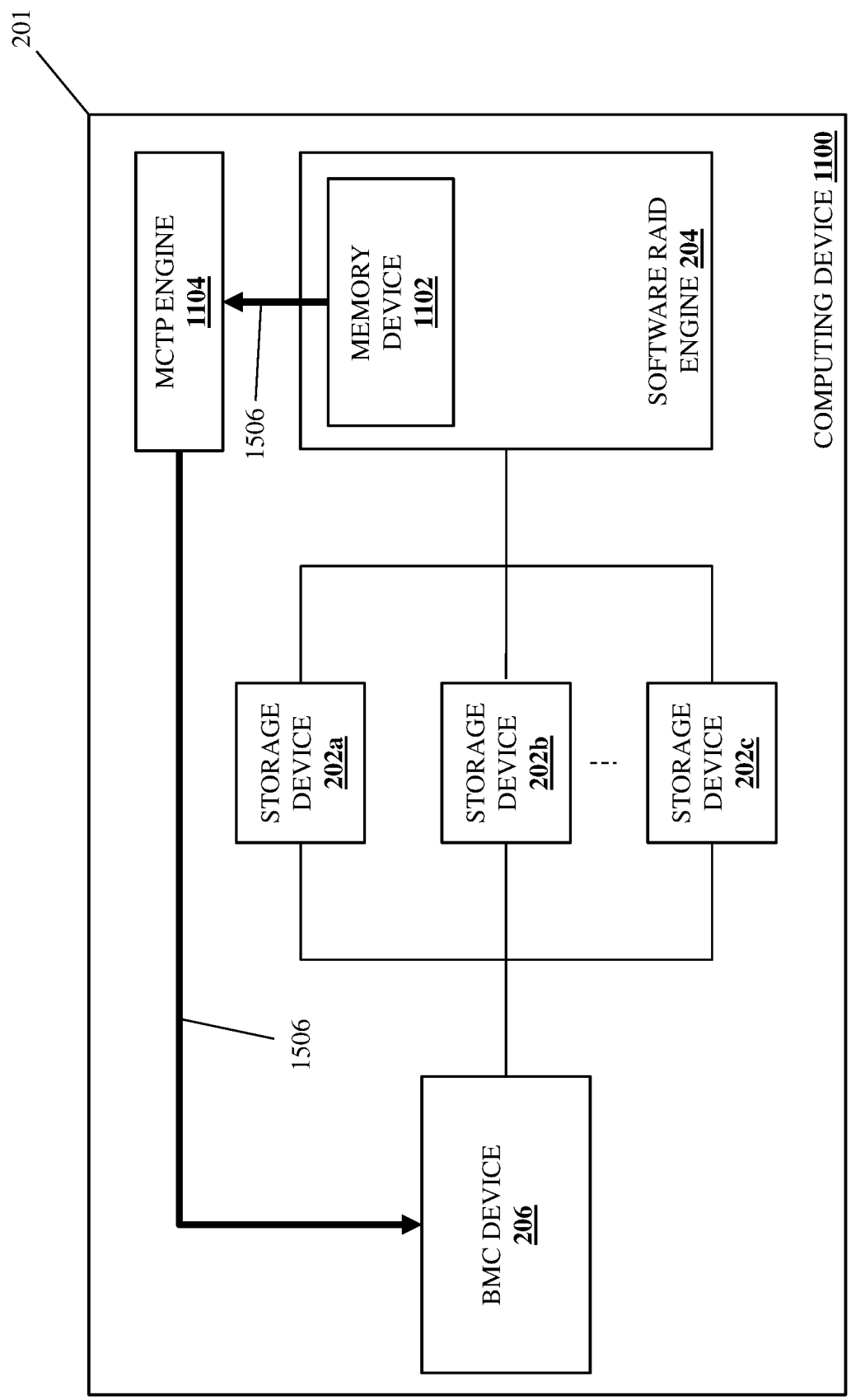
FIG. 15E is a schematic view illustrating an embodiment of the operation of the computing device of FIG. 11 during the method of FIG. 10.

With reference to FIG. 15C, in some examples and as part of the RAID management operations performed at block 1008, the RAID management instructions in the MCTP communications may cause the software RAID engine 204 to perform RAID management operations 1502 on the storage devices 202a-202c that may include performing modifications to the logical storage subsystems/logical storage device provided by one or more of the storage devices 202a-202c. With reference to FIG. 15D, in some examples and as part of the RAID management operations performed at block 1008, the RAID management instructions in the MCTP communications may cause the software RAID engine 204 to perform RAID management operations 1504 on the storage devices 202a-202c that may include retrieving RAID management information associated with the logical storage subsystems/logical storage device from one or more of the storage devices 202a-202c and storing that RAID management information in the memory device 1102. With reference to FIG. 15E, in some examples and as part of the RAID management operations performed at block 1008, the BMC engine 304 in the BMC device 206/300 may perform RAID management information retrieval operations 1506 that may include the BMC engine 304 transmitting MCTP communications via the MMBI connection to the MCTP engine 1104, with those MCTP communications including RAID provisioning instructions that cause the MCTP engine 1104 to retrieve the RAID management information stored in the memory device 1102 and provide that RAID management information to the BMC engine 304 in the BMC device 206/300.

As such, one of skill in the art in possession of the present disclosure will appreciate how the RAID management operations performed at block 1008 may be used to perform inventory operations on the logical storage device(s) provided by the storage devices 202a-202c, monitoring operations on the logical storage device(s) provided by the storage devices 202a-202c (with any monitoring parameters provided for use as telemetry data for a variety of telemetry-data-related operations known in the art), configuration operations on the logical storage device(s) provided by the storage devices 202a-202c, and/or other RAID management operations that would be apparent to one of skill in the art in possession of the present disclosure. As will be appreciated by one of skill in the art in possession of the present disclosure, the RAID management operations performed by the BMC engine 304 in the BMC device 206/300 and the software RAID engine 204 may be performed Out-Of-Band (OOB) with respect to a host operating system provided in the computing device 1100, and thus the method 1000 enables OOB support for the logical storage device(s) provided by the software RAID engine 204 for the BMC engine 304 via MCTP communications over an MMBI connection.

Thus, systems and methods have been described that utilize Management Component Transport Protocol (MCTP) communications via a Management Message Bus Interface (MMBI) connection of a management subsystem to a shared memory subsystem with a software RAID subsystem to provide communications between the management subsystem and the software RAID subsystem. For example, the software RAID/management communication system includes a chassis housing a software RAID subsystem coupled to a shared memory subsystem and storage devices, and a management subsystem that is coupled to the storage devices, and that is coupled to the shared memory subsystem via an MMBI connection. The management subsystem determines that at least one of the storage devices does not include a storage device memory subsystem that is configured for software RAID/management communications and, in response, transmits MCTP communications via the MMBI connection to retrieve RAID configuration information from the storage device(s) via the software RAID subsystem and the shared memory subsystem. The management subsystem then uses the RAID configuration information to perform at least one RAID management operation on at least one RAID logical storage device provided by the storage device(s). As such, the management subsystem may retrieve RAID configuration information for use in performing any of a variety of RAID management operations.

As will be appreciated by one of skill in the art in possession of the present disclosure, the logical storage device(s) provided by the storage devices 202a-202c discussed above may be used to storage critical and/or sensitive data, and the possibility of any compromise of that critical/sensitive data and/or the computing device is particularly troublesome in defense industry sectors, hospital industry sectors, and/or other industry sectors that utilize critical/sensitive data. For example, a RAID logical storage subsystem (e.g., a RAID volume) in a logical storage device may be deleted without having access to the computing device that includes the storage device that provides that RAID logical storage subsystem by removing that storage device from that computing device, providing that storage device in a computing device for which access is available, and deleting RAID configuration information and/or other RAID metadata from that storage device. While such actions will be recorded in a LifeCycle log, it is relatively trivial to delete LifeCycle logs and obscure those actions.

Figure 16:
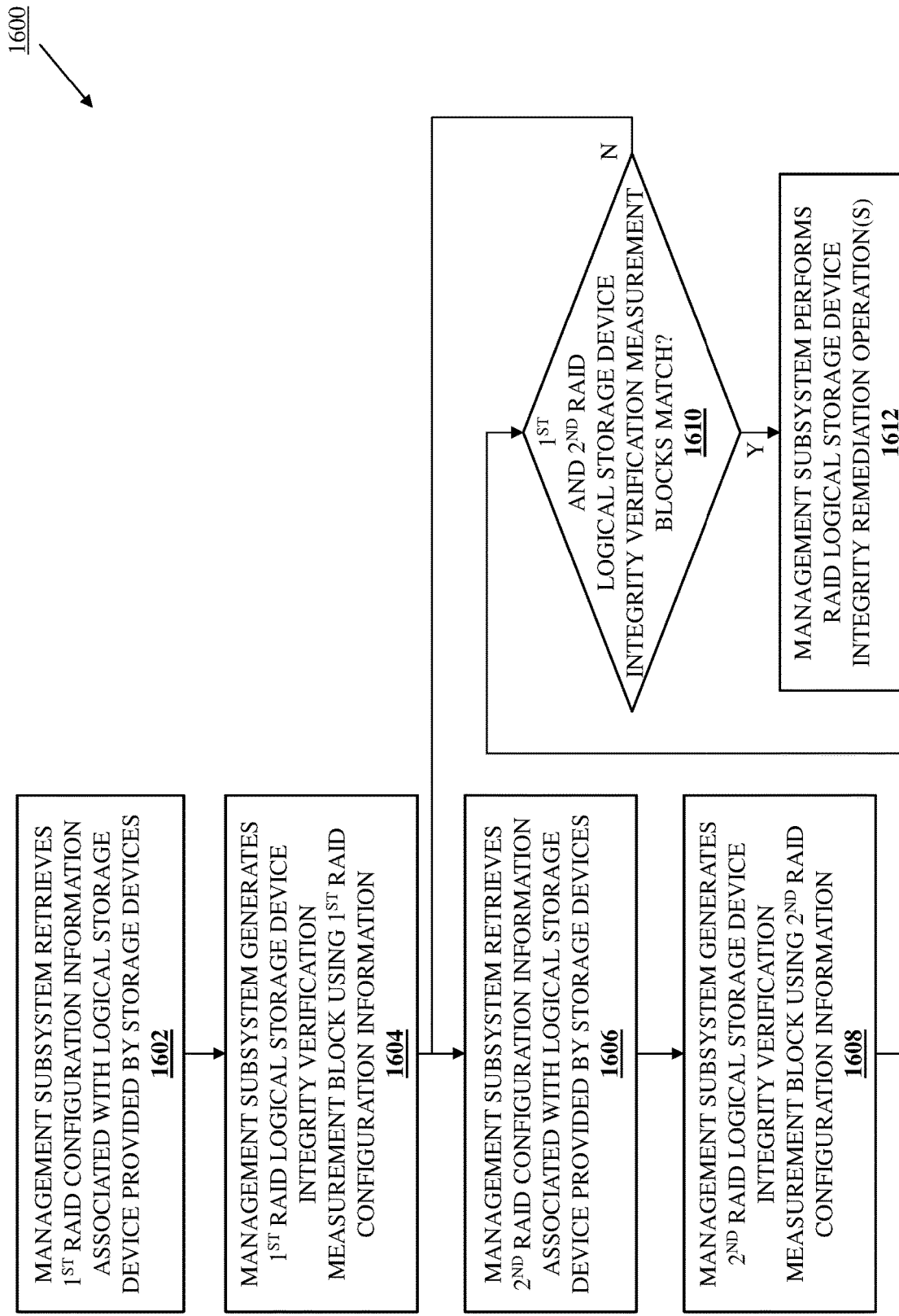
FIG. 16 is a flow chart illustrating an embodiment of a method for verifying the integrity of a RAID provided in a computing device.

Referring now to FIG. 16, an embodiment of a method 1600 for verifying the integrity of a RAID in a computing device is illustrated. As discussed below, the systems and methods of the present disclosure provide for monitoring of RAID configuration information that is associated with a logical storage device and that is not expected to change in order to detect whether the integrity of the logical storage device has been compromised. For example, the RAID integrity verification system of the present disclosure may include a chassis housing a software RAID subsystem that is coupled to storage devices and configured to provide a logical storage device using the storage devices. A management subsystem in the chassis is coupled to the storage devices and retrieves first RAID configuration information associated with the logical storage device from each of the storage devices and uses it to generate a first RAID logical storage device integrity verification measurement block. Subsequently, the management subsystem retrieves second RAID configuration information associated with the logical storage device from each of the storage devices and uses it to generate a second RAID logical storage device integrity verification measurement block. If the management subsystem determines that the second RAID logical storage device integrity verification measurement block does not match the first RAID logical storage device integrity verification measurement block, it performs RAID logical storage device integrity remediation operation(s). As such, the integrity of a logical storage device provided in a computing device may be regularly verified such that, in the event that integrity is compromised (e.g., any changes are made to that logical storage device including deletions, additions, modifications, etc.), remediation operations may be performed.

Figure 17A:
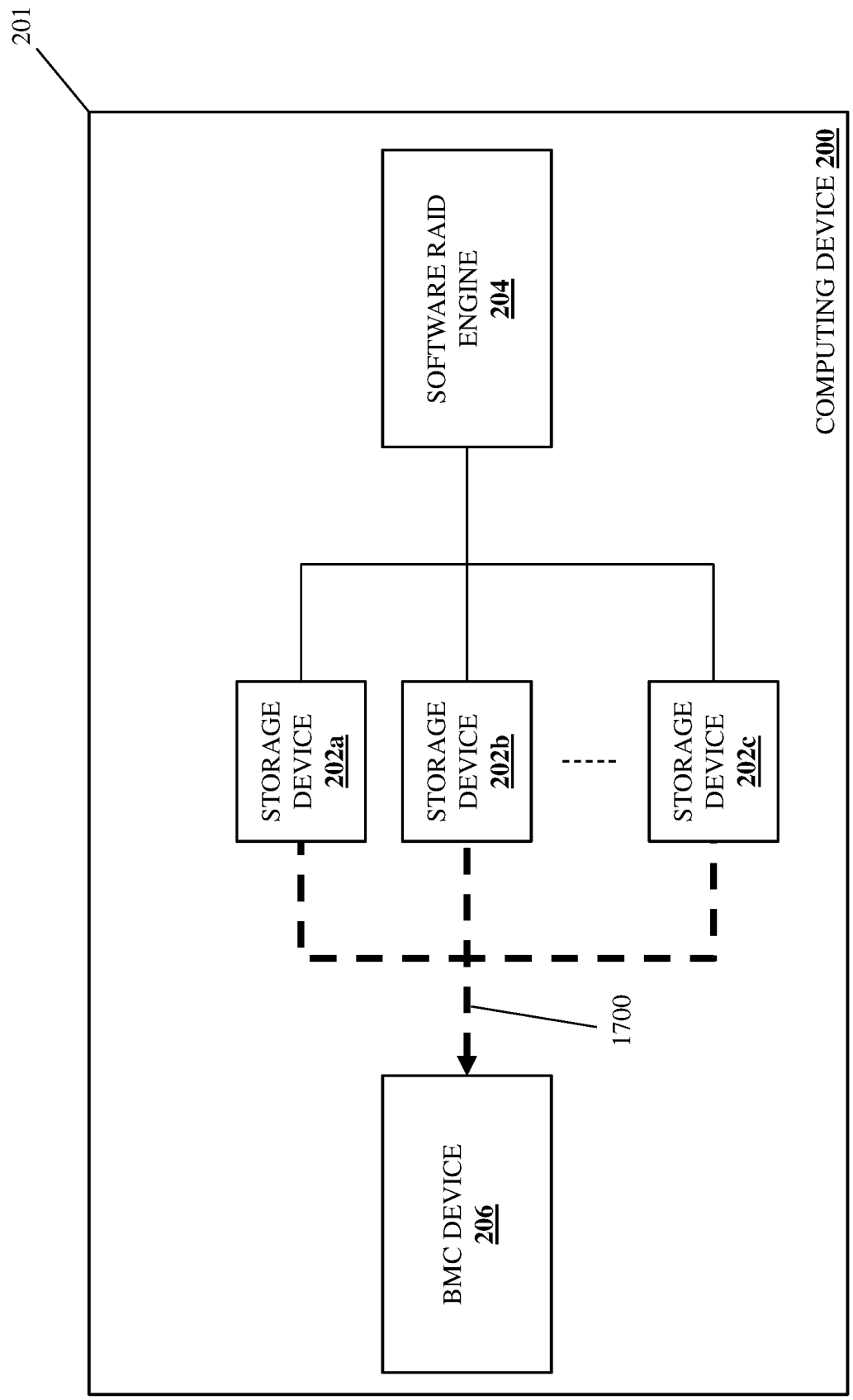
FIG. 17A is an embodiment of the operation of the computing device of FIG. 2 during the method of FIG. 10.
Figure 17B:
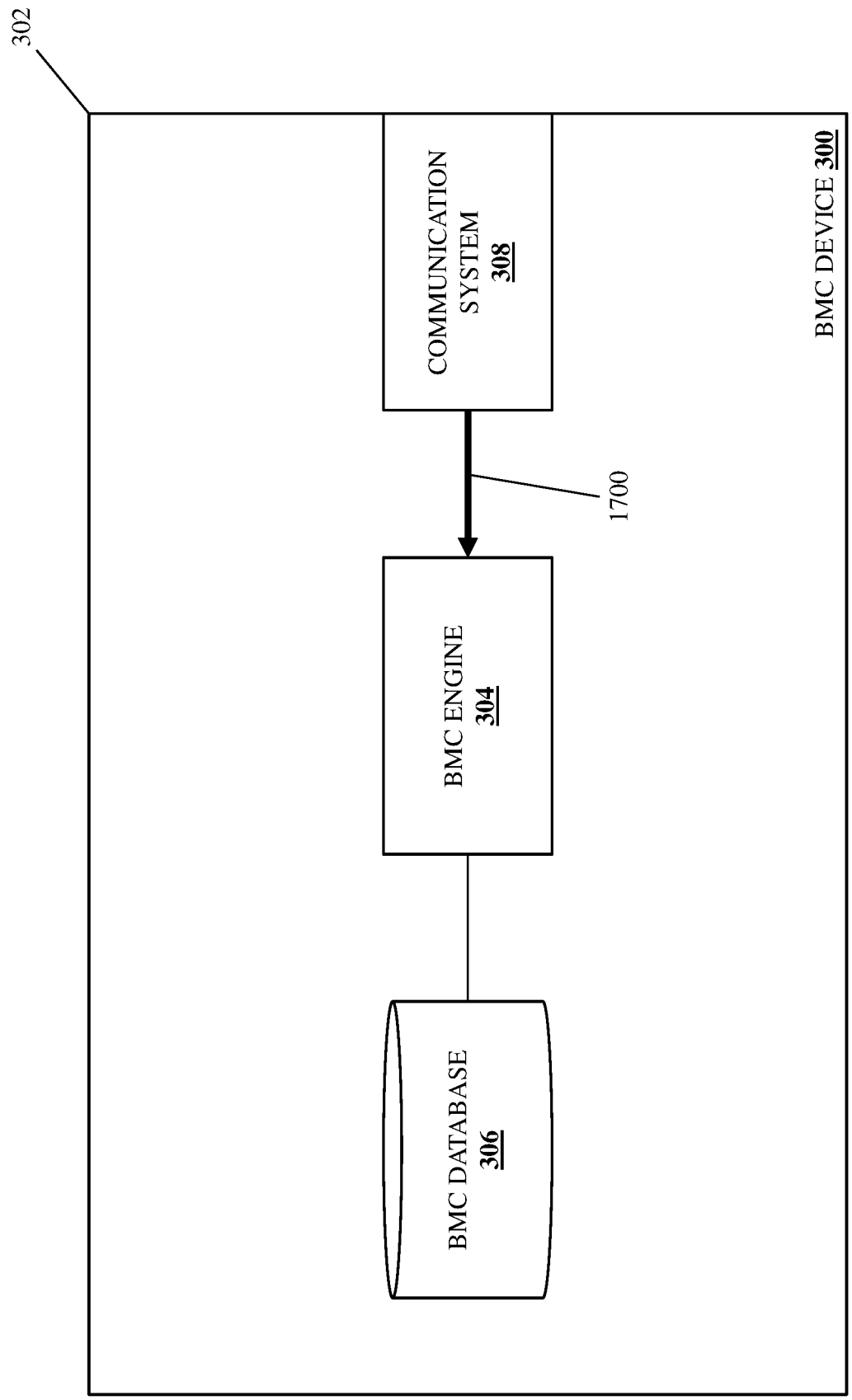
FIG. 17B is a schematic view illustrating an embodiment of the operation of the management subsystem of FIG. 3 during the method of FIG. 10.

The method 1600 begins at block 1602 where a management subsystem retrieves first RAID configuration information associated with a logical storage device provided by storage devices coupled to the management subsystem. With reference to FIGS. 17A and 17B, in an embodiment of block 1602, the BMC engine 304 in the BMC device 206/300 may perform RAID configuration information retrieval operations 1700 that include retrieving RAID configuration information (e.g., RAID metadata) from each of the storage devices 202*a*-202*c* via its communication system 308. As will be appreciated by one of skill in the art in possession of the present disclosure, the RAID configuration information retrieval operations 1700 that include retrieving RAID configuration information (e.g., RAID metadata) from each of the storage devices 202*a*-202*c* is illustrated in FIG. 17A with dashed lines because that RAID configuration information is not retrieved directly from the storage devices 202*a*-202*c* by the BMC engine 204 in the BMC device 206/300. Rather, one of skill in the art in possession of the present disclosure will appreciate how that RAID configuration information may be retrieved at block 1602 by the BMC engine 304 from storage device memory subsystems (e.g., the CMB device 408 discussed above) in the storage devices 202*a*-202*c* and via the software RAID engine 204 as described above with reference to the method 300; or how that RAID configuration information may be retrieved at block 1602 by the BMC engine 304 using MCTP communications via the MMBI connection, the MCTP engine 1104, the shared memory subsystem provided by the memory device 1102, and the software RAID engine 204 as described above with reference to the method 1000.

As will be appreciated by one of skill in the art in possession of the present disclosure, the RAID configuration information retrieved at block 1602 will be relatively "static" RAID configuration information that is not expected to change absent a relatively fundamental change in the logical storage device(s) provided by the storage devices 202*a*-202*c*, and may include a number of RAID logical storage subsystems (e.g., a number of RAID virtual drives, a number of RAID volumes, etc.) included in the logical storage device(s), a generation identifier for each RAID logical storage subsystem included in the logical storage device(s), a respective device identifier for each of the plurality of storage devices 202*a*-202*c*, a respective RAID logical storage subsystem state for each RAID logical storage subsystem included in the logical storage device(s), and/or a variety of other relatively static RAID configuration information that would be apparent to one of skill in the art in possession of the present disclosure. As will be appreciated by one of skill in the art in possession of the present disclosure, RAID configuration information such as a last update time, background scan information, background task information, and/or other relatively dynamic RAID configuration information known in the art may be either not be retrieved as part of the RAID configuration information retrieval operations 1700, removed from the RAID configuration information retrieved as part of the RAID configuration information retrieval operations 1700, and/or otherwise not utilized in the method 1600 described below.

As such, the RAID configuration information retrieved at block 1602 may be limited to a subset of the RAID configuration information available in the storage devices 202*a*-202*c*, and may include only relatively static RAID configuration information that, if changed, would be recognized by one of skill in the art in possession of the present disclosure as being associated with a relatively fundamental change in the logical storage device(s) provided by the storage device(s) 202*a*-202*c* such as, for example, the addition, removal, or modification of any of the storage devices 202*a*-202*c* that would be identified by a change in the device identifiers included in the RAID configuration information; the addition, removal, or modification of a RAID logical subsystem (e.g., a RAID volume) that would be identified by a change in the generation identifiers in the RAID configuration information; the hot-plugging or hot-removal of a storage device 202*a*-202*c* that would be identified by a change in the RAID logical storage subsystem state in the RAID configuration information; and/or other fundamental logical storage device changes that would be apparent to one of skill in the art in possession of the present disclosure. However, while several specific examples of RAID configuration information have been described, one of skill in the art in possession of the present disclosure will appreciate how a variety of RAID configuration information may be utilized with the teachings of the present disclosure while remaining within its scope as well.

The method 1600 then proceeds to block 1604 where the management subsystem generates a first RAID logical storage device integrity measurement block using the first RAID configuration information. In an embodiment, at block 1604, the BMC engine 304 in the BMC device 206/300 may then use the RAID configuration information retrieved at block 1602 to generate a first RAID logical storage device integrity measurement block. For example, at block 1604, the BMC engine 304 may perform a Security Protocol and Data Model (SPDM) measurement operation using the RAID configuration information retrieved at block 1602 in order to generate the first RAID logical storage device integrity measurement block. To provide a specific example, the SPDM measurement operation may include performing a hash operation on the RAID configuration information retrieved at block 1602 to generate a hash value that provides the first RAID logical storage device integrity measurement block, although one of skill in the art in possession of the present disclosure will appreciate how other SPDM measurement operations to generate the first RAID logical storage device integrity measurement block will fall within the scope of the present disclosure as well. With reference to FIG. 18, at block 1604 and in response to generating the first RAID logical storage device integrity measurement block, the BMC engine 304 may perform a first RAID logical storage device integrity measurement block storage operation 1800 that includes storing the first RAID logical storage device integrity measurement block in the BMC database 306.

The method 1600 then proceeds to block 1606 where the management subsystem retrieves second RAID configuration information associated with the logical storage device provided by the storage devices. As will be appreciated by one of skill in the art in possession of the present disclosure, block 1606 may be performed some time period following block 1604 that may be set by default, defined by a user, and/or determined based on a level of security associated with the logical storage device(s) provided by the storage devices 202*a*-202*c* that defines how often the integrity of the logical storage device(s) provided by the storage devices 202*a*-202*c* should be verified.

Figure 19A:
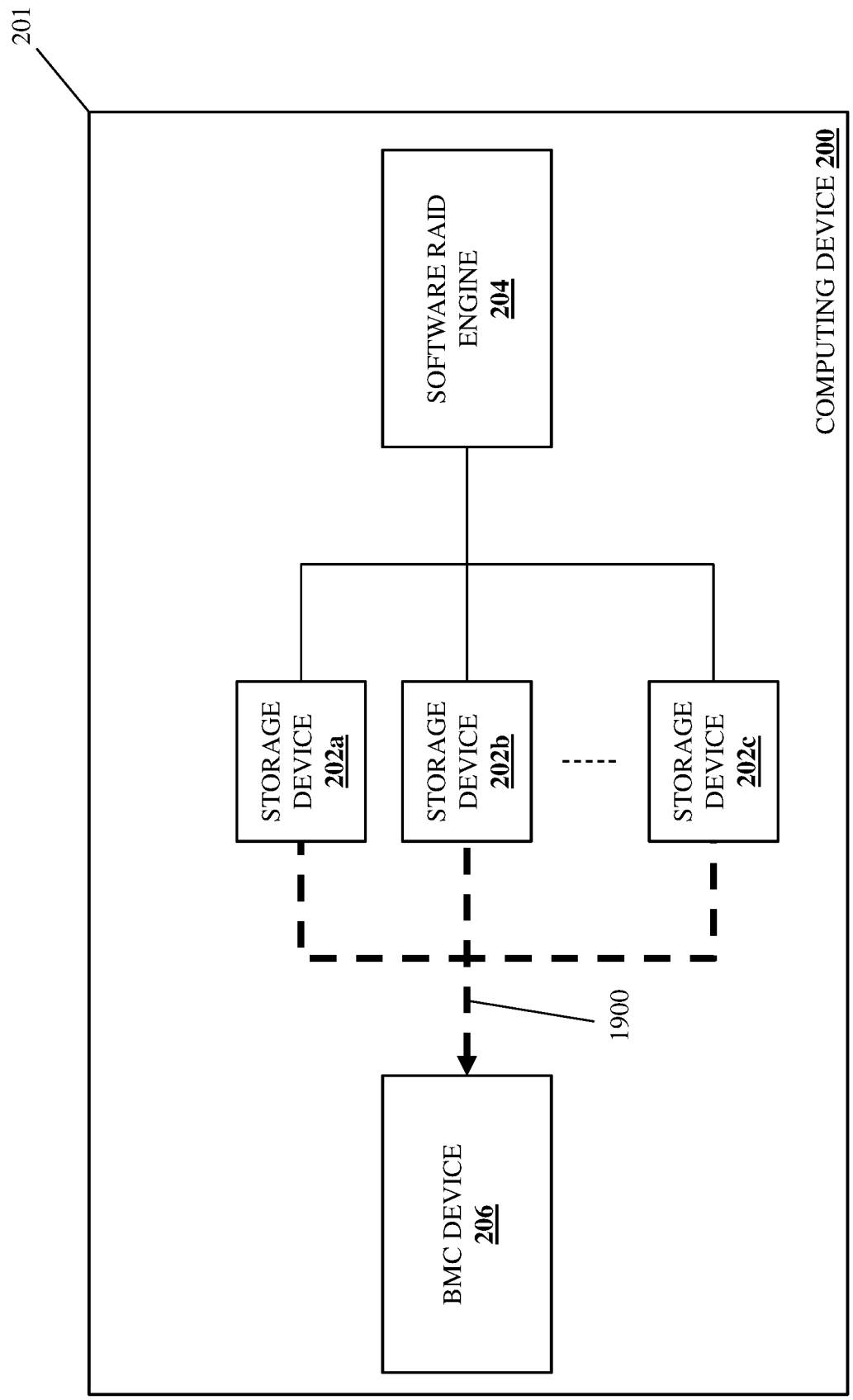
FIG. 19A is an embodiment of the operation of the computing device of FIG. 2 during the method of FIG. 10.
Figure 19B:
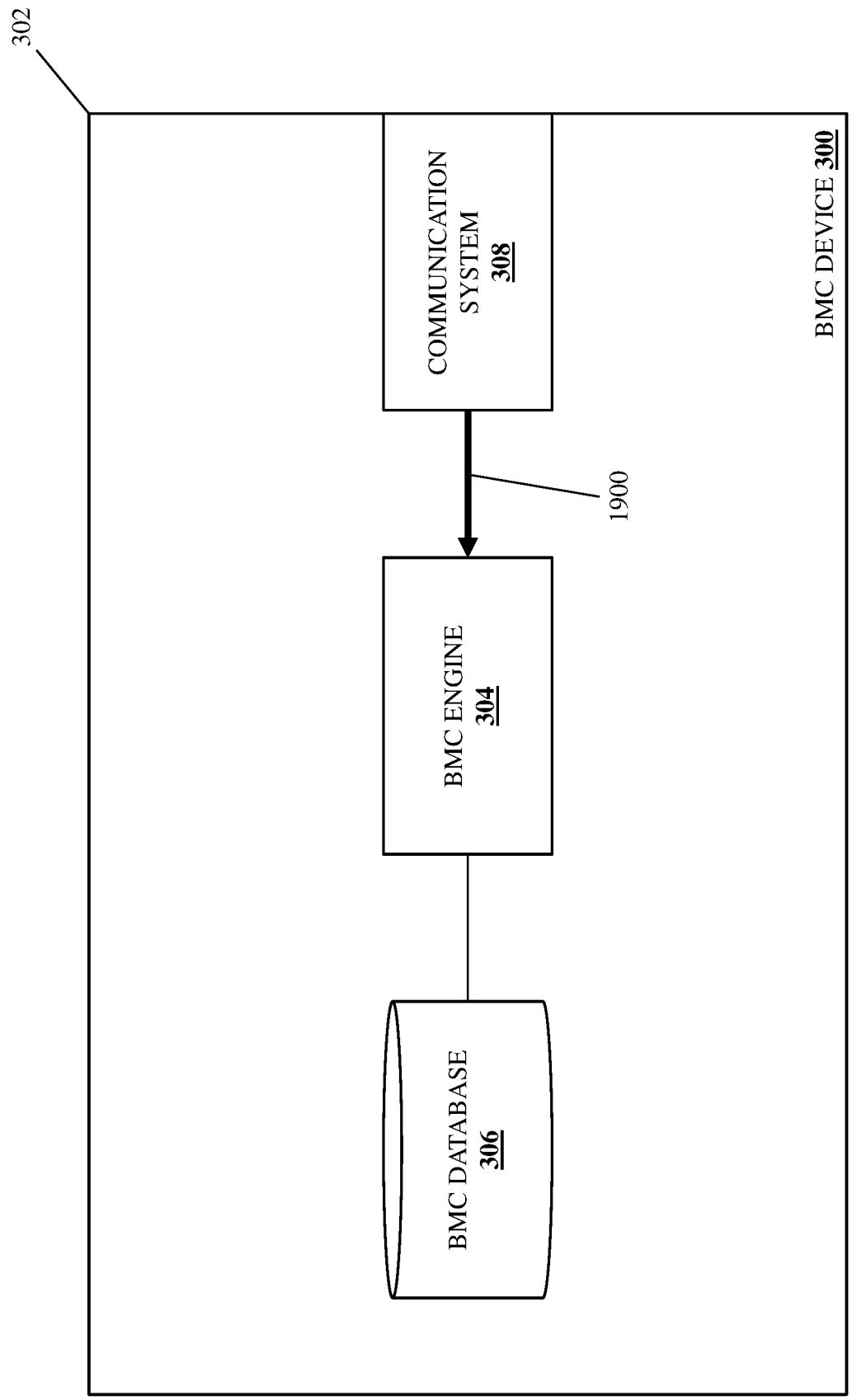
FIG. 19B is a schematic view illustrating an embodiment of the operation of the management subsystem of FIG. 3 during the method of FIG. 10.

With reference to FIGS. 19A and 19B, in an embodiment of block 1606, the BMC engine 304 in the BMC device 206/300 may perform RAID configuration information retrieval operations 1900 that include retrieving RAID configuration information (e.g., RAID metadata) from each of the storage devices 202*a*-202*c* via its communication system 308. Similarly as discussed above, the RAID configuration information retrieval operations 1900 that include retrieving RAID configuration information (e.g., RAID metadata) from each of the storage devices 202*a*-202*c* is illustrated in FIG. 19A with dashed lines because that RAID configuration information is not retrieved directly from the storage devices 202a-202c by the BMC engine 204 in the BMC device 206/300. Rather, one of skill in the art in possession of the present disclosure will appreciate how that RAID configuration information may be retrieved at block 1606 by the BMC engine 304 from storage device memory subsystems (e.g., the CMB device 408 discussed above) in the storage devices 202a-202c via the software RAID engine 204 as described above with reference to the method 300; or how that RAID configuration information may be retrieved at block 1606 by the BMC engine 304 using MCTP communications and via the MMBI connection, the MCTP engine 1104, the shared memory subsystem provided by the memory device 1102, and the software RAID engine 204 as described above with reference to the method 1000.

As will be appreciated by one of skill in the art in possession of the present disclosure, the RAID configuration information retrieved at block 1606 should be the same relatively "static" RAID configuration information that was retrieved at block 1602 and that is not expected to change absent a relatively fundamental change in the logical storage device(s) provided by the storage devices 202a-202c discussed above, and as such may include a number of RAID logical storage subsystems (e.g., a number of RAID virtual drives, a number of RAID volumes, etc.) included in the logical storage device(s), a generation identifier for each RAID logical storage subsystem included in the logical storage device(s), a respective device identifier for each of the plurality of storage devices 202a-202c, a respective RAID logical storage subsystem state for each RAID logical storage subsystem included in the logical storage device(s), and/or a variety of other relatively static RAID configuration information that would be apparent to one of skill in the art in possession of the present disclosure. Similarly as discussed above, RAID configuration information such as a last update time, background scan information, background task information, and/or other relatively dynamic RAID configuration information known in the art may be either not be retrieved as part of the RAID configuration information retrieval operations 1900, removed from the RAID configuration information retrieved as part of the RAID configuration information retrieval operations 1300, and/or otherwise not utilized in the method 1600 described below.

The method 1600 then proceeds to block 1608 where the management subsystem generates a second RAID logical storage device integrity measurement block using the second RAID configuration information. In an embodiment, at block 1608, the BMC engine 304 in the BMC device 206/300 may then use the RAID configuration information retrieved at block 1606 to generate a second RAID logical storage device integrity measurement block. Similarly as described above, at block 1608, the BMC engine 304 may perform the SPDM measurement operation discussed above using the RAID configuration information retrieved at block 1606 in order to generate the second RAID logical storage device integrity measurement block. As such, the SPDM measurement operation may include performing a hash operation on the RAID configuration information retrieved at block 1606 to generate a hash value that provides the second RAID logical storage device integrity measurement block similarly as described above, although one of skill in the art in possession of the present disclosure will appreciate how other SPDM measurement operations to generate the second RAID logical storage device integrity measurement block will fall within the scope of the present disclosure as well. As will be appreciated by one of skill in the art in possession of the present disclosure, the hash operation or other SPDM measurement operation performed at block 1608 will be the same hash operation or other SPDM measurement operation performed at block 1604 such that, in the event the RAID configuration information retrieved at blocks 1602 and 1606 is the same, the hash values that provide the first and second RAID logical storage device integrity measurement blocks will be the same.

Figure 20:
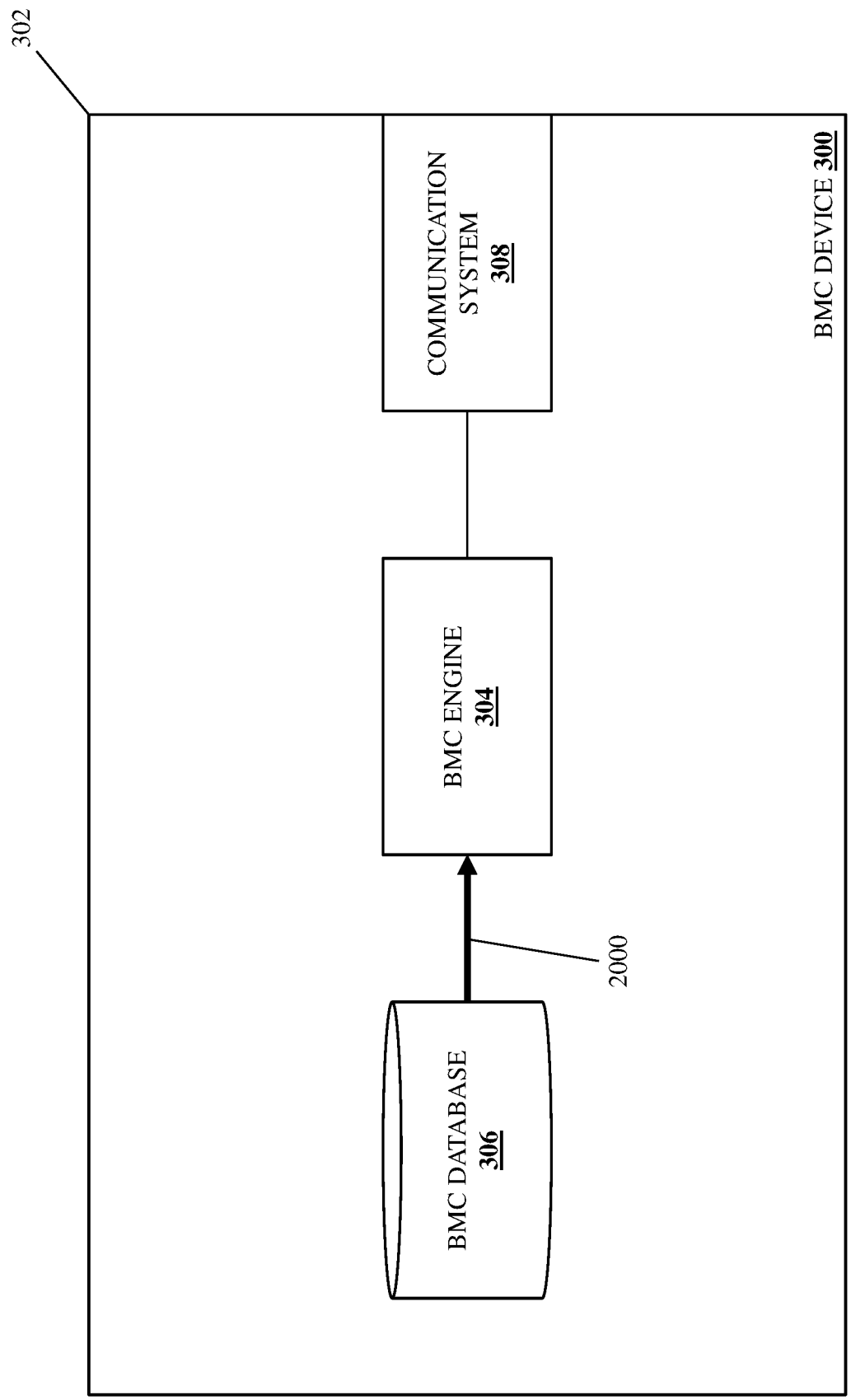
FIG. 20 is a schematic view illustrating an embodiment of the operation of the management subsystem of FIG. 3 during the method of FIG. 10.

The method 1600 then proceeds to decision block 1610 where it is determined whether the first and second RAID logical storage device integrity measurement blocks match. With reference to FIG. 20, in an embodiment of decision block 1610, the BMC engine 304 in the BMC device 206/300 may perform first RAID logical storage device integrity measurement block retrieval operations 2000 that include retrieving the first RAID logical storage device integrity measurement block from the BMC database 306. Following the retrieval of the first RAID logical storage device integrity measurement block, the BMC engine 304 may then compare the second RAID logical device integrity measurement block generated at block 1608 to the first RAID logical device integrity measurement block generated and stored at block 1604. As will be appreciated by one of skill in the art in possession of the present disclosure, in embodiment in which the first and second RAID logical device integrity measurement blocks are provided by hash values, the comparison of the first and second RAID logical device integrity measurement blocks may be performed by a comparison of those respective hash values to determine whether they match. However, while a specific example of the determination of whether first and second RAID logical device integrity measurement blocks match has been described, one of skill in the art in possession of the present disclosure will appreciate how the determination of whether the first and second RAID logical device integrity measurement blocks match may be performed in a variety of manners that will fall within the scope of the present disclosure as well.

If, at decision block 1610, it is determined that the first and second RAID logical storage device integrity measurement blocks match, the method 1600 returns to block 1606. In the event it is determined that the first and second RAID logical device integrity measurement blocks (e.g., respective hash values) match at decision block 1610, the method 1600 may again perform block 1606 some time period following decision block 1610 that may be set by default, defined by a user, and/or determined based on a level of security associated with the logical storage device(s) provided by the storage devices 202a-202c that defines how often the integrity of the logical storage device(s) provided by the storage devices 202a-202c should be verified. As such, the method 1600 may loop such that, following the generation and storage of the first RAID logical device integrity measurement block, the BMC engine 304 in the BMC device 206/300 continues to periodically retrieve RAID configuration information, generate the second RAID logical device integrity measurement block, and determine whether that second RAID logical device integrity measurement block matches the first RAID logical device integrity measurement block as long as the first and second RAID logical device integrity measurement blocks match.

If at decision block 110, it is determined that the first and second RAID logical storage device integrity measurement blocks do not match, the method 1600 proceeds to block 1612 where the management subsystem performs at least one RAID logical storage device integrity remediation operation. As discussed above and as will be appreciated by one of skill in the art in possession of the present disclosure, the first and second RAID logical device integrity measurement blocks (e.g., respective hash values) will not match if any of the RAID configuration information retrieved at block 1606 is different from the RAID configuration information retrieved at block 1602. As such, the addition, removal, or modification of any of the storage devices 202a-202c that results in a change in the device identifiers included in the RAID configuration information; the addition, removal, or modification of a RAID logical subsystem (e.g., a RAID volume) that results in a change in the generation identifiers in the RAID configuration information; the hot-plugging or hot-removal of a storage device 202a-202c that results in a change in the RAID logical storage subsystem state in the RAID configuration information; and/or other change in the RAID configuration information will be detected in response to the second RAID logical device integrity measurement block differing from the first RAID logical device integrity measurement block.

In response to determining that the first and second RAID logical device integrity measurement blocks do not match, the BMC engine 304 in the BMC device 206/300 may perform a check to determine whether an authorized or otherwise intended change in the logical storge device(s) provided by the storage devices 202a-202c was performed that resulted in the changing of the RAID configuration information detected by the mismatching first and second RAID logical device integrity measurement blocks, and one of skill in the art in possession of the present disclosure will appreciate how the determination of such an authorized or intended change will result in the BMC engine 304 not performing the RAID logical storage device integrity remediation operations described herein.

In an embodiment, at block 1612 and in response to determining that the first and second RAID logical device integrity measurement blocks do not match (and that the change that resulted in the mismatching first and second RAID logical device integrity measurement blocks was unauthorized or unintended), the BMC engine 304 in the BMC device 206/300 may perform RAID logical storage device integrity remediation operations such as generating a RAID logical storage device integrity alert and displaying the RAID logical storage device integrity alert to a user (e.g., via the display 110 in the IHS 100 discussed above with reference to FIG. 1), quarantining at least one logical storage subsystem included in the logical storage device(s) (or any or all of those logical storage device(s)) provided by the storage devices 202a-202c, recording the change in the logical storage device(s) provided by the storage devices 202a-202c in a log (e.g., in the BMC database 306), and/or performing any other RAID logical storage device integrity remediation operation that would be apparent to one of skill in the art in possession of the present disclosure. Furthermore, in some embodiments, a user with access to the BMC device 206/300 may access the first and second RAID logical device integrity measurement blocks to determine whether they match and, in response, perform any of a variety of other RAID logical storage device integrity remediation operations (e.g., shutting down the computing device 200) while remaining within the scope of the present disclosure as well. However, while a few specific RAID logical storage device integrity remediation operations have been described, one of skill in the art in possession of the present disclosure will appreciate how any of a variety of remediation operations may be performed in response to the compromise of the computing device 200 detected via the mismatching first and second RAID logical device integrity measurement blocks while remaining within the scope of the present disclosure.

Thus, systems and methods have been described that provide for monitoring of RAID configuration information that is associated with a logical storage device and that is not expected to change in order to detect whether the integrity of the logical storage device has been compromised. For example, the RAID integrity verification system of the present disclosure may include a chassis housing a software RAID subsystem that is coupled to storage devices and configured to provide a logical storage device using the storage devices. A management subsystem in the chassis is coupled to the storage devices and retrieves first RAID configuration information associated with the logical storage device from each of the storage devices and uses it to generate a first RAID logical storage device integrity verification measurement block. Subsequently, the management subsystem retrieves second RAID configuration information associated with the logical storage device from each of the storage devices and uses it to generate a second RAID logical storage device integrity verification measurement block. If the management subsystem determines that the second RAID logical storage device integrity verification measurement block does not match the first RAID logical storage device integrity verification measurement block, it performs RAID logical storage device integrity remediation operation(s). As such, the integrity of a logical storage device provided in a computing device may be regularly verified such that, in the event that integrity is compromised (e.g., any changes are made to that logical storage device including deletions, additions, modifications, etc.), remediation operations may be performed.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Redundant Array of Independent Disk (RAID) integrity verification system, comprising:
   a chassis;
   a plurality of physical storage devices that are housed in the chassis;
   a software Redundant Array of Independent Disk (RAID) subsystem that is housed in the chassis, that is coupled to the plurality of physical storage devices, and that is configured to provide a logical storage device using the plurality of physical storage devices; and
   a management subsystem that is housed in the chassis, that is coupled to the plurality of physical storage devices, and that includes at least one hardware processor that is configured to:
   retrieve, from each of the plurality of physical storage devices, first RAID configuration information for the logical storage device that identifies:
   each of the plurality of physical storage devices that are configured to provide the logical storage device; and
   each of a plurality of RAID volumes included in the logical storage device;
   generate, using the first RAID configuration information, a first RAID logical storage device integrity verification measurement block;

retrieve, from each of the plurality of physical storage devices that are coupled to the management subsystem subsequent to generating the first RAID logical storage device integrity verification measurement block, second RAID configuration information for the logical storage device that identifies:
- each of the plurality of physical storage devices that are coupled to the management subsystem subsequent to generating the first RAID logical storage device integrity verification measurement block and that are configured to provide the logical storage device; and
- each of the plurality of RAID volumes included in the logical storage device subsequent to generating the first RAID logical storage device integrity verification measurement block;

generate, using the second RAID configuration information, a second RAID logical storage device integrity verification measurement block; and determine that the second RAID logical storage device integrity verification measurement block does not match the first RAID logical storage device integrity verification measurement block and, in response, identify a RAID logical storage device integrity issue based on at least one of:
- an addition or removal of a physical storage devices configured to provide the logical storage device subsequent to the first RAID logical storage device integrity verification measurement block being generated; or
- an addition or removal of a RAID volumes included in the logical storage device subsequent to the first RAID logical storage device integrity verification measurement block being generated; and perform, in response to identifying the RAID logical storage device integrity issue, at least one RAID logical storage device integrity remediation operation.

2. The system of claim 1, wherein the first RAID configuration information and the second RAID configuration information each include a respective number of logical storage subsystems included in the logical storage device.

3. The system of claim 1, wherein the first RAID configuration information and the second RAID configuration information each include at least one of a respective generation identifier for each logical storage subsystem included in the logical storage device, a respective device identifier for each of the plurality of storage devices that are coupled to the management subsystem, or a respective logical storage subsystem state for each logical storage subsystem included in the logical storage device.

4. The system of claim 1, wherein the management subsystem is configured to perform a respective Security Protocol and Data Model (SPDM) measurement operation to generate each of the first RAID logical storage device integrity verification measurement block and the second RAID logical storage device integrity verification measurement block.

5. The system of claim 1, wherein the at least one RAID logical storage device integrity remediation operation includes at least one of:
- generating a RAID logical storage device integrity alert and displaying the RAID logical storage device integrity alert to a user; or
- quarantining at least one logical storage subsystem included in the logical storage device.

6. The system of claim 1, wherein the plurality of storage devices include:
- at least one Non Volatile Memory express (NVMe) storage device; and
- at least one of a Serial Attached Small Computer System Interface (SCSI) (SAS) storage device or a Serial Advanced Technology Attachment (SATA) storage device.

7. An Information Handling System (IHS), comprising:
a processing system including at least one hardware processor; and
a memory system that is coupled to the processing system and that includes instructions that, when executed by the processing system, cause the at least one hardware processor in the processing system to provide a management engine that is configured to:
retrieve, from each of a plurality of physical storage devices that are coupled to the processing system, first Redundant Array of Independent Disk (RAID) configuration information for a logical storage device that is provided by a software RAID subsystem using the plurality of physical storage devices and that identifies:
- each of the plurality of physical storage devices that are configured to provide the logical storage device; and
- each of a plurality of RAID volumes included in the logical storage device;

generate, using the first RAID configuration information, a first RAID logical storage device integrity verification measurement block;

retrieve, from each of the plurality of physical storage devices that are coupled to the processing system subsequent to generating the first RAID logical storage device integrity verification measurement block, second RAID configuration information for the logical storage device that identifies:
- each of the plurality of physical storage devices that are coupled to the management subsystem subsequent to generating the first RAID logical storage device integrity verification measurement block and that are configured to provide the logical storage device; and
- each of the plurality of RAID volumes included in the logical storage device subsequent to generating the first RAID logical storage device integrity verification measurement block;

generate, using the second RAID configuration information, a second RAID logical storage device integrity verification measurement block; and determine that the second RAID logical storage device integrity verification measurement block does not match the first RAID logical storage device integrity verification measurement block and, in response, identify a RAID logical storage device integrity issue based on at least one of:
- an addition or removal of a physical storage devices configured to provide the logical storage device subsequent to the first RAID logical storage device integrity verification measurement block being generated; or
- an addition or removal of a RAID volumes included in the logical storage device subsequent to the first RAID logical storage device integrity verification measurement block being generated; and perform, in response to identifying the RAID logical storage device integrity issue, at least one RAID logical storage device integrity remediation operation.

8. The IHS of claim 7, wherein the first RAID configuration information and the second RAID configuration information each include a respective number of logical storage subsystems included in the logical storage device.

9. The IHS of claim 7, wherein the first RAID configuration information and the second RAID configuration information each include at least one of a respective generation identifier for each logical storage subsystem included in the logical storage device, a respective device identifier for each of the plurality of storage devices that are coupled to the management subsystem, or a respective logical storage subsystem state for each logical storage subsystem included in the logical storage device.

10. The IHS of claim 7, wherein the management engine is configured to perform a respective Security Protocol and Data Model (SPDM) measurement operation to generate each of the first RAID logical storage device integrity verification measurement block and the second RAID logical storage device integrity verification measurement block.

11. The IHS of claim 7, wherein the at least one RAID logical storage device integrity remediation operation includes at least one of:
   generating a RAID logical storage device integrity alert and displaying the RAID logical storage device integrity alert to a user; or
   quarantining at least one logical storage subsystem included in the logical storage device.

12. The IHS of claim 7, wherein the plurality of storage devices include at least one Non Volatile Memory express (NVMe) storage device.

13. The IHS of claim 7, wherein the plurality of storage devices include at least one of a Serial Attached Small Computer System Interface (SCSI) (SAS) storage device or a Serial Advanced Technology Attachment (SATA) storage device.

14. A method for verifying the integrity of a Redundant Array of Independent Disk (RAID) in a computing device, comprising:
   retrieving, by a management subsystem from each of a plurality of physical storage devices, first Redundant Array of Independent Disk (RAID) configuration information for a logical storage device that is provided by a software RAID subsystem using the plurality of physical storage devices and that identifies:
      each of the plurality of physical storage devices that are configured to provide the logical storage device; and
      each of a plurality of RAID volumes included in the logical storage device;
   generating, by the management subsystem using the first RAID configuration information, a first RAID logical storage device integrity verification measurement block;
   retrieving, by the management subsystem from each of the plurality of physical storage devices subsequent to generating the first RAID logical storage device integrity verification measurement block, second RAID configuration information for the logical storage device that identifies:
      each of the plurality of physical storage devices that are coupled to the management subsystem subsequent to generating the first RAID logical storage device integrity verification measurement block are configured to provide the logical storage device; and
      each of the plurality of RAID volumes included in the logical storage device subsequent to generating the first RAID logical storage device integrity verification measurement block;
   generating, by the management subsystem using the second RAID configuration information, a second RAID logical storage device integrity verification measurement block; and
   determining, by the management subsystem, that the second RAID logical storage device integrity verification measurement block does not match the first RAID logical storage device integrity verification measurement block and, in response, identifying a RAID logical storage device integrity issue based on at least one of:
      an addition or removal of a physical storage devices were configured to provide the logical storage device subsequent to the first RAID logical storage device integrity verification measurement block being generated; or
      an addition or removal of a RAID volumes included in the logical storage device subsequent to the first RAID logical storage device integrity verification measurement block being generated; and
   performing, by the management subsystem in response to identifying the RAID logical storage device integrity issue, at least one RAID logical storage device integrity remediation operation.

15. The method of claim 14, wherein the first RAID configuration information and the second RAID configuration information each include a respective number of logical storage subsystems included in the logical storage device.

16. The method of claim 14, wherein the first RAID configuration information and the second RAID configuration information each include at least one of a respective generation identifier for each logical storage subsystem included in the logical storage device, a respective device identifier for each of the plurality of storage devices that are coupled to the management subsystem, or a respective logical storage subsystem state for each logical storage subsystem included in the logical storage device.

17. The method of claim 14, wherein the management subsystem performs a respective Security Protocol and Data Model (SPDM) measurement operation to generate each of the first RAID logical storage device integrity verification measurement block and the second RAID logical storage device integrity verification measurement block.

18. The method of claim 14, wherein the at least one RAID logical storage device integrity remediation operation includes at least one of:
   generating a RAID logical storage device integrity alert and displaying the RAID logical storage device integrity alert to a user; or
   quarantining at least one logical storage subsystem included in the logical storage device.

19. The method of claim 14, wherein the plurality of storage devices include at least one Non Volatile Memory express (NVMe) storage device.

20. The method of claim 14, wherein the plurality of storage devices include at least one of a Serial Attached Small Computer System Interface (SCSI) (SAS) storage device or a Serial Advanced Technology Attachment (SATA) storage device.

* * * * *